(12) United States Patent
Tourapis et al.

(10) Patent No.: US 10,853,973 B2
(45) Date of Patent: Dec. 1, 2020

(54) POINT CLOUD COMPRESSION USING FIXED-POINT NUMBERS

(71) Applicant: Apple Inc., Cupertino, CA (US)

(72) Inventors: Alexandros Tourapis, Los Gatos, CA (US); Valery G. Valentin, San Jose, CA (US); Fabrice A. Robinet, Suunyvale, CA (US); Khaled Mammou, Vancouver (CA); Jungsun Kim, San Jose, CA (US); Yeping Su, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/592,711

(22) Filed: Oct. 3, 2019

(65) Prior Publication Data

US 2020/0111236 A1 Apr. 9, 2020

Related U.S. Application Data

(60) Provisional application No. 62/740,877, filed on Oct. 3, 2018.

(51) Int. Cl.
*G06T 9/00* (2006.01)

(52) U.S. Cl.
CPC .................... *G06T 9/00* (2013.01)

(58) Field of Classification Search
None
See application file for complete search history.

(56) References Cited

U.S. PATENT DOCUMENTS

| | | | |
|---|---|---|---|
| 2004/0217956 A1 | 11/2004 | Besl et al. | |
| 2011/0010400 A1* | 1/2011 | Hayes | H03M 7/3059 707/803 |
| 2014/0125671 A1 | 5/2014 | Vorobyov et al. | |
| 2016/0086353 A1* | 3/2016 | Lukac | G06T 9/00 345/419 |
| 2017/0347120 A1 | 11/2017 | Chou et al. | |
| 2017/0347122 A1* | 11/2017 | Chou | H04N 19/36 |
| 2018/0053324 A1 | 2/2018 | Cohen et al. | |

* cited by examiner

*Primary Examiner* — Frank S Chen
(74) *Attorney, Agent, or Firm* — Robert C. Kowert; Kowert, Hood, Munyon, Rankin & Goetzel, P.C.

(57) ABSTRACT

A system comprises an encoder configured to compress attribute information for a point cloud and/or a decoder configured to decompress compressed attribute information. Attribute values for at least one starting point are included in a compressed attribute information file and attribute correction values are included in the compressed attribute information file. Attribute values are predicted based, at least in part, on attribute values of neighboring points. The predicted attribute values are compared to attribute values of a point cloud prior to compression to determine attribute correction values. In order to improve computing efficiency and/or repeatability, fixed-point number representations are used when determining predicted attribute values and attribute correction values. A decoder follows a similar prediction process as an encoder and corrects predicted values using attribute correction values included in a compressed attribute information file using fixed-point number representations.

20 Claims, 20 Drawing Sheets

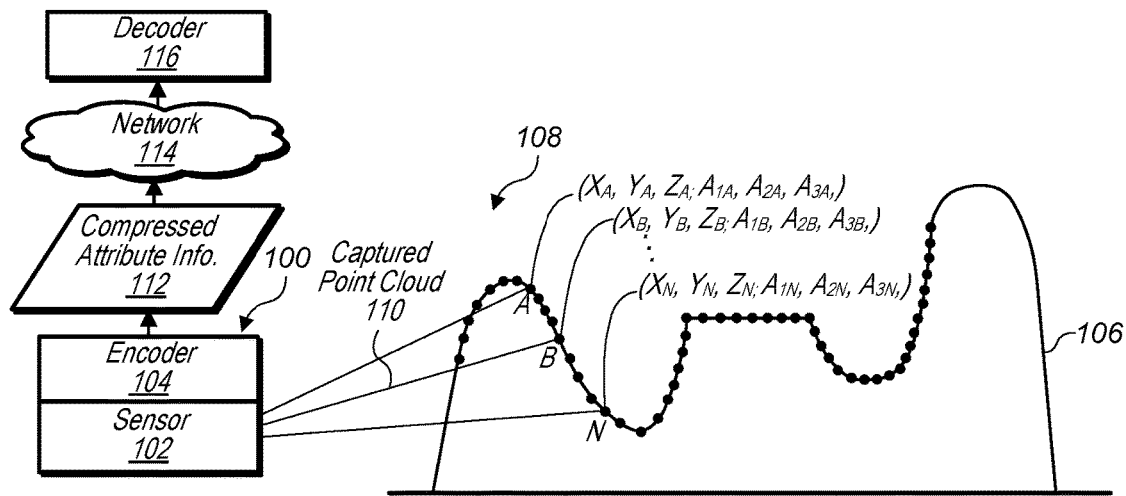
FIG. 1A
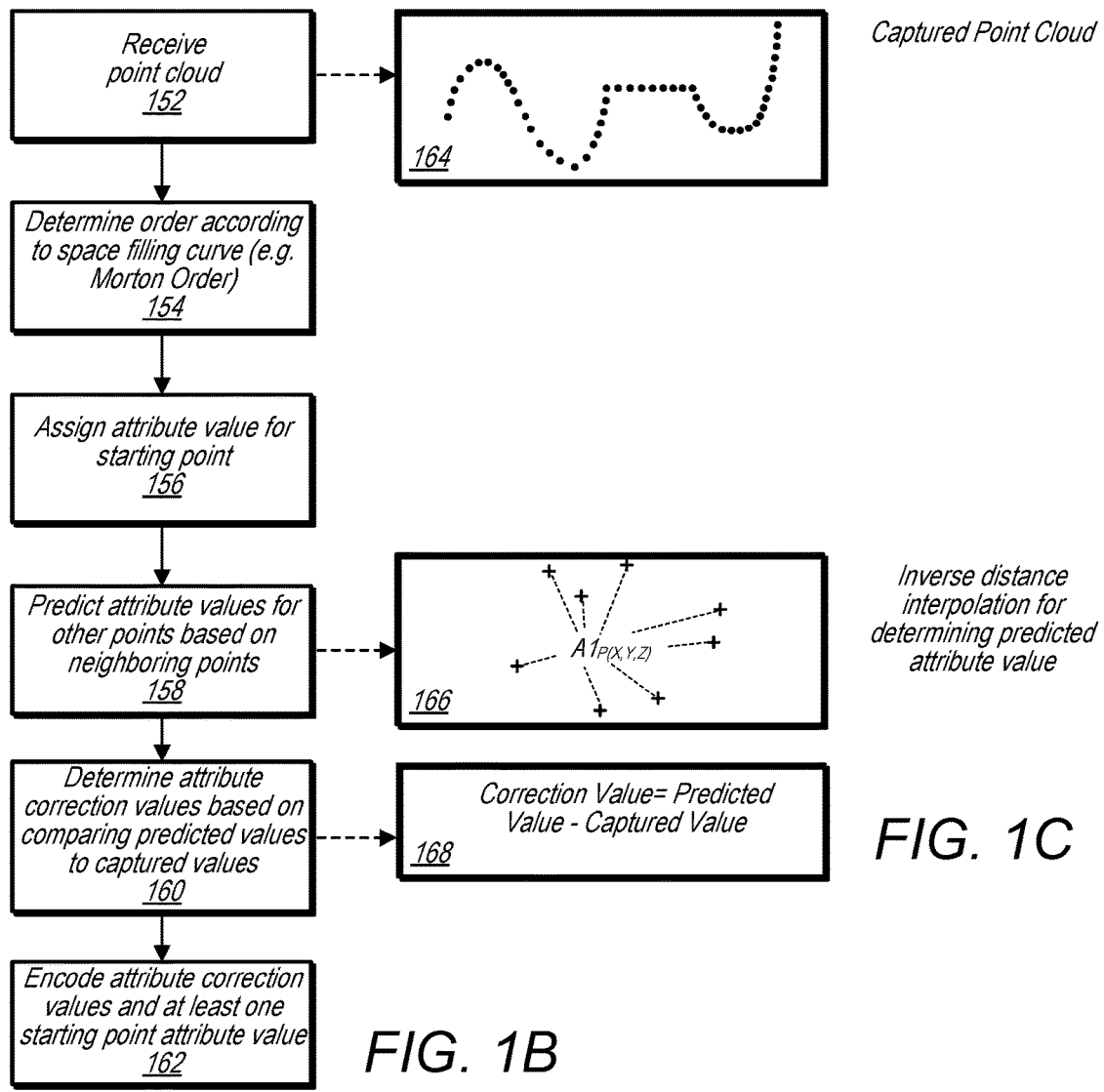
FIG. 1B
FIG. 1C

*Example Adaptive Distance-Based Prediction*

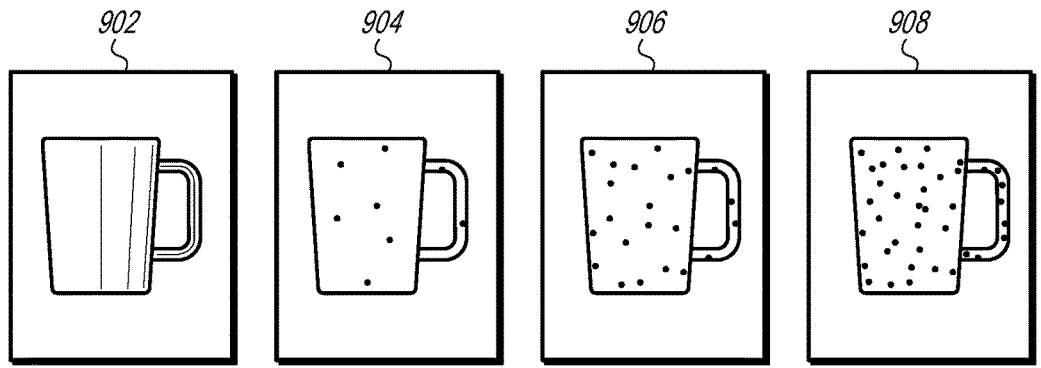

*Level of Details* →

FIG. 9A

Compressed Attribute Information File — 950

| Configuration Information | 952 |
| --- | --- |
| N (Number of Levels of Detail)<br>S (Level of Detail Initial Sampling Distance)<br>F (Sampling Distance Update Factor)<br>K (Number of nearest neighbors to identify)<br>C (Context encoding configuration(s))<br>AI (Additional configuration information) | |

Point Cloud Data — 954
Attribute Information for Starting Points
$(X_A, Y_A, Z_A; A_{1A}, A_{2A}, A_{3A},)$; $(Point\ N, A_{1N}, A_{2N}, A_{3N},)$, ...

Point Attribute Correction Values LOD1 — 956
- Point A
  - Attribute 1 — +1
  - Attribute 2 — −1
  - Attribute 3 — 0
- Point B
  - Attribute 1 — +2
  - Attribute 2 — −2

Point Attribute Correction Values LOD2
- Point C
  - Attribute 1 — +2
  - Attribute 2 — −3
- Point D
  - Attribute 1 — +1
  - Attribute 2 — 0
  - Attribute 3 — −2

FIG. 9B

POINT CLOUD COMPRESSION USING FIXED-POINT NUMBERS

PRIORITY CLAIM

This application claims benefit of priority to U.S. Provisional Application Ser. No. 62/740,877, entitled "Point Cloud Compression Using Fixed-Point Numbers", filed Oct. 3, 2018, and which is incorporated herein by reference in its entirety.

BACKGROUND

Technical Field

This disclosure relates generally to compression and decompression of point clouds comprising a plurality of points, each having associated attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In some embodiments, a system includes one or more sensors configured to capture points that collectively make up a point cloud, wherein each of the points comprises spatial information identifying a spatial location of the respective point and attribute information defining one or more attributes associated with the respective point. The system also include an encoder configured to compress the attribute information for the points. To compress the attribute information, the encoder is configured to organize a points of the point cloud into an order according to a space filling curve based on respective spatial positions of the plurality of points of the point cloud in 3D space. The encoder is also configured to assign an attribute value to at least one point of the point cloud based on the attribute information included in the captured point cloud. Additionally, the encoder is configured to, for each of respective other ones of the points of the point cloud, identify a set of neighboring points, determine a predicted attribute value for the respective point based, at least in part, on predicted or assigned attributes values for the neighboring points, and determine, based, at least in part, on comparing the predicted attribute value for the respective point to the attribute information for the point included in the captured point cloud, an attribute correction value for the point. The encoder is configured to select points to be included in the one or more additional levels of detail based, at least in part, on their respective positions in the order according to the space filling curve. Also, the encoder is configured to select neighboring points to use to determine the predicted attribute value for the respective point for which an attribute value is being predicted based, at least in part, on their respective positions in the space filling relative to the respective point for which an attribute value is being predicted. The encoder is further configured to encode the compressed attribute information for the point cloud, wherein the compressed attribute information comprises the assigned attribute value for the at least one point and data indicating, for the respective other ones of the points, the respective determined attribute correction values.

In some embodiments, a method comprises determining an order for a plurality of points of a point cloud according to a space filling curve based on respective spatial positions of the points of the point cloud in 3D space. The method also comprises determining predicted attribute values for points of the point cloud included in a first level of detail or one or more additional levels of detail based on neighboring points in a same level of detail as the point for which a predicted attribute value is being determined, wherein points to be included in the first level of detail and the one or more additional levels of detail are selected based, at least in part, on their respective positions in the order according to the space filling curve, and wherein the neighboring points used to determine the predicted attribute value, for the point for which an attribute value is being predicted, are selected based, at least in part, on their respective positions in the order according to the space filling curve relative to the point for which an attribute value is being predicted. Additionally, the method comprises determining attribute correction values for the points of the point cloud included in the first level of detail or the one or more additional levels of detail based on comparing the determined predicted attribute values for the points to attribute values of corresponding points of the point cloud. Furthermore, the method comprises applying an update operation to smooth the attribute correction values, wherein the update operation takes into account relative influences of the attributes of the points of a given level of detail on attribute values of points included in other levels of detail and encoding the updated attribute correction values.

In some embodiments, a system includes a decoder configured to: receive compressed attribute information for a point cloud comprising at least one assigned attribute value for at least one point of the point cloud and data indicating, for other points of the point cloud, respective attribute correction values for respective attributes of the other points. The decoder is further configured to, for each of respective other ones of the points of the point cloud other than the at least one point, identify a set of neighboring points to a point being evaluated, determine a predicted attribute value for the point being evaluated based, at least in part, on predicted or assigned attribute values for the neighboring points, and adjust the predicted attribute value for the point being evaluated based, at least in part, on an attribute correction value for the point included in the compressed attribute information. The decoder is configured to select the neighboring points used to determine the predicted attribute value for a point for which an attribute value is being predicted based, at least in part, on their respective positions in a space filling curve relative to the point for which an attribute value is being predicted. The decoder is further configured to provide attribute information for a decompressed point cloud that is being reconstructed, the attribute information comprising the at least one assigned attribute value for the at least one point and the adjusted predicted attribute values for the other ones of the points.

In some embodiments, a non-transitory computer-readable medium stores program instructions, that when executed on one or more processors, cause the one or more processors to implement an encoder as described herein.

In some embodiments, a non-transitory computer-readable medium stores program instructions, that when executed on one or more processors, cause the one or more processors to implement a decoder as described herein.

BRIEF DESCRIPTION OF THE DRAWINGS

FIG. 1A illustrates a system comprising a sensor that captures information for points of a point cloud and an encoder that compresses attribute information and/or spatial information of the point cloud, where the compressed point cloud information is sent to a decoder, according to some embodiments.

FIG. 1B illustrates a process for encoding attribute information of a point cloud, according to some embodiments.

FIG. 1C illustrates representative views of point cloud information at different stages of an encoding process, according to some embodiments.

FIG. 9A illustrates an example level of detail (LOD) structure, according to some embodiments.

FIG. 9B illustrates an example compressed point cloud file comprising level of details for a point cloud (LODs), according to some embodiments.

Figure 2A:
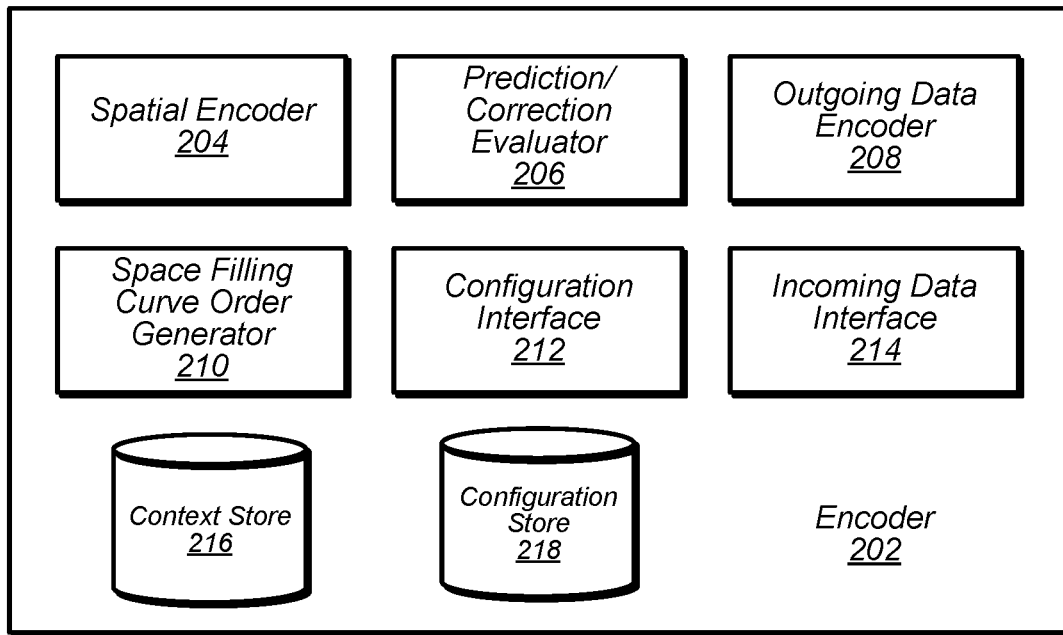
FIG. 2A illustrates components of an encoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute information and/or spatial information (also referred to herein as geometry information) of a point cloud file such that the point cloud file may be stored and transmitted more quickly than non-compressed point clouds and in a manner such that the point cloud file may occupy less storage space than non-compressed point clouds. In some embodiments, compression of spatial information and/or attributes of points in a point cloud may enable a point cloud to be communicated over a network in real-time or in near real-time. For example, a system may include a sensor that captures spatial information and/or attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud.

In some embodiments, attribute information may comprise string values, such as different modalities. For example attribute information may include string values indicating a modality such as "walking", "running", "driving", etc. In some embodiments, an encoder may comprise a "string-value" to integer index, wherein certain strings are associated with certain corresponding integer values. In some embodiments, a point cloud may indicate a string value for a point by including an integer associated with the string value as an attribute of the point. The encoder and decoder may both store a common string value to integer index, such that the decoder can determine string values for points based on looking up the integer value of the string attribute of the point in a string value to integer index of the decoder that matches or is similar to the string value to integer index of the encoder.

In some embodiments, an encoder compresses and encodes spatial information of a point cloud to compress the spatial information in addition to compressing attribute information for attributes of the points of the point cloud. For example, to compress spatial information a K-D tree may be generated wherein, respective numbers of points included in each of the cells of the K-D tree are encoded. This sequence of encoded point counts may encode spatial information for points of a point cloud. Also, in some embodiments, a sub-sampling and prediction method may be used to compress and encode spatial information for a point cloud. In some embodiments, the spatial information may be quantized prior to being compressed and encoded. Also, in some embodiments, compression of spatial information may be lossless. Thus, a decoder may be able to determine a same view of the spatial information as an encoder. Also, for lossy encoding, an encoder may be able to determine a view of the spatial information a decoder will encounter once the compressed spatial information is decoded. Because, both an encoder and decoder may have or be able to recreate the same spatial information for the point cloud, spatial relationships may be used to compress attribute information for the point cloud.

For example, in many point clouds, attribute information between adjacent points or points that are located at relatively short distances from each other may have high levels of correlation between attributes, and thus relatively small differences in point attribute values. For example, proximate points in a point cloud may have relatively small differences in color, when considered relative to points in the point cloud that are further apart.

In some embodiments, an encoder may include a predictor that determines a predicted attribute value of an attribute of a point in a point cloud based on attribute values for similar attributes of neighboring points in the point cloud and based on respective distances between the point being evaluated and the neighboring points. In some embodiments, attribute values of attributes of neighboring points that are closer to a point being evaluated may be given a higher weighting than attribute values of attributes of neighboring points that are further away from the point being evaluated. Also, the encoder may compare a predicted attribute value to an actual attribute value for an attribute of the point in the original point cloud prior to compression. A residual difference, also referred to herein as an "attribute correction value" may be determined based on this comparison. An attribute correction value may be encoded and included in compressed attribute information for the point cloud, wherein a decoder uses the encoded attribute correction value to correct a predicted attribute value for the point, wherein the attribute value is predicted using a same or similar prediction methodology at the decoder that is the same or similar to the prediction methodology that was used at the encoder.

In some embodiments, to encode attribute values an encoder may generate an ordering of points of a point cloud based on spatial information for the points of the point cloud. For example, the points may be ordered according a space-filling curve. In some embodiments, this ordering may represent a Morton ordering of the points. The encoder may select a first point as a starting point and may determine an evaluation order for other ones of the points of the point cloud based on minimum distances from the starting point to a closest neighboring point, and a subsequent minimum distance from the neighboring point to the next closest neighboring point, etc. Also, in some embodiments, neighboring points may be determined from a sub-group of points within a user-defined search range of an index value of a given point being evaluated, wherein the index value and the search range values are values in an index of the points of the point cloud organized according to the space filling curve. In this way, an evaluation order for determining predicted attribute values of the points of the point cloud may be determined. Because the decoder may receive or re-create the same spatial information as the spatial information used by the encoder, the decoder may generate the same ordering of the points for the point cloud and may determine the same evaluation order for the points of the point cloud.

In some embodiments, an encoder may assign an attribute value for a starting point of a point cloud to be used to predict attribute values of other points of the point cloud. An encoder may predict an attribute value for a neighboring point to the starting point based on the attribute value of the starting point and a distance between the starting point and the neighboring point. The encoder may then determine a difference between the predicted attribute value for the neighboring point and the actual attribute value for the neighboring point included in the non-compressed original point cloud. This difference may be encoded in a compressed attribute information file as an attribute correction value for the neighboring point. The encoder may then repeat a similar process for each point in the evaluation order. To predict the attribute value for subsequent points in the evaluation order, the encoder may identify the K-nearest neighboring points to a particular point being evaluated, wherein the identified K-nearest neighboring points have assigned or predicted attribute values. In some embodiments, "K" may be a configurable parameter that is communicated from an encoder to a decoder.

The encoder may determine a distance in X, Y, and Z space between a point being evaluated and each of the identified neighboring points. For example, the encoder may determine respective Euclidian distances from the point being evaluated to each of the neighboring points. The encoder may then predict an attribute value for an attribute of the point being evaluated based on the attribute values of the neighboring points, wherein the attribute values of the neighboring points are weighted according to an inverse of the distances from the point being evaluated to the respective ones of the neighboring points. For example, attribute values of neighboring points that are closer to the point being evaluated may be given more weight than attribute values of neighboring points that are further away from the point being evaluated.

In a similar manner as described for the first neighboring point, the encoder may compare a predicted value for each of the other points of the point cloud to an actual attribute value in an original non-compressed point cloud, for example the captured point cloud. The difference may be encoded as an attribute correction value for an attribute of one of the other points that is being evaluated. In some embodiments, attribute correction values may be encoded in an order in a compressed attribute information file in accordance with the evaluation order determined based on the space filling curve order. Because the encoder and the decoder may determine the same evaluation order based on the spatial information for the point cloud, the decoder may determine which attribute correction value corresponds to which attribute of which point based on the order in which the attribute correction values are encoded in the compressed attribute information file. Additionally, the starting point and one or more attribute value(s) of the starting point may be explicitly encoded in a compressed attribute information file such that the decoder may determine the evaluation order starting with the same point as was used to start the evaluation order at the encoder. Additionally, the one or more attribute value(s) of the starting point may provide a value of a neighboring point that a decoder uses to determine a predicted attribute value for a point being evaluated that is a neighboring point to the starting point.

In some embodiments, an encoder may determine a predicted value for an attribute of a point based on temporal considerations. For example, in addition to or in place of determining a predicted value based on neighboring points in a same "frame" e.g. point in time as the point being evaluated, the encoder may consider attribute values of the point in adjacent and subsequent time frames.

FIG. 1A illustrates a system comprising a sensor that captures information for points of a point cloud and an encoder that compresses attribute information of the point cloud, where the compressed attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed attribute information 112) that is transmitted via network 114 to decoder 116. In some embodiments, a compressed version of the point cloud, such as compressed attribute information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

FIG. 1B illustrates a process for encoding compressed attribute information of a point cloud, according to some embodiments. Also, FIG. 1C illustrates representative views of point cloud information at different stages of an encoding process, according to some embodiments.

At 152, an encoder, such as encoder 104, receives a captured point cloud or a generated point cloud. For example, in some embodiments a point cloud may be captured via one or more sensors, such as sensor 102, or may be generated in software, such as in a virtual reality or augmented reality system. For example, 164 illustrates an example captured or generated point cloud. Each point in the point cloud shown in 164 may have one or more attributes associated with the point. Note that point cloud 164 is shown in 2D for ease of illustration, but may include points in 3D space.

At 154, an ordering of the points of the point cloud is determined according to a space filling curve. For example, a space filling curve may fill a three dimensional space and points of a point cloud may be ordered based on where they lie relative to the space filling curve. For example, a Morton code may be used to represent multi-dimensional data in one dimension, wherein a "Z-Order function" is applied to the multidimensional data to result in the one dimensional representation. In some embodiments, as discussed in more detail herein, the points may also be ordered into multiple levels of detail (LODs). In some embodiments, points to be included in respective levels of details (LODs) may be determined by ordering the points according to their location along a space filling curve. For example, the points may be organized according to their Morton codes.

In some embodiments, other space filling curves could be used. For example, techniques to map positions (e.g., in X, Y, Z coordinate form) to a space filling curve such as a Morton-order (or Z-order), Halbert curve, Peano curve, and so on may be used. In this way all of the points of the point cloud that are encoded and decoded using the spatial information may be organized into an index in the same order on the encoder and the decoder. In order to determine various refinement levels, sampling rates, etc. the ordered index of the points may be used. For example, to divide a point cloud into four levels of detail, an index that maps a Morton value to a corresponding point may be sampled, for example at a rate of four, where every fourth indexed point is included in the lowest level refinement. For each additional level of refinement remaining points in the index that have not yet been sampled may be sampled, for example every third index point, etc. until all of the points are sampled for a highest level of detail At 156, an attribute value for one or more attributes of a starting point may be assigned to be encoded and included in compressed attribute information for the point cloud. As discussed above, predicted attribute values for points of a point cloud may be determined based on attribute values of neighboring points. However, an initial attribute value for at least one point is provided to a decoder so that the decoder may determine attribute values for other points using at least the initial attribute value and attribute correction values for correcting predicted attribute values that are predicted based on the initial attribute value. Thus, one or more attribute values for at least one starting point are explicitly encoded in a compressed attribute information file. Additionally, spatial information for the starting point may be explicitly encoded such that the starting point may be identified by a decoder to determine which point of the points of the point cloud is to be used as a starting point for generating an order according to a space-filling curve. In some embodiments, a starting point may be indicated in other ways other than explicitly encoding the spatial information for the starting point, such as flagging the starting point or other methods of point identification.

Because a decoder will receive an indication of a starting point and will encounter the same or similar spatial information for the points of the point cloud as the encoder, the decoder may determine a same space filling curve order from the same starting point as was determined by the encoder. Additionally, the decoder may determine a same processing order as the encoder based on the space filling curve order determined by the decoder.

At 158, for a current point being evaluated, a prediction/correction evaluator of an encoder determines a predicted attribute value for an attribute of the point currently being evaluated. In some embodiments, a point currently being evaluated may have more than one attribute. Accordingly, a prediction/correction evaluator of an encoder may predict more than one attribute value for the point. For each point being evaluated, the prediction/correction evaluator may identify a set of nearest neighboring points that have assigned or predicted attribute values. In some embodiments, a number of neighboring points to identify, "K", may be a configurable parameter of an encoder and the encoder may include configuration information in a compressed attribute information file indicating the parameter "K" such that a decoder may identify a same number of neighboring points when performing attribute prediction. The prediction/correction evaluator may then determine distances between the point being evaluated and respective ones of the identified neighboring points. The prediction/correction evaluator may use an inverse distance interpolation method to predict an attribute value for each attribute of the point being evaluated. The prediction/correction evaluator may then predict an attribute value of the point being evaluated based on an average of inverse-distance weighted attribute values of the identified neighboring points.

For example, 166 illustrates a point (X,Y,Z) being evaluated wherein attribute A1 is being determined based on inverse distance weighted attribute values of eight identified neighboring points.

At 160, an attribute correction value is determined for each point. The attribute correction value is determined based on comparing a predicted attribute value for each attribute of a point to corresponding attribute values of the point in an original non-compressed point cloud, such as the captured point cloud. For example, 168 illustrates an equation for determining attribute correction values, wherein a captured value is subtracted from a predicted value to determine an attribute correction value. Note that while, FIG. 1B shows attribute values being predicted at 158 and attribute correction values being determined at 160, in some embodiments attribute correction values may be determined for a point subsequent to predicting an attribute value for the point. A next point may then be evaluated, wherein a predicted attribute value is determined for the point and an attribute correction value is determined for the point. Thus 158 and 160 may be repeated for each point being evaluated. In other embodiments, predicted values may be determined for multiple points and then attribute correction values may be determined. In some embodiments, predictions for subsequent points being evaluated may be based on predicted attribute values or may be based on corrected attribute values or both. In some embodiments, both an encoder and a decoder may follow the same rules as to whether predicted values for subsequent points are to be determined based on predicted or corrected attribute values.

At 162, the determined attribute correction values for the points of the point cloud, one or more assigned attribute values for the starting point, spatial information or other indicia of the starting point, and any configuration information to be included in a compressed attribute information file is encoded. As discussed in more detail in FIG. 5 various encoding methods, such as arithmetic encoding and/or Golomb encoding may be used to encode the attribute correction values, assigned attribute values, and the configuration information.

FIG. 2A illustrates components of an encoder, according to some embodiments.

Encoder 202 may be a similar encoder as encoder 104 illustrated in FIG. 1A. Encoder 202 includes spatial encoder 204, space filling curve order generator 210, prediction/correction evaluator 206, incoming data interface 214, and outgoing data interface 208. Encoder 202 also includes context store 216 and configuration store 218.

In some embodiments, a spatial encoder, such as spatial encoder 204, may compress spatial information associated with points of a point cloud, such that the spatial information can be stored or transmitted in a compressed format. In some embodiments, a spatial encoder, may utilize K-D trees to compress spatial information for points of a point cloud as discussed in more detail in regard to FIG. 7. Also, in some embodiments, a spatial encoder, such as spatial encoder 204, may utilize a sub-sampling and prediction technique as discussed in more detail in regard to FIGS. 6A-B. In some embodiments, a spatial encoder, such as spatial encoder 204, may utilize Octrees to compress spatial information for points of a point cloud or various other techniques to compression spatial information for points of a point cloud.

In some embodiments, compressed spatial information may be stored or transmitted with compressed attribute information or may be stored or transmitted separately. In either case, a decoder receiving compressed attribute information for points of a point cloud may also receive compressed spatial information for the points of the point cloud, or may otherwise obtain the spatial information for the points of the point cloud.

A space filling curve order generator, such as space filling curve order generator 210, may utilize spatial information for points of a point cloud to generate an indexed order of the points based on where the points fall along a space filling curve. For example Morton codes may be generated for the points of the point cloud. Because a decoder is provided or otherwise obtains the same spatial information for points of a point cloud as are available at the encoder, a space filling curve order determined by a space filling curve order generator of an encoder, such as space filling curve order generator 210 of encoder 202, may be the same or similar as a space filling curve order generated by a space filling curve order generator of a decoder, such as space filling curve order generator 228 of decoder 220.

A prediction/correction evaluator, such as prediction/correction evaluator 206 of encoder 202, may determine predicted attribute values for points of a point cloud based on an inverse distance interpolation method using attribute values of the K-nearest neighboring points of a point for whom an attribute value is being predicted. The prediction/correction evaluator may also compare a predicted attribute value of a point being evaluated to an original attribute value of the point in a non-compressed point cloud to determine an attribute correction value. In some embodiments, a prediction/correction evaluator, such as prediction/correction evaluator 206 of encoder, 202 may adaptively adjust a prediction strategy used to predict attribute values of points in a given neighborhood of points based on a measurement of the variability of the attribute values of the points in the neighborhood.

An outgoing data encoder, such as outgoing data encoder 208 of encoder 202, may encode attribute correction values and assigned attribute values included in a compressed attribute information file for a point cloud. In some embodiments, an outgoing data encoder, such as outgoing data encoder 208, may select an encoding context for encoding a value, such as an assigned attribute value or an attribute correction value, based on a number of symbols included in the value. In some embodiments, values with more symbols may be encoded using an encoding context comprising Golomb exponential encoding, whereas values with fewer symbols may be encoded using arithmetic encoding. In some embodiments, encoding contexts may include more than one encoding technique. For example, a portion of a value may be encoded using arithmetic encoding while another portion of the value may be encoded using Golomb exponential encoding. In some embodiments, an encoder, such as encoder 202, may include a context store, such as context store 216, that stores encoding contexts used by an outgoing data encoder, such as outgoing data encoder 208, to encode attribute correction values and assigned attribute values.

In some embodiments, an encoder, such as encoder 202, may also include an incoming data interface, such as incoming data interface 214. In some embodiments, an encoder may receive incoming data from one or more sensors that capture points of a point cloud or that capture attribute information to be associated with points of a point cloud. For example, in some embodiments, an encoder may receive data from an LIDAR system, 3-D-camera, 3-D scanner, etc. and may also receive data from other sensors, such as a gyroscope, accelerometer, etc. Additionally, an encoder may receive other data such as a current time from a system clock, etc. In some embodiments, such different types of data may be received by an encoder via an incoming data interface, such as incoming data interface 214 of encoder 202.

In some embodiments, an encoder, such as encoder 202, may further include a configuration interface, such as configuration interface 212, wherein one or more parameters used by the encoder to compress a point cloud may be adjusted via the configuration interface. In some embodiments, a configuration interface, such as configuration interface 212, may be a programmatic interface, such as an API. Configurations used by an encoder, such as encoder 202, may be stored in a configuration store, such as configuration store 218.

In some embodiments, an encoder, such as encoder 202, may include more or fewer components than shown in FIG. 2A.

Figure 2B:
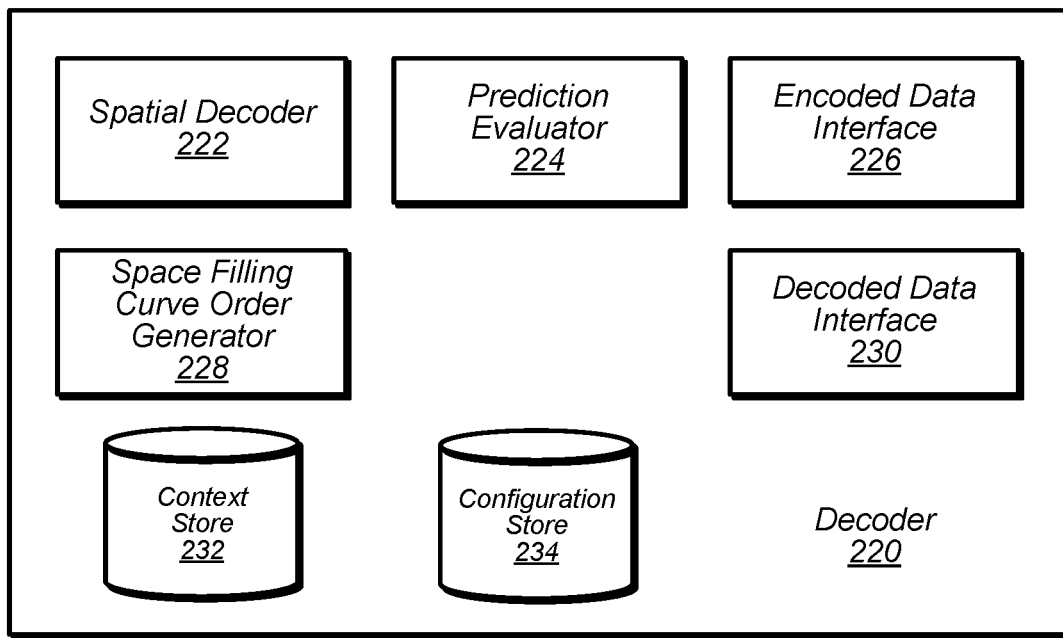
FIG. 2B illustrates components of a decoder, according to some embodiments.

FIG. 2B illustrates components of a decoder, according to some embodiments.

Decoder 220 may be a similar decoder as decoder 116 illustrated in FIG. 1A. Decoder 220 includes encoded data interface 226, spatial decoder 222, space filling curve order generator 228, prediction evaluator 224, context store 232, configuration store 234, and decoded data interface 220.

A decoder, such as decoder 220, may receive an encoded compressed point cloud and/or an encoded compressed attribute information file for points of a point cloud. For example, a decoder, such as decoder 220, may receive a compressed attribute information file, such a compressed attribute information 112 illustrated in FIG. 1A or compressed attribute information file 300 illustrated in FIG. 3. The compressed attribute information file may be received by a decoder via an encoded data interface, such as encoded data interface 226. The encoded compressed point cloud may be used by the decoder to determine spatial information for points of the point cloud. For example, spatial information of points of a point cloud included in a compressed point cloud may be generated by a spatial information generator, such as spatial information generator 222. In some embodiments, a compressed point cloud may be received via an encoded data interface, such as encoded data interface 226, from a storage device or other intermediary source, wherein the compressed point cloud was previously encoded by an encoder, such as encoder 104.

In some embodiments, an encoded data interface, such as encoded data interface 226, may decode spatial information. For example the spatial information may have been encoded using various encoding techniques such as arithmetic encoding, Golomb encoding, etc. A spatial information generator, such as spatial information generator 222, may receive decoded spatial information from an encoded data interface, such as encoded data interface 226, and may use the decoded spatial information to generate a representation of the geometry of the point cloud being de-compressed. For example, decoded spatial information may be formatted as residual values to be used in a sub-sampled prediction method to recreate a geometry of a point cloud to be decompressed. In such situations, the spatial information generator 222, may recreate the geometry of the point cloud being decompressed using decoded spatial information from encoded data interface 226, and space filling curve order generator 228 may determine a space filling curve order for the point cloud being decompressed based on the recreated geometry for the point cloud being decompressed generated by spatial information generator 222.

Once spatial information for a point cloud is determined and a space-filling curve order has been determined, the space-filling curve order may be used by a prediction evaluator of a decoder, such as prediction evaluator 224 of decoder 220, to determine an evaluation order for determining attribute values of points of the point cloud. Additionally, the space-filling curve order may be used by a prediction evaluator, such as prediction evaluator 224, to identify nearest neighboring points to a point being evaluated.

A prediction evaluator of a decoder, such as prediction evaluator 224, may select a starting point based on an assigned starting point included in a compressed attribute information file. In some embodiments, the compressed attribute information file may include one or more assigned values for one or more corresponding attributes of the starting point. In some embodiments, a prediction evaluator, such as prediction evaluator 224, may assign values to one or more attributes of a starting point in a decompressed model of a point cloud being decompressed based on assigned values for the starting point included in a compressed attribute information file. A prediction evaluator, such as prediction evaluator 224, may further utilize the assigned values of the attributes of the starting point to determine attribute values of neighboring points. For example, a prediction evaluator may select a neighboring point to the starting point as a next point to evaluate, wherein the neighboring point is selected based on an index order of the points according to the space-filling curve order. Note that because the space-filling curve order is generated based on the same or similar spatial information at the decoder as was used to generate a space-filling curve order at an encoder, the decoder may determine the same evaluation order for evaluating the points of the point cloud being decompressed as was determined at the encoder by identifying next nearest neighbors in an index according to the space-filling curve order.

Once the prediction evaluator has identified the "K" nearest neighboring points to a point being evaluated, the prediction evaluator may predict one or more attribute values for one or more attributes of the point being evaluated based on attribute values of corresponding attributes of the "K" nearest neighboring points. In some embodiments, an inverse distance interpolation technique may be used to predict an attribute value of a point being evaluated based on attribute values of neighboring points, wherein attribute values of neighboring points that are at a closer distance to the point being evaluated are weighted more heavily than attribute values of neighboring points that are at further distances from the point being evaluated. In some embodiments, a prediction evaluator of a decoder, such as prediction evaluator 224 of decoder 220, may adaptively adjust a prediction strategy used to predict attribute values of points in a given neighborhood of points based on a measurement of the variability of the attribute values of the points in the neighborhood. For example, in embodiments wherein adaptive prediction is used, the decoder may mirror prediction adaptation decisions that were made at an encoder. In some embodiments, adaptive prediction parameters may be included in compressed attribute information received by the decoder, wherein the parameters were signaled by an encoder that generated the compressed attribute information. In some embodiments, a decoder may utilize one or more default parameters in the absence of a signaled parameter, or may infer parameters based on the received compressed attribute information.

A prediction evaluator, such as prediction evaluator 224, may apply an attribute correction value to a predicted attribute value to determine an attribute value to include for the point in a decompressed point cloud. In some embodiments, an attribute correction value for an attribute of a point may be included in a compressed attribute information file. In some embodiments, attribute correction values may be encoded using one of a plurality of supported coding contexts, wherein different coding contexts are selected to encode different attribute correction values based on a number of symbols included in the attribute correction value. In some embodiments, a decoder, such as decoder 220, may include a context store, such as context store 232, wherein the context store stores a plurality of encoding context that may be used to decode assigned attribute values or attribute correction values that have been encoded using corresponding encoding contexts at an encoder.

A decoder, such as decoder 220, may provide a decompressed point cloud generated based on a received compressed point cloud and/or a received compressed attribute information file to a receiving device or application via a decoded data interface, such as decoded data interface 230. The decompressed point cloud may include the points of the point cloud and attribute values for attributes of the points of the point cloud. In some embodiments, a decoder may decode some attribute values for attributes of a point cloud without decoding other attribute values for other attributes of a point cloud. For example, a point cloud may include color attributes for points of the point cloud and may also include other attributes for the points of the point cloud, such as velocity, for example. In such a situation, a decoder may decode one or more attributes of the points of the point cloud, such as the velocity attribute, without decoding other attributes of the points of the point cloud, such as the color attributes.

In some embodiments, the decompressed point cloud and/or decompressed attribute information file may be used to generate a visual display, such as for a head mounted display. Also, in some embodiments, the decompressed point cloud and/or decompressed attribute information file may be provided to a decision making engine that uses the decompressed point cloud and/or decompressed attribute information file to make one or more control decisions. In some embodiments, the decompressed point cloud and/or decompressed attribute information file may be used in various other applications or for various other purposes.

Figure 3:
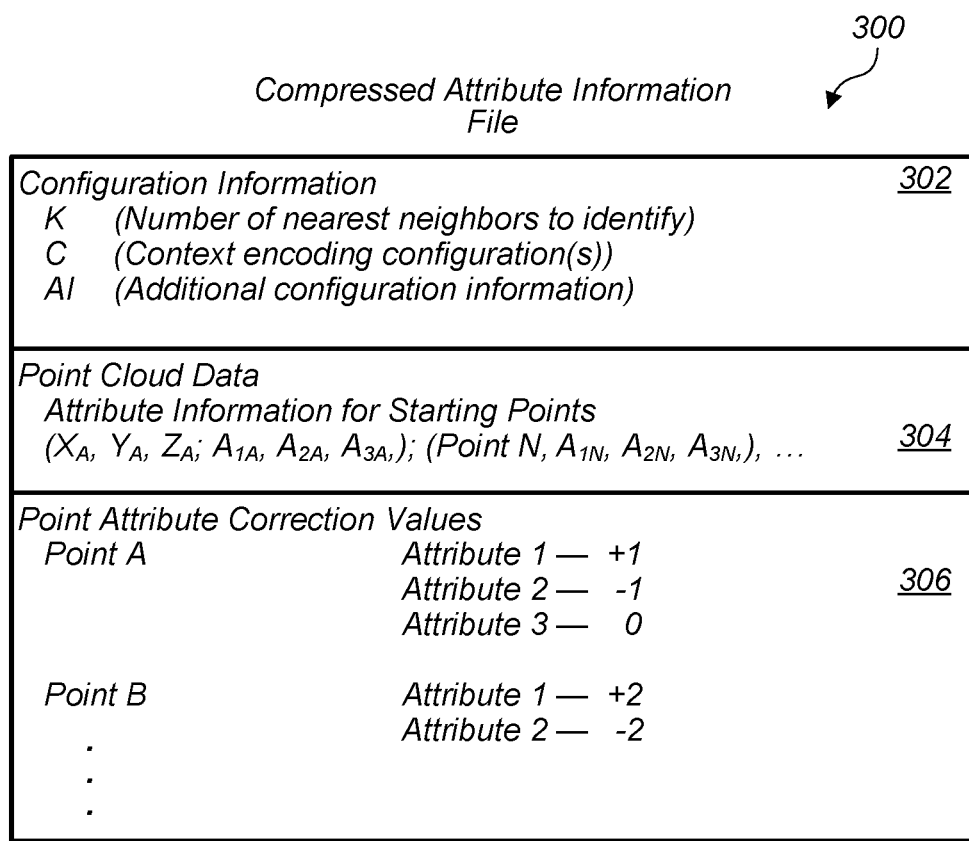
FIG. 3 illustrates an example compressed attribute file, according to some embodiments.

FIG. 3 illustrates an example compressed attribute information file, according to some embodiments. Attribute information file 300 includes configuration information 302, point cloud data 304, and point attribute correction values 306. In some embodiments, point cloud file 300 may be communicated in parts via multiple packets. In some embodiments, not all of the sections shown in attribute information file 300 may be included in each packet transmitting compressed attribute information. In some embodiments, an attribute information file, such as attribute information file 300, may be stored in a storage device, such as a server that implements an encoder or decoder, or other computing device. In some embodiments, additional configuration information may include adaptive prediction parameters, such as a variability measurement technique to use to determine a variability measurement for a neighborhood of points, a threshold variability value to trigger use of a particular prediction procedure, one or more parameters for determining a size of a neighborhood of points for which variability is to be determined, etc.

Figure 4A:
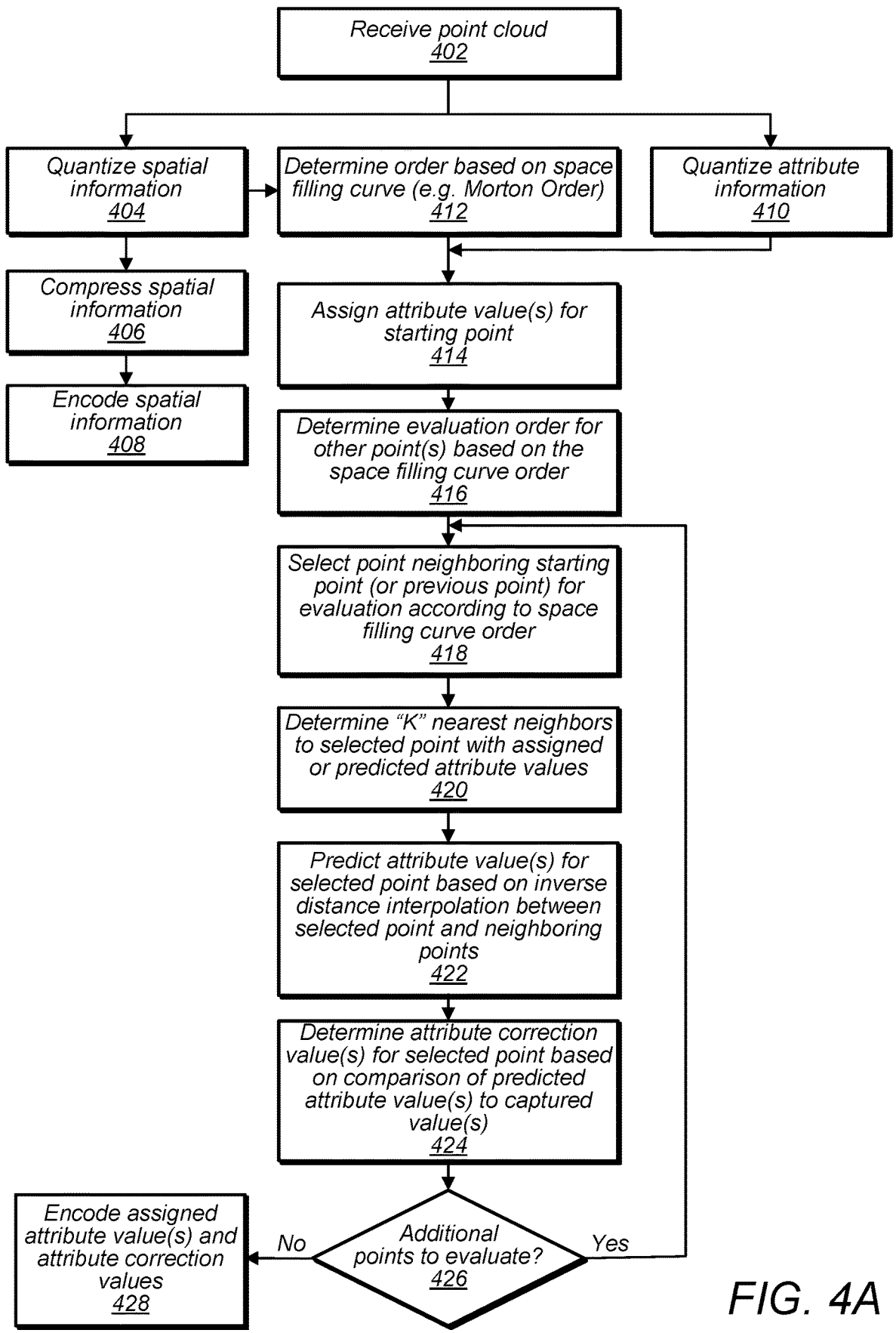
FIG. 4A illustrates a process for compressing attribute information of a point cloud, according to some embodiments.

FIG. 4A illustrates a process for compressing attribute information of a point cloud, according to some embodiments.

At 402, an encoder receives a point cloud that includes attribute information for at least some of the points of the point cloud. The point cloud may be received from one or more sensors that capture the point cloud, or the point cloud may be generated in software. For example, a virtual reality or augmented reality system may have generated the point cloud.

At 404, the spatial information of the point cloud, for example X, Y, and Z coordinates for the points of the point cloud may be quantized. In some embodiments, coordinates may be rounded off to the nearest measurement unit, such as a meter, centimeter, millimeter, etc.

At 406, the quantized spatial information is compressed. In some embodiments, spatial information may be compressed using a sub-sampling and subdivision prediction technique as discussed in more detail in regard to FIGS. 6A-B. Also, in some embodiments, spatial information may be compressed using a K-D tree compression technique as discussed in more detail in regard to FIG. 7, or may be compressed using an Octree compression technique. In some embodiments, other suitable compression techniques may be used to compress spatial information of a point cloud.

At 408, the compressed spatial information for the point cloud is encoded as a compressed point cloud file or a portion of a compressed point cloud file. In some embodiments, compressed spatial information and compressed attribute information may be included in a common compressed point cloud file, or may be communicated or stored as separate files.

At 412, the received spatial information of the point cloud is used to generate an indexed point order according to a space-filling curve. In some embodiments, the spatial information of the point cloud may be quantized before generating the order according to the space-filling curve. Additionally, in some embodiments wherein a lossy compression technique is used to compress the spatial information of the point cloud, the spatial information may be lossy encoded and lossy decoded prior to generating the order according to the space filling curve. In embodiments that utilize lossy compression for spatial information, encoding and decoding the spatial information at the encoder may ensure that an order according to a space filling curve generated at the encoder will match an order according to the space filling curve that will be generated at a decoder using decoded spatial information that was previously lossy encoded.

Additionally, in some embodiments, at 410, attribute information for points of the point cloud may be quantized. For example attribute values may be rounded to whole numbers or to particular measurement increments. In some embodiments wherein attribute values are integers, such as when integers are used to communicate string values, such as "walking", "running", "driving", etc., quantization at 410 may be omitted.

At 414, attribute values for a starting point are assigned. The assigned attribute values for the starting point are encoded in a compressed attribute information file along with attribute correction values. Because a decoder predicts attribute values based on distances to neighboring points and attribute values of neighboring points, at least one attribute value for at least one point is explicitly encoded in a compressed attribute file. In some embodiments, points of a point cloud may comprise multiple attributes and at least one attribute value for each type of attribute may be encoded for at least one point of the point cloud, in such embodiments. In some embodiments, a starting point may be a first point evaluated when determining the order according to the space filling curve at 412. In some embodiments, an encoder may encode data indicating spatial information for a starting point and/or other indicia of which point of the point cloud is the starting point or starting points. Additionally, the encoder may encode attribute values for one or more attributes of the starting point.

At 416, the encoder determines an evaluation order for predicting attribute values for other points of the point cloud, other than the starting point, said predicting and determining attribute correction values, may be referred to herein as "evaluating" attributes of a point. The evaluation order may be determined based on the order according to the space filling curve.

At 418, a neighboring point of the starting point or of a subsequent point being evaluated is selected. In some embodiments, a neighboring point to be next evaluated may be selected based on the neighboring point being a next point in an indexed order of points according to a space filling curve.

At 420, the "K" nearest neighboring points to the point currently being evaluated are determined. The parameter "K" may be a configurable parameter selected by an encoder or provided to an encoder as a user configurable parameter. In order to select the "K" nearest neighboring points, an encoder may identify the first "K" nearest points to a point being evaluated according to the indexed order of points determined at 412 and respective distances between the points. For example, instead of determining the absolute nearest neighboring points to a point being evaluated, an encoder may select a sub-group of points of the point cloud having index values in the index according to the space-filling curve that are within a user defined search range, e.g. 8, 16, 32, 64, etc. of an index value of a particular point being evaluated. The encoder may then utilize distances within the sub-group of points to select the "K" nearest neighboring points to use for prediction. In some embodiments, only points having assigned attribute values or for which predicted attribute values have already been determined may be included in the "K" nearest neighboring points. In some embodiments various numbers of points may be identified. For example, in some embodiments, "K" may be 5 points, 10 points, 16 points, etc. Because a point cloud comprises points in 3-D space a particular point may have multiple neighboring points in multiple planes. In some embodiments, an encoder and a decoder may be configured to identify points as the "K" nearest neighboring points regardless of whether or not a value has already been predicted for the point. Also, in some embodiments, attribute values for points used in predication may be previously predicted attribute values or corrected predicted attribute values that have been corrected based on applying an attribute correction value. In either case, an encoder and a decoder may be configured to apply the same rules when identifying the "K" nearest neighboring points and when predicting an attribute value of a point based on attribute values of the "K" nearest neighboring points.

At 422, one or more attribute values are determined for each attribute of the point currently being evaluated. The attribute values may be determined based on an inverse distance interpolation. The inverse distance interpolation may interpolate the predicted attribute value based on the attribute values of the "K" nearest neighboring points. The attribute values of the "K" nearest neighboring points may be weighted based on respective distances between respective ones of the "K" nearest neighboring points and the point being evaluated. Attribute values of neighboring points that are at shorter distances from the point currently being evaluated may be weighted more heavily than attribute values of neighboring points that are at greater distances from the point currently being evaluated.

At 424, attribute correction values are determined for the one or more predicted attribute values for the point currently being evaluated. The attribute correction values may be determined based on comparing the predicted attribute values to corresponding attribute values for the same point (or a similar point) in the point cloud prior to attribute information compression. In some embodiments, quantized attribute information, such as the quantized attribute information generated at 410, may be used to determine attribute correction values. In some embodiments, an attribute correction value may also be referred to as a "residual error" wherein the residual error indicates a difference between a predicted attribute value and an actual attribute value.

At 426, it is determined if there are additional points in the point cloud for which attribute correction values are to be determined. If there are additional points to evaluate, the process reverts to 418 and the next point in the evaluation order is selected to be evaluated. The process may repeat steps 418-426 until all or a portion of all of the points of the point cloud have been evaluated to determine predicted attribute values and attribute correction values for the predicted attribute values.

At 428, the determined attribute correction values, the assigned attribute values, and any configuration information for decoding the compressed attribute information file, such as a parameter "K", is encoded.

Adaptive Attribute Prediction

In some embodiments, an encoder as described above may further adaptively change a prediction strategy and/or a number of points used in a given prediction strategy based on attribute values of neighboring points. Also, a decoder may similarly adaptively change a prediction strategy and/or a number of points used in a given prediction strategy based on reconstructed attribute values of neighboring points.

For example, a point cloud may include points representing a road where the road is black with a white stripe on the road. A default nearest neighbor prediction strategy may be adaptively changed to take into account the variability of attribute values for points representing the white line and the black road. Because these points have a large difference in attribute values, a default nearest neighbor prediction strategy may result in blurring of the white line and/or high residual values that decrease a compression efficiency. However, an updated prediction strategy may account for this variability by selecting a better suited prediction strategy and/or by using less points in a K-nearest neighbor prediction. For example, for the black road, not using the white line points in a K-nearest neighbor prediction.

In some embodiments, before predicting an attribute value for a point P, an encoder or decoder may compute the variability of attribute values of points in a neighborhood of point P, for example the K-nearest neighboring points. In some embodiments, variability may be computed based on a variance, a maximum difference between any two attribute values (or reconstructed attribute values) of the points neighboring point P. In some embodiments, variability may be computed based on a weighted average of the neighboring points, wherein the weighted average accounts for distances of the neighboring points to point P. In some embodiments, variability for a group of neighboring points may be computed based on a weighted averages for attributes for the neighboring points and taking into account distances to the neighboring points. For example, $$\text{Variability} = E[(X-\text{weighted mean}(X))^2]$$

In the above equation, E is the mean attribute value of the points in the neighborhood of point P, the weighted mean(X) is a weighted mean of the attribute values of the points in the neighborhood of point P that takes into account the distances of the neighboring points from point P. In some embodiments, the variability may be calculated as the maximum difference compared to the mean value of the attributes, E(X), the weighted mean of the attributes, weighted mean (X), or the median value of the attributes, median(X). In some embodiments, the variability may be calculated using the average of the values corresponding to the x percent, e.g. x=10 that have the largest difference as compared to the mean value of the attributes, E(X), the weighted mean of the attributes, weighted mean(X), or the median value of the attributes, median(X).

In some embodiments, if the calculated variability of the attributes of the points in the neighborhood of point P is greater than a threshold value, then a rate-distortion optimization may be applied. For example, a rate-distortion optimization may reduce a number of neighboring points used in a prediction or switch to a different prediction technique. In some embodiments, the threshold may be explicitly written in the bit-stream. Also, in some embodiments, the threshold may be adaptively adjusted per point cloud, or sub-block of the point cloud or for a number of points to be encoded. For example, a threshold may be included in compressed attribute information file 350 as additional configuration information included in configuration information 302, as described in FIG. 3, or may be included in compressed attribute file 950 as additional configuration information included in configuration information 952, as described below in regard to FIG. 9B.

In some embodiments, different distortion measures may be used in a rate-distortion optimization procedure, such as sum of squares error, weighted sum of squares error, sum of absolute differences, or weighted sum of absolute differences.

In some embodiments, distortion could be computed independently for each attribute, or multiple attributes corresponding to the same sample and could be considered, and appropriately weighted. For example, distortion values for R, G, B or Y, U, V could be computed and then combined together linearly or non-linearly to generate an overall distortion value.

In some embodiments, advanced techniques for rate distortion quantization, such as trellis based quantization could also be considered where, instead of considering a single point in isolation multiple points are coded jointly. The coding process, for example, may select to encode all these multiple points using the method that results in minimizing a cost function of the form J=D+lambda*Rate, where D is the overall distortion for all these points, and Rate is the overall rate cost for coding these points.

In some embodiments, an encoder, such as encoder 202, may explicitly encode an index value of a chosen prediction strategy for a point cloud, for a level of detail of a point cloud, or for a group of points within a level of detail of a point cloud, wherein the decoder has access to an instance of the index and can determine the chosen prediction strategy based on the received index value. The decoder may apply the chosen prediction strategy for the set of points for which the rate-distortion optimization procedure is being applied. In some embodiments, there may be a default prediction strategy and the decoder may apply the default prediction strategy if no rate-distortion optimization procedure is specified in the encoded bit stream. Also, in some embodiments a default prediction strategy may be applied if no variability threshold is met.

Figure 4B:
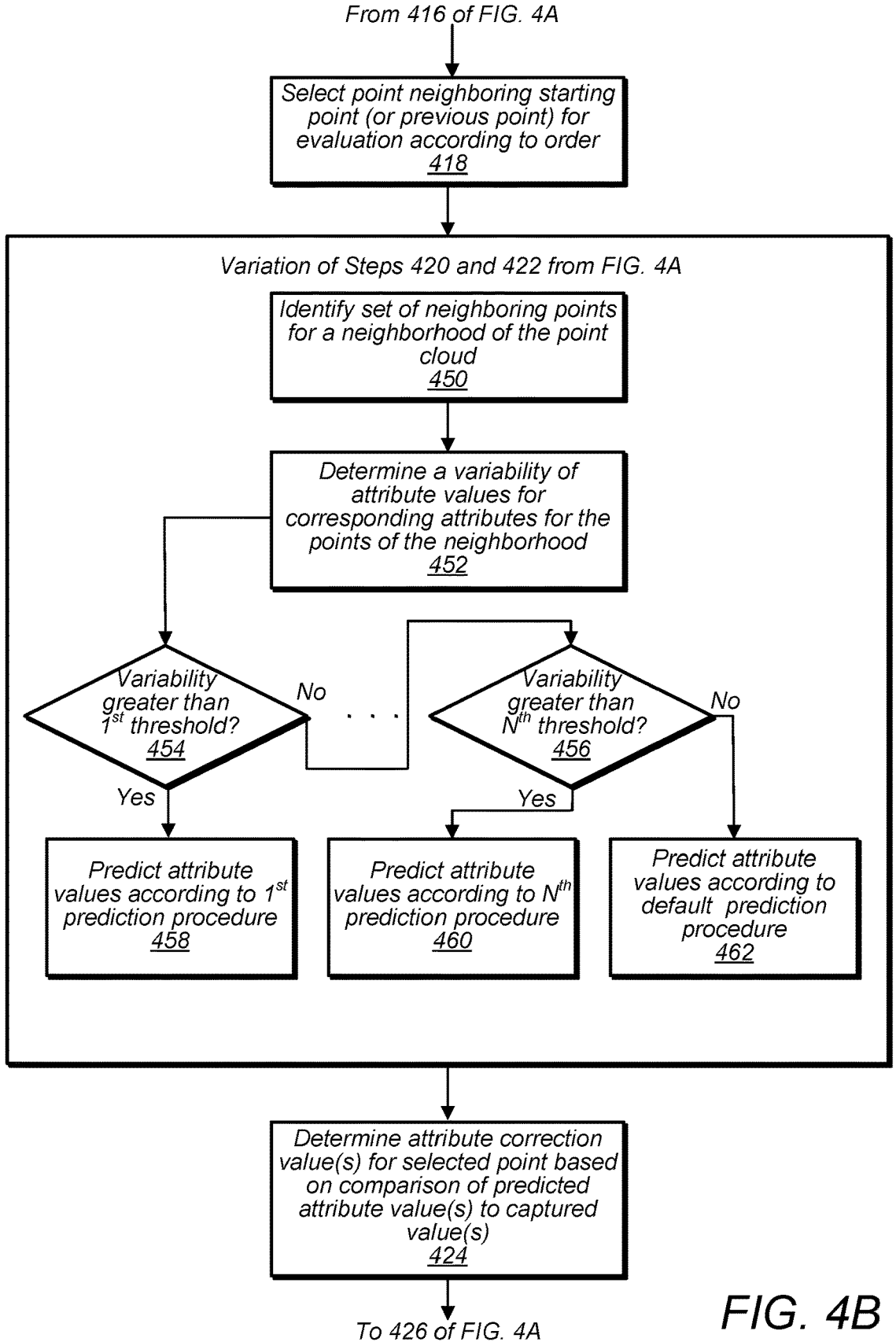
FIG. 4B illustrates predicting attribute values as part of compressing attribute information of a point cloud using adaptive distance based prediction, according to some embodiments.

For example, FIG. 4B illustrates predicting attribute values as part of compressing attribute information of a point cloud using adaptive distance based prediction, according to some embodiments.

In some embodiments in which adaptive distance based prediction is employed, predicting attribute values as described in elements 420 and 422 of FIG. 4A may further include steps such as 450-456 to select a prediction procedure to be used to predict the attribute values for the points. In some embodiments the selected prediction procedure may be a K-nearest neighbor prediction procedure, as described herein and in regard to element 420 in FIG. 4A. In some embodiments, the selected prediction procedure may be a modified K-nearest neighbor prediction procedure, wherein fewer points are included in the number of nearest neighbors used to perform the adaptive prediction than a number of points used to predict attribute values for portions of the point cloud with less variability. In some embodiments, the selected prediction procedure may be that the point for which an attribute value is being predicted simply uses the attribute value of the nearest point to the point for which the attribute value is being predicted, if the variability of the neighboring points exceeds a threshold associated with this prediction procedure. In some embodiments, other prediction procedures may be used depending on the variability of points in a neighborhood of a point for which an attribute value is being predicted. For example, in some embodiments, other prediction procedures, such as a non-distance based interpolation procedure may be used, such as barycentric interpolation, natural neighbor interpolation, moving least squares interpolation, or other suitable interpolation techniques.

At 450, the encoder identifies a set of neighboring points for a neighborhood of a point of the point cloud for which an attribute value is being predicted. In some embodiments, the set of neighboring points of the neighborhood may be identified using a K-nearest neighbor technique as described herein. In some embodiments, points to be used to determine variability may be identified in other manners. For example, in some embodiments, a neighborhood of points used for variability analysis may be defined to include more or fewer points or points within a greater or smaller distance from the given point than are used to predict attribute values based on inverse distance based interpolation using the K-nearest neighboring points. In some embodiments, wherein parameters used to identify the neighborhood points for determining variability differ from the parameters used in a K-nearest neighbor prediction, the differing parameters or data from which the differing parameter may be determined is signaled in a bit stream encoded by the encoder.

At 452, the variability of the attribute values of the neighboring points is determined. In some embodiment, each attribute value variability may be determined separately. For example, for points with R, G, B attribute values each attribute value (e.g. each of R, G, and B) may have their respective variabilities determined separately. Also, in some embodiments trellis quantization may be used wherein a set of attributes such as RGB that have correlated values may be determined as a common variability. For example, in the example discussed above with regard to the white stripe on the black road, the large variability in R may also apply to B and G, thus it is not necessary to determine variability for each of R, G, and B separately. Instead the related attribute values can be considered as a group and a common variability for the correlated attributes can be determined.

In some embodiments, the variability of the attributes in the neighborhood of point P may be determined using: a sum of square errors variability technique, a distance weighted sum of square errors variability technique, a sum of absolute differences variability technique, a distance weighted sum of absolute differences variability technique, or other suitable variability technique. In some embodiments the encoder may select a variability technique to be used for a given point P, and may encode in a bit stream encoded by the encoder an index value for an index of variability techniques, wherein the decoder includes the same index and can determine which variability technique to use for point P based on the encoded index value.

At 454 through 456 it is determined whether or not the variability determined at 452 exceeds one or more variability thresholds. If so, a corresponding prediction technique that corresponds with the exceeded variability threshold is used to predict the attribute value or values for the point P. In some embodiments, multiple prediction procedures may be supported. For example, element 458 indicates using a first prediction procedure if a first variability threshold is exceeded and element 460 indicates using another prediction procedure if another variability threshold is exceeded. Furthermore, 462 indicates using a default prediction procedure, such as a non-modified K-nearest neighbor prediction procedure if the variability thresholds 1 through N are not exceeded. In some embodiments, a single variability threshold and a single alternate prediction procedure may be used in addition to a default prediction procedure. In some embodiments, any number of "N" variability thresholds and corresponding prediction procedures may be used.

For example, in some embodiments, if a first variability threshold is exceeded a first prediction procedure may be to use fewer neighboring points than are used in the default K-nearest neighbor prediction procedure. Also, if a second variability threshold is exceeded, a second prediction procedure may be to use only the nearest point to determine the attribute value of the point P. Thus, in such embodiments, medium variability may cause some outlier points to be omitted under the first prediction procedure and higher variability may cause all but the closest neighboring point to be omitted from the prediction procedure, while if variability is low, the K-nearest neighboring points are used in the default prediction procedure.

Figure 4C:
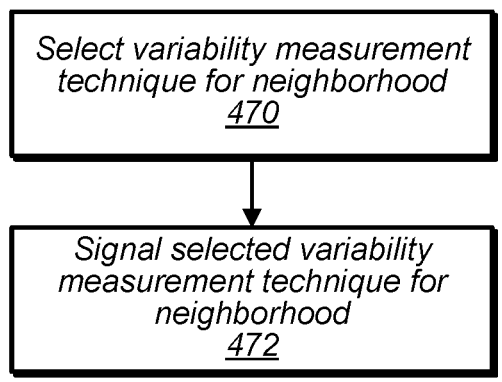
FIGS. 4C-4E illustrate parameters that may be determined or selected by an encoder and signaled with compressed attribute information for a point cloud, according to some embodiments.
Figure 4D:
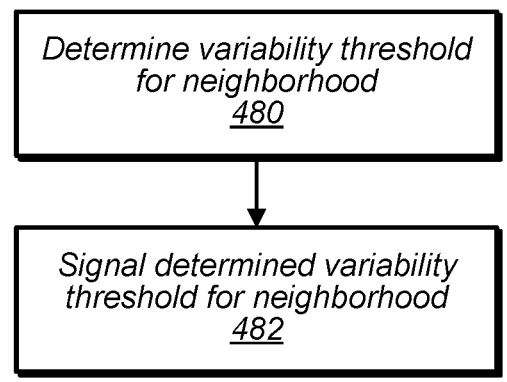
Figure 4E:
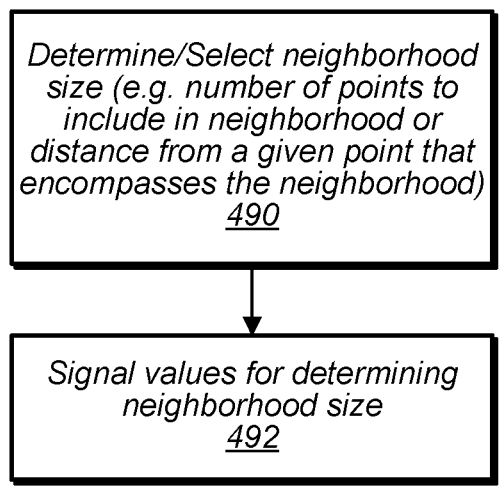

FIGS. 4C-4E illustrate parameters that may be determined or selected by an encoder and signaled with compressed attribute information for a point cloud, according to some embodiments.

In FIG. 4C at 470, an encoder may select a variability measurement technique to be used to determine attribute variability for points in a neighborhood of a point P for which an attribute value is being predicted. In some embodiments, the encoder may utilize a rate distortion optimization framework to determine which variability measurement technique to use. At 472 the encoder may include, in a bit stream encoded by the encoder, a signal indicating which variability technique was selected.

In FIG. 4D at 480, an encoder may determine a variability threshold for points in a neighborhood of a point P for which an attribute value is being predicted. In some embodiments, the encoder may utilize a rate distortion optimization framework to determine the variability threshold. At 482 the encoder may include in a bit stream, encoded by the encoder, a signal indicating which variability threshold was used by the encoder to perform prediction.

In FIG. 4E at 490, an encoder may determine or select a neighborhood size for use in determining variability. For example, the encoder may use a rate distortion optimization technique to determine how big or small of a neighborhood of points to use in determining variability for point P. At 492, the encoder may include in a bit stream, encoded by the encoder, one or more values for defining the neighborhood size. For example, the encoder may signal a minimum distance from point P, a maximum distance from point P, a total number of neighboring points to include, etc. and these parameters may define which points are included in the neighborhood points for point P that are considered in determining variability.

In some embodiments, one or more of the variability technique, variability threshold, or neighborhood size may not be signaled and may instead be determined at a decoder using a pre-determined parameter known to both the encoder and decoder. In some embodiments, a decoder may infer one or more of the variability technique, variability threshold, or neighborhood size to be used based on other data, such as spatial information for the point cloud.

Once the attribute values are predicted using the appropriate corresponding prediction procedure at 458-462, the decoder may proceed to apply attribute correction values received in the encoded bit stream to adjust the predicted attribute values. In some embodiments, using adaptive prediction as described herein at the encoder and decoder may reduce a number of bits necessary to encode the attribute correction values and may also reduce distortion of a re-constructed point cloud re-constructed at the decoder using the prediction procedures and the signaled attribute correction values.

Example Process for Encoding Attribute Values and/or Attribute Correction Values The attribute correction values, the assigned attribute values, and any configuration information may be encoded using various encoding techniques.

Figure 5:
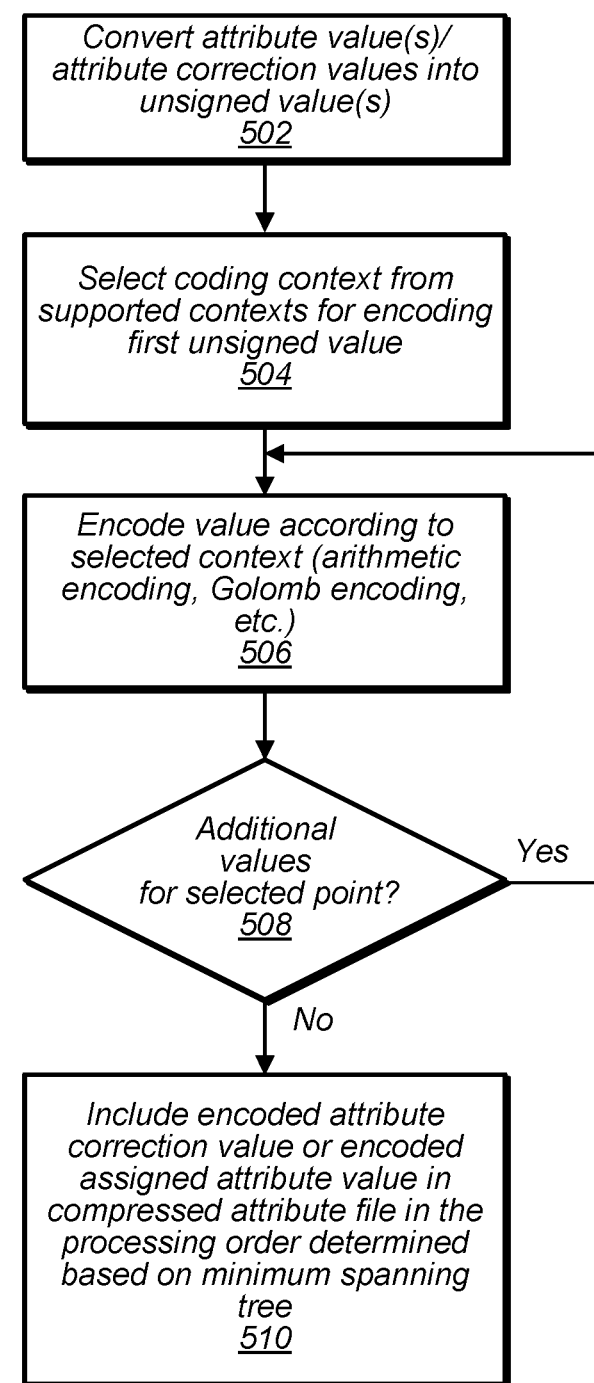
FIG. 5 illustrates a process for encoding attribute correction values, according to some embodiments.

For example, FIG. 5 illustrates a process for encoding attribute correction values, according to some embodiments. At 502, an attribute correction value for a point whose values (e.g. attribute correction values) are being encoded is converted to an unsigned value. For example, in some embodiments, attribute correction values that are negative values may be assigned odd numbers and attribute correction values that are positive values may be assigned even numbers. Thus, whether or not the attribute correction value is positive or negative may be implied based on whether or not a value of the attribute correction value is an even number or an odd number. In some embodiments, assigned attribute values may also be converted into unsigned values. In some embodiments, attribute values may all be positive values, for example in the case of integers that are assigned to represent string values, such as "walking", "running", "driving" etc. In such cases, 502 may be omitted.

At 504, an encoding context is selected for encoding a first value for a point. The value may be an assigned attribute value or may be an attribute correction value, for example. The encoding context may be selected from a plurality of supported encoding contexts. For example, a context store, such as context store 216 of an encoder, such as encoder 202, as illustrated in FIG. 2A, may store a plurality of supported encoding context for encoding attribute values or attribute correction values for points of a point cloud. In some embodiments, an encoding context may be selected based on characteristics of a value to be encoded. For example, some encoding contexts may be optimized for encoding values with certain characteristics while other encoding contexts may be optimized for encoding values with other characteristics.

In some embodiments, an encoding context may be selected based on a quantity or variety of symbols included in a value to be encoded. For example, values with fewer or less diverse symbols may be encoded using arithmetic encoding techniques, while values with more symbols or more diverse symbols may be encoding using exponential Golomb encoding techniques. In some embodiments, an encoding context may encode portions of a value using more than one encoding technique. For example, in some embodiments, an encoding context may indicate that a portion of a value is to be encoded using an arithmetic encoding technique and another portion of the value is to be encoded using a Golomb encoding technique. In some embodiments, an encoding context may indicate that a portion of a value below a threshold is to be encoded using a first encoding technique, such as arithmetic encoding, whereas another portion of the value exceeding the threshold is to be encoded using another encoding technique, such as exponential Golomb encoding. In some embodiments, a context store may store multiple encoding contexts, wherein each encoding context is suited for values having particular characteristics.

At 506, a first value (or additional value) for the point may be encoded using the encoding context selected at 504. At 508 it is determined if there are additional values for the point that are to be encoded. If there are additional values for the point to be encoded, the additional values may be encoded, at 506, using the same selected encoding technique that was selected at 504. For example, a point may have a "Red", a "Green", and a "Blue" color attribute. Because differences between adjacent points in the R, G, B color space may be similar, attribute correction values for the Red attribute, Green attribute, and Blue attribute may be similar. Thus, in some embodiments, an encoder may select an encoding context for encoding attribute correction values for a first one of the color attributes, for example the Red attribute, and may use the same encoding context for encoding attribute correction values for the other color attributes, such as the Green attribute and the Blue attribute.

At 510 encoded values, such as encoded assigned attribute values and encoded attribute correction values may be included in a compressed attribute information file. In some embodiments, the encoded values may be included in the compressed attribute information file in accordance with the evaluation order determined for the point cloud based on a minimum spanning tree. Thus a decoder may be able to determine which encoded value goes with which attribute of which point based on the order in which encoded values are included in a compressed attribute information file. Additionally, in some embodiments, data may be included in a compressed attribute information file indicating respective ones of the encoding contexts that were selected to encode respective ones of the values for the points.

Exampled Processes for Encoding Spatial Information

Figures 6A, 6B:
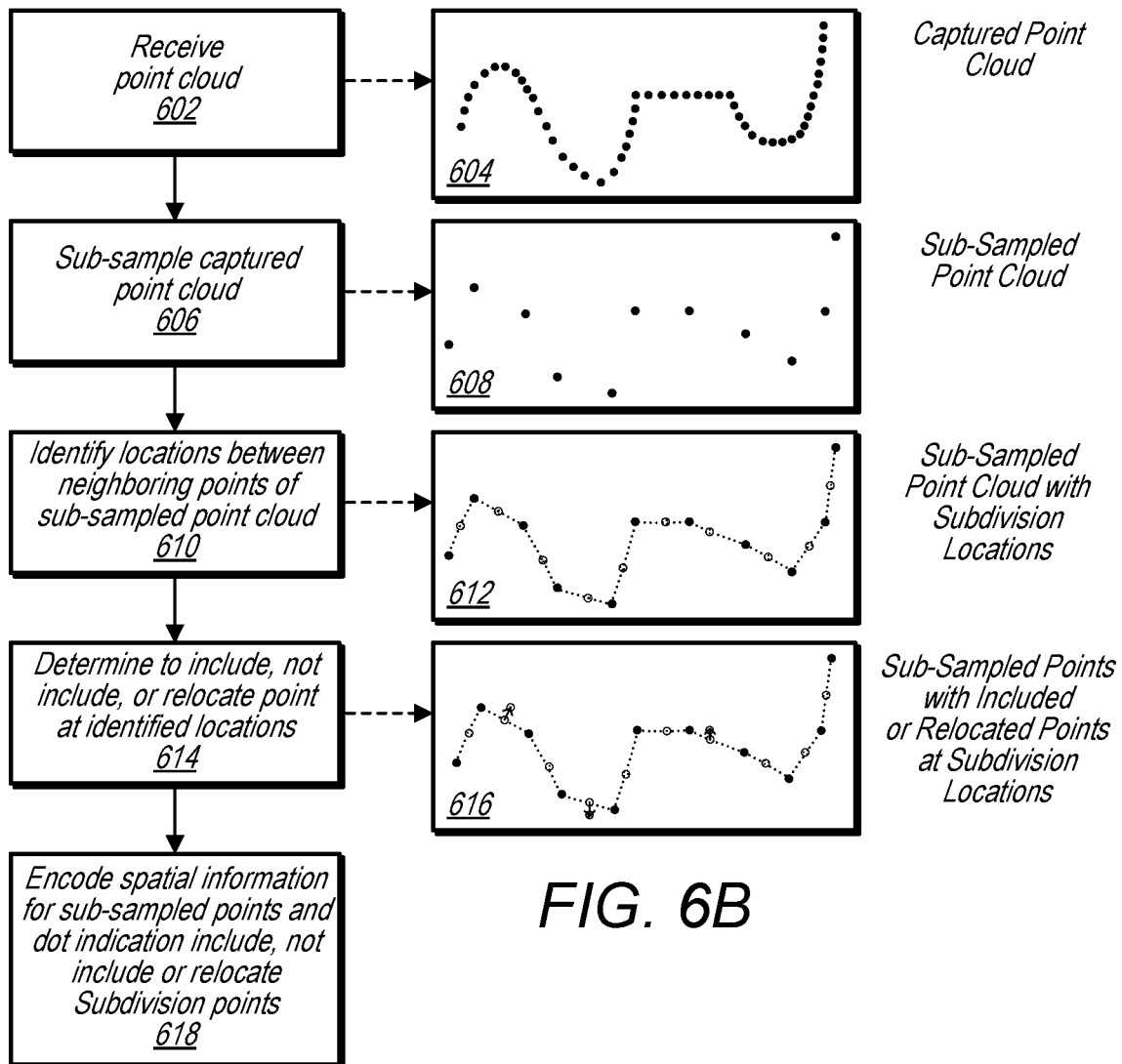
FIGS. 6A-B illustrate an example process for compressing spatial information of a point cloud, according to some embodiments.

FIGS. 6A-B illustrate an example process for compressing spatial information of a point cloud, according to some embodiments.

At 602, an encoder receives a point cloud. The point cloud may be a captured point cloud from one or more sensors or may be a generated point cloud, such as a point cloud generated by a graphics application. For example, 604 illustrates points of an un-compressed point cloud.

At 606, the encoder sub-samples the received point cloud to generate a sub-sampled point cloud. The sub-sampled point cloud may include fewer points than the received point cloud. For example, the received point cloud may include hundreds of points, thousands of points, or millions of points and the sub-sampled point cloud may include tens of points, hundreds of points or thousands of points. For example, 608 illustrates sub-sampled points of a point cloud received at 602, for example a sub-sampling of the points of the point cloud in 604.

In some embodiments, the encoder may encode and decode the sub-sampled point cloud to generate a representative sub-sampled point cloud the decoder will encounter when decoding the compressed point cloud. In some embodiments, the encoder and decoder may execute a lossy compression/decompression algorithm to generate the representative sub-sampled point cloud. In some embodiments, spatial information for points of a sub-sampled point cloud may be quantized as part of generating a representative sub-sampled point cloud. In some embodiments, an encoder may utilize lossless compression techniques and encoding and decoding the sub-sampled point cloud may be omitted. For example, when using lossless compression techniques the original sub-sampled point cloud may be representative of a sub-sampled point cloud the decoder will encounter because in lossless compression data may not be lost during compression and decompression.

At 610, the encoder identifies subdivision locations between points of the sub-sampled point cloud according to configuration parameters selected for compression of the point cloud or according to fixed configuration parameters. The configuration parameters used by the encoder that are not fixed configuration parameters are communicated to an encoder by including values for the configuration parameters in a compressed point cloud. Thus, a decoder may determine the same subdivision locations as the encoder evaluated based on subdivision configuration parameters included in the compressed point cloud. For example, 612 illustrates identified sub-division locations between neighboring points of a sub-sampled point cloud.

At 614, the encoder determines for respective ones of the subdivision locations whether a point is to be included or not included at the subdivision location in a decompressed point cloud. Data indicating this determination is encoded in the compressed point cloud. In some embodiments, the data indicating this determination may be a single bit that if "true" means a point is to be included and if "false" means a point is not to be included. Additionally, an encoder may determine that a point that is to be included in a decompressed point cloud is to be relocated relative to the subdivision location in the decompressed point cloud. For example 616, shows some points that are to be relocated relative to a subdivision location. For such points, the encoder may further encode data indicating how to relocate the point relative to the subdivision location. In some embodiments, location correction information may be quantized and entropy encoded. In some embodiments, the location correction information may comprise delta X, delta Y, and/or delta Z values indicating how the point is to be relocated relative to the subdivision location. In other embodiments, the location correction information may comprise a single scalar value which corresponds to the normal component of the location correction information computed as follows:

$$\Delta N = ([X_A, Y_A, Z_A] - [X, Y, Z]) \cdot [\text{Normal Vector}]$$

In the above equation, delta N is a scalar value indicating location correction information that is the difference between the relocated or adjusted point location relative to the subdivision location (e.g. $[X_A, Y_A, Z_A]$) and the original subdivision location (e.g. $[X, Y, Z]$). The cross product of this vector difference and the normal vector at the subdivision location results in the scalar value delta N. Because a decoder can determine, the normal vector at the subdivision location, and can determine the coordinates of the subdivision location, e.g. $[X, Y, Z]$, the decoder can also determine the coordinates of the adjusted location, e.g. $[X_A, Y_A, Z_A]$, by solving the above equation for the adjusted location, which represents a relocated location for a point relative to the subdivision location. In some embodiments, the location correction information may be further decomposed into a normal component and one or more additional tangential components. In such an embodiment, the normal component, e.g. delta N, and the tangential component(s) may be quantized and encoded for inclusion in a compressed point cloud.

In some embodiments, an encoder may determine whether one or more additional points (in addition to points included at subdivision locations or points included at locations relocated relative to subdivision locations) are to be included in a decompressed point cloud. For example, if the original point cloud has an irregular surface or shape such that subdivision locations between points in the sub-sampled point cloud do not adequately represent the irregular surface or shape, the encoder may determine to include one or more additional points in addition to points determined to be included at subdivision locations or relocated relative to subdivision locations in the decompressed point cloud. Additionally, an encoder may determine whether one or more additional points are to be included in a decompressed point cloud based on system constraints, such as a target bitrate, a target compression ratio, a quality target metric, etc. In some embodiments, a bit budget may change due to changing conditions such as network conditions, processor load, etc. In such embodiments, an encoder may adjust a quantity of additional points that are encoded to be included in a decompressed point cloud based on a changing bit budget. In some embodiments, an encoder may include additional points such that a bit budget is consumed without being exceeded. For example, when a bit budget is higher, an encoder may include more additional points to consume the bit budget (and enhance quality) and when the bit budget is less, the encoder may include fewer additional points such that the bit budget is consumed but not exceeded.

In some embodiments, an encoder may further determine whether additional subdivision iterations are to be performed. If so, the points determined to be included, relocated, or additionally included in a decompressed point cloud are taken into account and the process reverts to 610 to identify new subdivision locations of an updated sub-sampled point cloud that includes the points determined to be included, relocated, or additionally included in the decompressed point cloud. In some embodiments, a number of subdivision iterations to be performed (N) may be a fixed or configurable parameter of an encoder. In some embodiments, different subdivision iteration values may be assigned to different portions of a point cloud. For example, an encoder may take into account a point of view from which the point cloud is being viewed and may perform more subdivision iterations on points of the point cloud in the foreground of the point cloud as viewed from the point of view and fewer subdivision iterations on points in a background of the point cloud as viewed from the point of view.

At 618, the spatial information for the sub-sampled points of the point cloud are encoded. Additionally, subdivision location inclusion and relocation data is encoded. Additionally, any configurable parameters selected by the encoder or provided to the encoder from a user are encoded. The compressed point cloud may then be sent to a receiving entity as a compressed point cloud file, multiple compressed point cloud files, or may be packetized and communicated via multiple packets to a receiving entity, such as a decoder or a storage device. In some embodiments, a compressed point cloud may comprise both compressed spatial information and compressed attribute information. In other embodiments, compressed spatial information and compressed attribute information may be included is separate compressed point cloud files.

Figure 7:
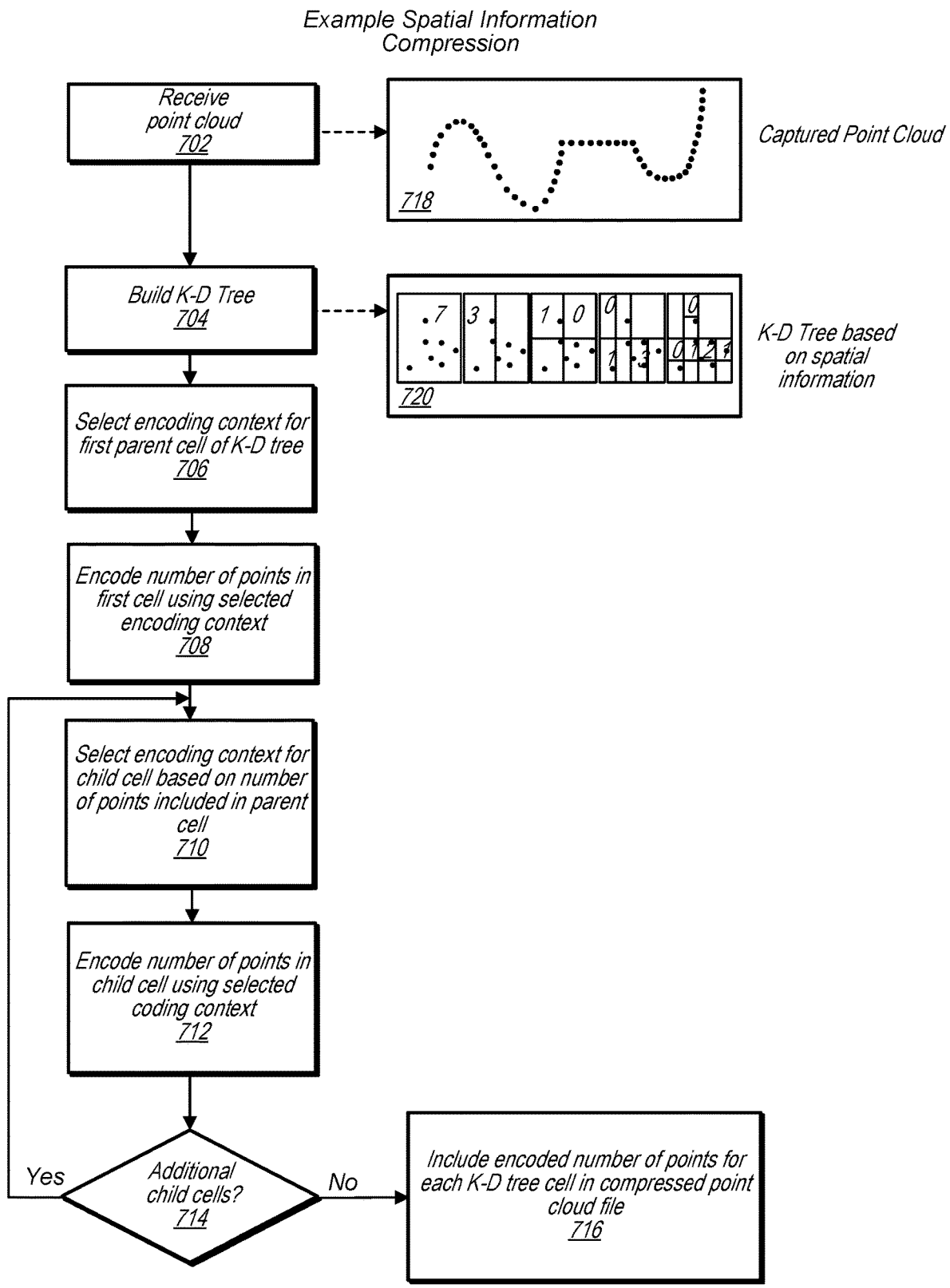
FIG. 7 illustrates another example process for compressing spatial information of a point cloud, according to some embodiments.

FIG. 7 illustrates another example process for compressing spatial information of a point cloud, according to some embodiments.

In some embodiments, other spatial information compression techniques other than the sub-sampling and prediction spatial information technique described in FIGS. 6A-B may be used. For example, a spatial encoder, such as spatial encoder 204, or a spatial decoder, such as spatial decoder 222, may utilize other spatial information compression techniques, such as a K-D tree spatial information compression technique. For example, compressing spatial information at 406 of FIG. 4 may be performed using a sub-sampling and prediction technique similar to what is described in FIGS. 6A-B, may be performed using a K-D tree spatial information compression technique similar to what is described in FIG. 7, or may be performed using another suitable spatial information compression technique.

In a K-D tree spatial information compression technique, a point cloud comprising spatial information may be received at 702. In some embodiments, the spatial information may have been previously quantized or may further be quantized after being received. For example 718 illustrates a captured point cloud that may be received at 702. For simplicity, 718 illustrates a point cloud in two dimensions. However, in some embodiments, a received point cloud may include points in 3-D space.

At 704, a K-dimensional tree or K-D tree is built using the spatial information of the received point cloud. In some embodiments, a K-D tree may be built by dividing a space, such as a 1-D, 2-D, or 3-D space of a point cloud in half in a predetermined order. For example, a 3-D space comprising points of a point cloud may initially be divided in half via a plane intersecting one of the three axis, such as the X-axis. A subsequent division may then divide the resulting space along another one of the three axis, such as the Y-axis. Another division may then divide the resulting space along another one of the axis, such as the Z-axis. Each time a division is performed a number of points included in a child cell created by the division may be recorded. In some embodiments, only a number of points in one child cell of two child cells resulting from a division may be recorded. This is because a number of points included in the other child cell can be determined by subtracting the number of points in the recorded child cell from a total number of points in a parent cell prior to the division.

A K-D tree may include a sequence of number of points included in cells resulting from sequential divisions of a space comprising points of a point cloud. In some embodiments, building a K-D tree may comprise continuing to subdivide a space until only a single point is included in each lowest level child cell. A K-D tree may be communicated as a sequence of number of points in sequential cells resulting from sequential divisions. A decoder may be configured with information indicating the subdivision sequence followed by an encoder. For example, an encoder may follow a pre-defined division sequence until only a single point remains in each lowest level child cell. Because the decoder may know the division sequence that was followed to build the K-D tree and the number of points that resulted from each subdivision (which is communicated to the decoder as compressed spatial information) the decoder may be able to reconstruct the point cloud.

For example, 720 illustrates a simplified example of K-D compression in a two-dimensional space. An initial space includes seven points. This may be considered a first parent cell and a K-D tree may be encoded with a number of points "7" as a first number of the K-D tree indicating that there are seven total points in the K-D tree. A next step may be to divide the space along the X-axis resulting in two child cells, a left child cell with three points and a right child cell with four points. The K-D tree may include the number of points in the left child cell, for example "3" as a next number of the K-D tree. Recall that the number of points in the right child cell can be determined based on subtracting the number of points in the left child cell from the number of points in the parent cell. A further step may be to divide the space an additional time along the Y-axis such that each of the left and right child cells are divided in half into lower level child cells. Again, a number of points included in the left lower-level child cells may be included in a K-D tree, for example "0" and "1". A next step may then be to divide the non-zero lower-level child cells along the X-axis and record the number of points in each of the lower-level left child cells in a K-D tree. This process may continue until only a single point remains in a lowest level child cell. A decoder may utilize a reverse process to recreate a point cloud based on receiving a sequence of point totals for each left child cell of a K-D tree.

At 706, an encoding context for encoding a number of points for a first cell of the K-D tree, for example the parent cell comprising seven points, is selected. In some embodiments, a context store may store hundreds or thousands of encoding contexts. In some embodiments, cells comprising more points than a highest number of points encoding context may be encoded using the highest number point encoding context. In some embodiments, an encoding context may include arithmetic encoding, Golomb exponential encoding, or a combination of the two. In some embodiments, other encoding techniques may be used. In some embodiments, an arithmetic encoding context may include probabilities for particular symbols, wherein different arithmetic encoding contexts include different symbol probabilities.

At 708, the number of points for the first cell is encoded according the selected encoding context.

At 710, an encoding context for encoding a child cell is selected based on a number of points included in a parent cell. The encoding context for the child cell may be selected in a similar manner as for the parent cell at 706.

At 712, the number of points included in the child cell is encoded according the selected encoding context, selected at 710. At 714, it is determined if there are additional lower-level child cells to encode in the K-D tree. If so, the process reverts to 710. If not, at 716, the encoded number of points in the parent cell and the child cells are included in a compressed spatial information file, such as a compressed point cloud. The encoded values are ordered in the compressed spatial information file such that the decoder may reconstruct the point cloud based on the number of points of each parent and child cell and the order in which the number of points of the respective cells are included in the compressed spatial information file.

In some embodiments, the number of points in each cell may be determined and subsequently encoded as a group at 716. Or, in some embodiments, a number of points in a cell may be encoded subsequent to being determined without waiting for all child cell point totals to be determined.

Level of Detail Attribute Compression

In some circumstances, a number of bits needed to encode attribute information for a point cloud may make up a significant portion of a bit stream for the point cloud. For example, the attribute information may make up a larger portion of the bit stream than is used to transmit compressed spatial information for the point cloud.

In some embodiments, spatial information may be used to build a hierarchical Level of Detail (LOD) structure. The LOD structure may be used to compress attributes associated with a point cloud. The LOD structure may also enable advanced functionalities such as progressive/view-dependent streaming and scalable rendering. For example, in some embodiments, compressed attribute information may be sent (or decoded) for only a portion of the point cloud (e.g. a level of detail) without sending (or decoding) all of the attribute information for the whole point cloud.

Figure 8:
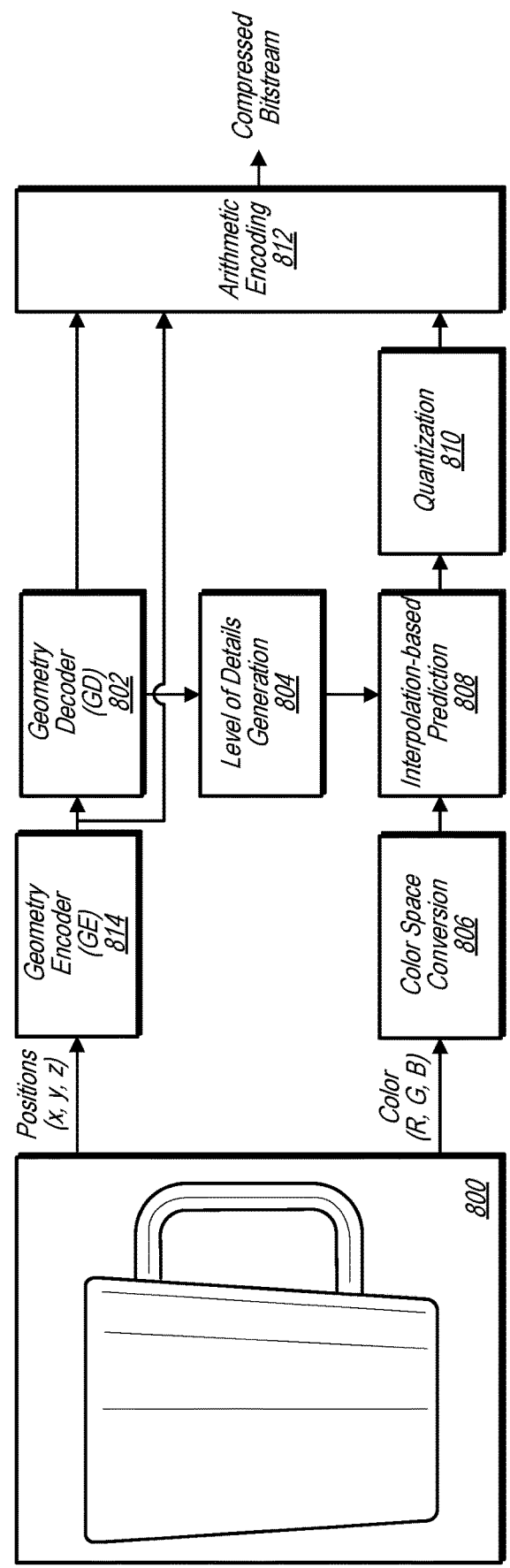
FIG. 8 illustrates components an example encoder that generates a hierarchical level of detail (LOD) structure, according to some embodiments.

FIG. 8 illustrates an example encoding process that generates a hierarchical LOD structure, according to some embodiments. For example, in some embodiments, an encoder such as encoder 202 may generate compressed attribute information in a LOD structure using a similar process as shown in FIG. 8.

In some embodiments, geometry information (also referred to herein as "spatial information") may be used to efficiently predict attribute information. For example, in FIG. 8 the compression of color information is illustrated. However, a LOD structure may be applied to compression of any type of attribute (e.g., reflectance, texture, modality, etc.) associated with points of a point cloud. Note that a pre-encoding step which applies color space conversion or updates the data to make the data better suited for compression may be performed depending on the attribute to be compressed.

In some embodiments, attribute information compression according to a LOD process proceeds as described below.

For example, let Geometry (G)={Point-P(0), P(1), . . . P(N−1)} be reconstructed point cloud positions generated by a spatial decoder included in an encoder (geometry decoder GD 802) after decoding a compressed geometry bit stream produced by a geometry encoder, also included in the encoder (geometry encoder GE 814), such as spatial encoder 204 (illustrated in FIG. 2A). For example, in some embodiments, an encoder such as encoder 202 (illustrated in FIG. 2A) may include both a geometry encoder, such as geometry encoder 814, and a geometry decoder, such as geometry decoder 802. In some embodiments, a geometry encoder may be part of spatial encoder 214 and a geometry decoder may be part of prediction/correction evaluator 206, both as illustrated in FIG. 2A.

In some embodiments, the decompressed spatial information may describe locations of points in 3D space, such as X, Y, and Z coordinates of the points that make up mug 800. Note that spatial information may be available to both an encoder, such as encoder 202, and a decoder, such as decoder 220. For example various techniques, such as K-D tree compression, octree compression, nearest neighbor prediction, etc., may be used to compress and/or encode spatial information for mug 800 and the spatial information may be sent to a decoder with, or in addition to, compressed attribute information for attributes of the points that make up a point cloud for mug, such as a point cloud 800.

In some embodiments, a deterministic re-ordering process may be applied on both an encoder side (such as at encoder 202) and at a decoder side (such as at decoder 220) in order to organize points of a point cloud, such as the points that represent mug 800, into a set of Level of Details (LODs). For example, levels of detail may be generated by a level of detail generator 804, which may be included in a prediction/correction evaluator of an encoder, such as prediction/correction evaluator 206 of encoder 202 as illustrated in FIG. 2A. In some embodiments, a level of detail generator 804 may be a separate component of an encoder, such as encoder 202. For example, level of detail generator 804 may be a separate component of encoder 202. Note that, in some embodiments, no additional information needs to be included in the bit stream to generate such LOD structures, except for the parameters of the LOD generation algorithm, For example, parameters that may be included in a bit stream as parameters of the LOD generator algorithm may include:
  i. The maximum number of LODs to be generated denoted by "N" (e.g., N=6),
  ii. The initial sampling distance "D0" (e.g., D0=64), and
  iii. The sampling distance update factor "f" (e.g., ½).

In some embodiments, the parameters N, D0 and f, may be provided by a user, such as an engineer configuring a compression process. In some embodiments the parameters N, D0 and f, may be determined automatically by an encoder/and or decoder using an optimization procedure, for example. These parameters may be fixed or adaptive.

In some embodiments, LOD generation may proceed as follows:
  a. Points of geometry G (e.g. the points of the point cloud organized according to the spatial information), such as points of mug 800, are marked as non-visited and a set of visited points V is set to be empty.
  b. The LOD generation process may then proceed iteratively. At each iteration j, the level of detail for that refinement level, e.g. LOD(j), may be generated as follows:
    1. The sampling distance for the current LOD, denoted D(j) may be set as follows:
      a. If j=0, then D(j)=D0.
      b. If. j>0 and j<N, then D(j)=D(j−1)*f.
      c. if j=N, then D(j)=0.
    2. The LOD generation process iterates over all the points of G.
      a. At the point evaluation iteration i, a point P(i) is evaluated,
        i. if the point P(i) has been visited then it is ignored and the algorithm jumps to the next iteration (i+1), e.g. the next point P(i+1) is evaluated.
        ii. Otherwise, the distance D(i, V), defined as the minimum distance from P(i) over all the points of V, is computed. Note that V is the list of points that have already been visited. If V is empty, the distance D(i, V) is set to 0, meaning that the distance from point P(i) to the visited points is zero because there are not any visited points in the set V. If the shortest distance from point P(i) to any of the already visited point, D(i, V), is strictly higher than a parameter D0, then the point is ignored and the LoD generation jumps to the iteration (i+1) and evaluates the next point P(i+1). Otherwise, P(i) is marked as a visited point and the point P(i) is added to the set of visited points V.
      b. This process may be repeated until all the points of geometry G are traversed.
    3. The set of points added to V during the iteration j describes the refinement level R(j).
    4. The LOD(j) may be obtained by taking the union of all the refinement levels R(0), R(1), . . . , R(j).

In some embodiments, the process described above, may be repeated until all the LODs are generated or all the vertices have been visited.

In some embodiments, an encoder as described above may further include a quantization module (not shown) that quantizes geometry information included in the "positions (x,y,z) being provided to the geometry encoder 814. Furthermore, in some embodiments, an encoder as described above may additionally include a module that removes duplicated points subsequent to quantization and before the geometry encoder 814.

In some embodiments, quantization may further be applied to compressed attribute information, such as attribute correction values and/or one or more attribute value starting points. For example quantization is performed at 810 to attribute correction values determined by interpolation-based prediction module 808. Quantization techniques may include uniform quantization, uniform quantization with a dead zone, non-uniform/non-linear quantization, trellis quantization, or other suitable quantization techniques.

Example Level of Detail Hierarchy

FIG. 9A illustrates an example LOD, according to some embodiments. Note that the LOD generation process may generate uniformly sampled approximations (or levels of detail) of the original point cloud, that get refined as more and more points are included. Such a feature makes it particularly adapted for progressive/view-dependent transmission and scalable rendering. For example, 904 may include more detail than 902, and 906 may include more detail than 904. Also, 908 may include more detail than 902, 904, and 906.

The hierarchical LOD structure may be used to build an attribute prediction strategy. For example, in some embodiments the points may be encoded in the same order as they were visited during the LOD generation phase. Also, in some embodiments LODs may be generated concurrently with determining an attribute prediction strategy. Attributes of each point may be predicted by using the K-nearest neighbors that have been previously encoded. In some embodiments, "K" is a parameter that may be defined by the user or may be determined by using an optimization strategy. "K" may be static or adaptive. In the latter case where "K" is adaptive, extra information describing the parameter may be included in the bit stream.

In some embodiments, different prediction strategies may be used. For example, one of the following interpolation strategies may be used, as well as combinations of the following interpolation strategies, or an encoder/decoder may adaptively switch between the different interpolation strategies. The different interpolation strategies may include interpolation strategies such as: inverse-distance interpolation, barycentric interpolation, natural neighbor interpolation, moving least squares interpolation, or other suitable interpolation techniques. For example, interpolation based prediction may be performed at an interpolation-based prediction module 808 included in a prediction/correction value evaluator of an encoder, such as prediction/correction value evaluator 206 of encoder 202. Also, interpolation based prediction may be performed at an interpolation-based prediction module 808 included in a prediction evaluator of a decoder, such as prediction evaluator 224 of decoder 220. In some embodiments, a color space may also be converted, at color space conversion module 806, prior to performing interpolation based prediction. In some embodiments, a color space conversion module 806 may be included in an encoder, such as encoder 202. In some embodiments, a decoder may further included a module to convert a converted color space, back to an original color space.

In some embodiments, quantization may further be applied to attribute information. For example quantization may performed at quantization module 810. In some embodiments, an encoder, such as encoder 202, may further include a quantization module 810. Quantization techniques employed by a quantization module 810 may include uniform quantization, uniform quantization with a dead zone, non-uniform/non-linear quantization, trellis quantization, or other suitable quantization techniques.

In some embodiments, LOD attribute compression may be used to compress dynamic point clouds as follows:
 a. Let FC be the current point cloud frame and RF be the reference point cloud.
 b. Let M be the motion field that deforms RF to take the shape of FC.
  i. M may be computed on the decoder side and in this case information may not be encoded in the bit stream.
  ii. M may be computed by the encoder and explicitly encoded in the bit stream
   1. M may be encoded by applying a hierarchical compression technique as described herein to the motion vectors associated with each point of RF (e.g. the motion of RF may be considered as an extra attribute).
   2. M may be encoded as a skeleton/skinning-based model with associated local and global transforms.
   3. M may be encoded as a motion field defined based on an octree structure, which is adaptively refined to adapt to motion field complexity.
   4. M may be described by using any suitable animation technique such as key-frame-based animations, morphing techniques, free-form deformations, key-point-based deformation, etc.
  iii. Let RF' be the point cloud obtained after applying the motion field M to RF. The points of RF' may be then used in the attribute prediction strategy by considering not only the "K" nearest neighbor points of FC but also those of RF'.

Furthermore, attribute correction values may be determined based on comparing the interpolation-based prediction values determined at interpolation-based prediction module 808 to original non-compressed attribute values. The attribute correction values may further be quantized at quantization module 810 and the quantitated attribute correction values, encoded spatial information (output from the geometry encoder 802) and any configuration parameters used in the prediction may be encoded at arithmetic encoding module 812. In some embodiments, the arithmetic encoding module, may use a context adaptive arithmetic encoding technique. The compressed point cloud may then be provided to a decoder, such as decoder 220, and the decoder may determine similar levels of detail and perform interpolation based prediction to recreate the original point cloud based on the quantized attribute correction values, encoded spatial information (output from the geometry encoder 802) and the configuration parameters used in the prediction at the encoder.

FIG. 9B illustrates an example compressed point cloud file comprising LODs, according to some embodiments. Level of detail attribute information file 950 includes configuration information 952, point cloud data 954, and level of detail point attribute correction values 956. In some embodiments, level of detail attribute information file 950 may be communicated in parts via multiple packets. In some embodiments, not all of the sections shown in the level of detail attribute information file 950 may be included in each packet transmitting compressed attribute information. In some embodiments, a level of detail attribute information file, such as level of detail attribute information file 950, may be stored in a storage device, such as a server that implements an encoder or decoder, or other computing device.

Figure 10A:
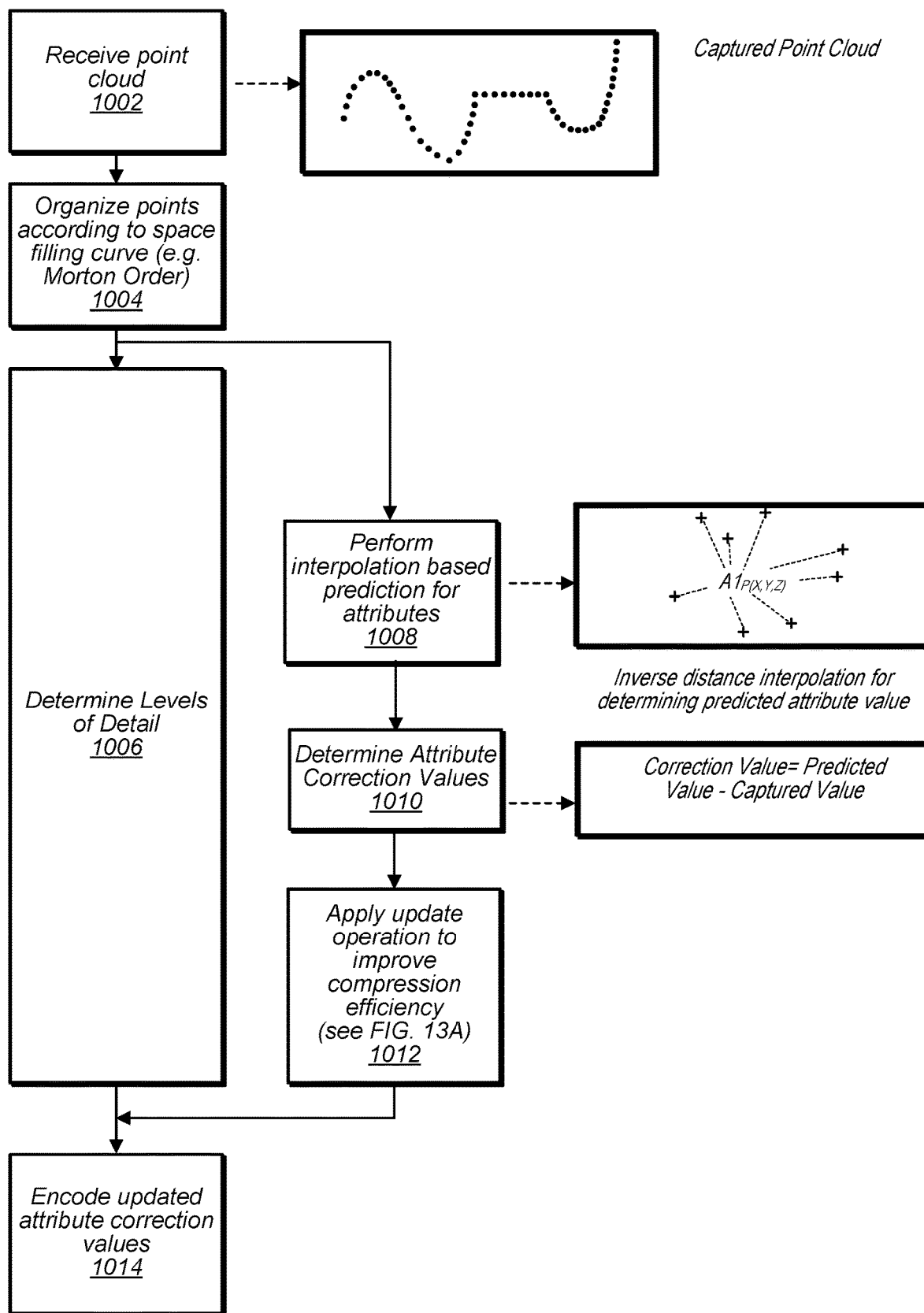
FIG. 10A illustrates an example process of encoding attribute values using a bottom-up level of detail encoding process, according to some embodiments.

FIG. 10A illustrates a method of encoding attribute information of a point cloud using an update operation, according to some embodiments.

At 1002, a point cloud is received by an encoder. The point cloud may be captured, for example by one or more sensors, or may be generated, for example in software.

At 1004, the points of the point cloud are ordered in an order based on the respective positions of the points along a space-filling curve that fills a 3D space of the point cloud. For example, a first point encountered along a patch of the space-filling curve may be ordered as a starting point and a next point encountered along the space-filling curve may be ordered as a second point in the order according to the space filling curve. The points of the point cloud are assigned index values according to the order of the points along the space filing curve. For example the starting point may be given an index value of "1" and the next point encountered may be given an index value of "2", etc.

At 1006, one or more level of details are generated, as described herein. For example, FIG. 10B further discusses how level of detail may be determined based on index values for points of a point cloud ordered according to a space-filling curve. Note that in some embodiments, the spatial information used at 1004 to determine the order according to the space-filling curve may have been encoded or compressed and de-coded or decompressed to generate a representative decompressed point cloud geometry that a decoder would encounter. This representative decompressed point cloud geometry may then be used to generate LOD structures as further described in FIG. 10B.

At 1008, an interpolation based prediction is performed to predict attribute values for the attributes of the points of the point cloud. At 1010, attribute correction values are determined based on comparing the predicted attribute values to original attribute values. For example, in some embodiments, an interpolation based prediction may be performed for each level of detail to determine predicted attribute values for points included in the respective levels of detail. These predicted attribute values may then be compared to attribute values of the original point cloud prior to compression to determine attribute correction values for the points of the respective levels of detail. For example, an interpolation based prediction process as described in FIG. 1B, FIGS. 4-5, and FIG. 8 may be used to determine predicted attribute values for various levels of detail. In some embodiments, attribute correction values may be determined for multiple levels of detail of a LOD structure. For example a first set of attribute correction values may be determined for points included in a first level of detail and additional sets of attribute correction values may be determined for points included in other levels of detail.

At 1012, an update operation may optionally be applied that affects the attribute correction values determined at 1010. Performance of the update operation is discussed in more detail below in FIG. 12A-B.

In some embodiments, levels of detail may be determined using a bottom-up approach, wherein a lowest level of detail comprising a sparse number of points is determined first and subsequent levels of detail add points to each preceding level of detail, such that each subsequent level of detail includes all the points of the preceding level of detail plus additional points that have been added for the subsequent level of detail to further refine the preceding level of detail.

In some embodiments, after determine points to include in a first level of detail or a subsequent level of detail an encoder may determine predicted attribute values and attribute correction values for the first or subsequent level of detail while continuing to determine points to include in additional levels of detail. For example, an encoder may concurrently determine points to include in higher levels of detail while determining attribute correction values or updated attribute correction values to encode for lower levels of detail.

In some embodiments, at 1008, instead of performing an absolute nearest neighbor search to determine nearest neighboring points to use in the inverse-distance based interpolations, the encoder may perform an approximate nearest neighbor search. For example, the encoder may determine a sub-group of the points of the point cloud to be evaluated as part of a nearest neighbor search based on index values of the neighboring points and an index value of a point for which nearest neighbors is being determined. For example, an encoder may consider points having index values with a second search range (SR2) from an index value of the point being evaluated. This may simplify the nearest neighbor search while having minimal impact on the quality of attribute prediction.

In some embodiments, a first search range (SR1) used in determining points to include in a level of detail and a second search range (SR2) used in a simplified nearest neighbor search for attribute value prediction may be user specified parameters. Also, as discussed above, a number of nearest neighbors to consider may be a user specified parameter. Also, in some embodiments, an initial inclusion distance (D0) and an inclusion distance ration between layers (rho) may also be user defined parameters. In some embodiments, a user may be an engineer customizing the encoder/decoder parameters for use in a particular compression application.

At 1014, attribute correction values, LOD parameters, encoded spatial information (output from the geometry encoder) and any configuration parameters used in the prediction are encoded, as described herein.

In some embodiments, the attribute information encoded at 1014 may include attribute information for multiple or all levels of detail of the point cloud, or may include attribute information for a single level of detail or fewer than all levels of detail of the point cloud. In some embodiments, level of detail attribute information may be sequentially encoded by an encoder. For example, an encoder may make available a first level of detail before encoding attribute information for one or more additional levels of detail.

In some embodiments, an encoder may further encode one or more configuration parameters to be sent to a decoder, such as any of the configuration parameters shown in configuration information 952 of compressed attribute information file 950. For example, in some embodiments, an encoder may encode a number of levels of detail that are to be encoded for a point cloud. The encoder may also encode a sampling distance update factor (e.g. inclusion distance ration between layers), wherein the sampling distance is used to determine which points are to be included in a given level of detail.

Figure 10B:
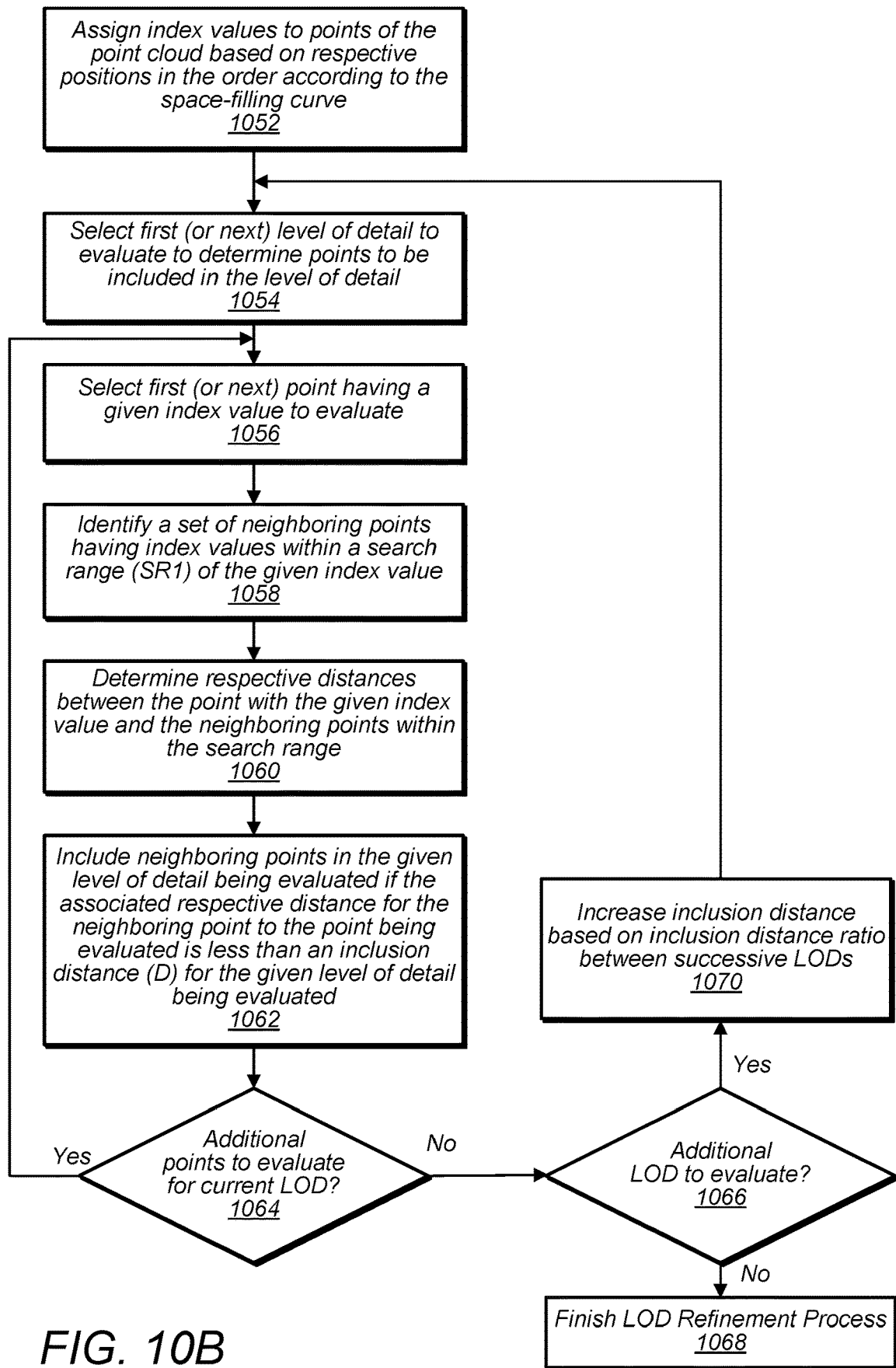
FIG. 10B illustrates an example process determining levels of detail, according to some embodiments.

FIG. 10B illustrates an example process determining levels of detail, according to some embodiments.

At 1052, an encoder or decoder assigns index values to points of the point cloud based on respective positions of the points along the space-filling curve. For example, the points may be assigned index values according to a Morton order.

At 1054, the encoder or decoder selects a first or next level of detail to evaluate to determine which points of the point cloud will be included in the level of detail being evaluated. As mentioned above, the levels of detail may be determined in a bottom-up manner from a least populated level of detail to a most populated level of detail.

At 1056, the encoder or decoder selects a first or next point to evaluate. At 1058, the encoder or decoder identifies a set of neighboring points having index values within a search range (SR1) of an index value of the point being evaluated. At 1060, the encoder or decoder determines respective distances between the point being evaluated and each of the neighboring points in the search range (SR1). At 1062, the encoder or decoder includes in the current level of detail being evaluated neighboring points with respective distances to the point being evaluated that are less than an inclusion distance in the current level of detail being evaluated. Note that points already included in a lower level of detail may not be available to be selected as nearest neighboring or points within the search range (SR1).

At 1064, the encoder or decoder determines whether there are additional points to evaluate for the current level of detail being evaluated. If so, the process reverts to 1056 and a next point is evaluated. If not, at 1066, the encoder or decoder determines whether there are additional levels of detail to evaluate. If not, at 1068 the level of detail refinement process is completed and the determined levels of detail are used to predict attribute values for the respective points of the respective levels of detail. In some embodiments, attribute prediction for a lower level of detail may be performed prior to completing the level of detail process for all higher levels of detail.

If there are additional levels of detail to evaluate, at 1070, the inclusion distance is increased to an inclusion distance for the next higher level of detail and the process reverts to 1054 to determine points to be included in the next level of detail. In some embodiments, a bottom-up approach as described in more detail below may be used.

In some embodiments, a lifting scheme as described below in regard to FIGS. 12A-12B may further implement a bottom-up approach to building the levels of detail (LOD) as described in FIG. 10B and below. For example, instead of determining predicted values for points and then assigning the points to different levels of detail, the predicted values may be determined while determining which points are to be included in which level of detail. Also, in some embodiments, residual values (e.g. attribute correction values or updated attribute correction values) may be determined by comparing the predicted values to the actual values of the original point could. This too may be performed while determining which points are to be included in which levels of detail. Also, in some embodiments, an approximate nearest neighbor search may be used instead of an exact nearest neighbor search to accelerate level of detail creation and prediction calculations. In some embodiments, a binary/arithmetic encoder/decoder may be used to compress/decompress quantized computed wavelet coefficients.

As discussed above, a bottom-up approach may build levels of detail (LODs) and compute predicted attribute values simultaneously. In some embodiments, such an approach may proceed as follows:

Let $(P_i)_{i=1 \ldots N}$ be the set of positions associated with the point cloud points and let $(M_i)_{i=1 \ldots N}$ be the Morton codes (or other order according to a space-filling curve) associated with $(P_i)_{i=1 \ldots N}$. Let $D_0$ and $\rho$ be two user-defined parameters specifying the initial sampling distance and the distance ratio between LODs, respectively. A Morton code (or other order according to a space-filling curve) may be used to represent multi-dimensional data in one dimension, wherein a "Z-Order function" is applied to the multidimensional data to result in the one dimensional representation. Note that $\rho>1$ First the points are sorted according to their associated Morton codes (or other order according to a space-filling curve) in an ascending order. Let I be the array of point indexes ordered according to this process.

The algorithm proceeds iteratively. At each iteration k, the points belonging to the LOD k are extracted and their predictors are built starting from k=0 until all the points are assigned to an LOD.

The sampling distance D is initialized with $D=D_0$

For each iteration k, where k=0 . . . Number of LODs

Let L(k) be the set of indexes of the points belonging to k-th LOD and O(k) the set of points belonging to LODs higher than k. L(k) and O(k) are computed as follows.

First, O(k) and L(k) are initialized if k=0, L(k)←{ }. Otherwise, L(k)←L(k−1)

O(k)←{ }

The point indexes stored in the array I are traversed in order. Each time an index i is selected and its distance (e.g., Euclidean or other distance) to the most recent SR1 points added to O(k) is computed. SR1 is a user-defined parameter that controls the accuracy of the nearest neighbor search. For instance, SR1 could be chosen as 8 or 16 or 64, etc. The smaller the value of SR1 the lower the computational complexity and the accuracy of the nearest neighbor search. The parameter SR1 is included in the bit stream. If any of the SR1 distances is lower than D, then i is appended to the array L(k). Otherwise, i is appended to the array O(k).

In some embodiments, the parameter SR1 could be changed adaptively based on the LOD or/and the number of points traversed. For example, similar parameters as discussed above in regard to adaptive distance based interpolation may also be used to adjust SR1.

In some embodiments, instead of computing an approximate nearest neighbor, an exact nearest neighbor search technique may be applied. For example, all points may be considered for inclusion as nearest neighbors instead of just points within a search range (SR1).

In some embodiments, the exact and approximate neighbor search methods could be combined. In particular, depending on the LOD and/or the number of points in I, the method could switch between the exact and approximate search method. Other criteria, may include the point cloud density, the distance between the current point and the previous one, or any other criteria related to the point cloud distribution.

This process is iterated until all the indexes in I are traversed.

At this stage, L(k) and O(k) are computed and will be used in the next steps to build the predictors associated with the points of L(k).

In some embodiments, a lifting scheme may be applied without determining a hierarchy of levels. In such embodiments, the technique may proceed as follows:

Sort the input points according to the Morton codes associated with their coordinates Encode/decode point attributes according to the Morton order For each point i, look for the h nearest neighbors $(n_1, n_2, \ldots, n_h)$ already processed $(n_j<i)$ Compute the prediction weights as described above.

Apply the adaptive scheme described above in order to adjust the prediction strategy.

Predict attributes and entropy encode them as described below.

Example Decoding Process for Bottom-Up LODs

Figure 11:
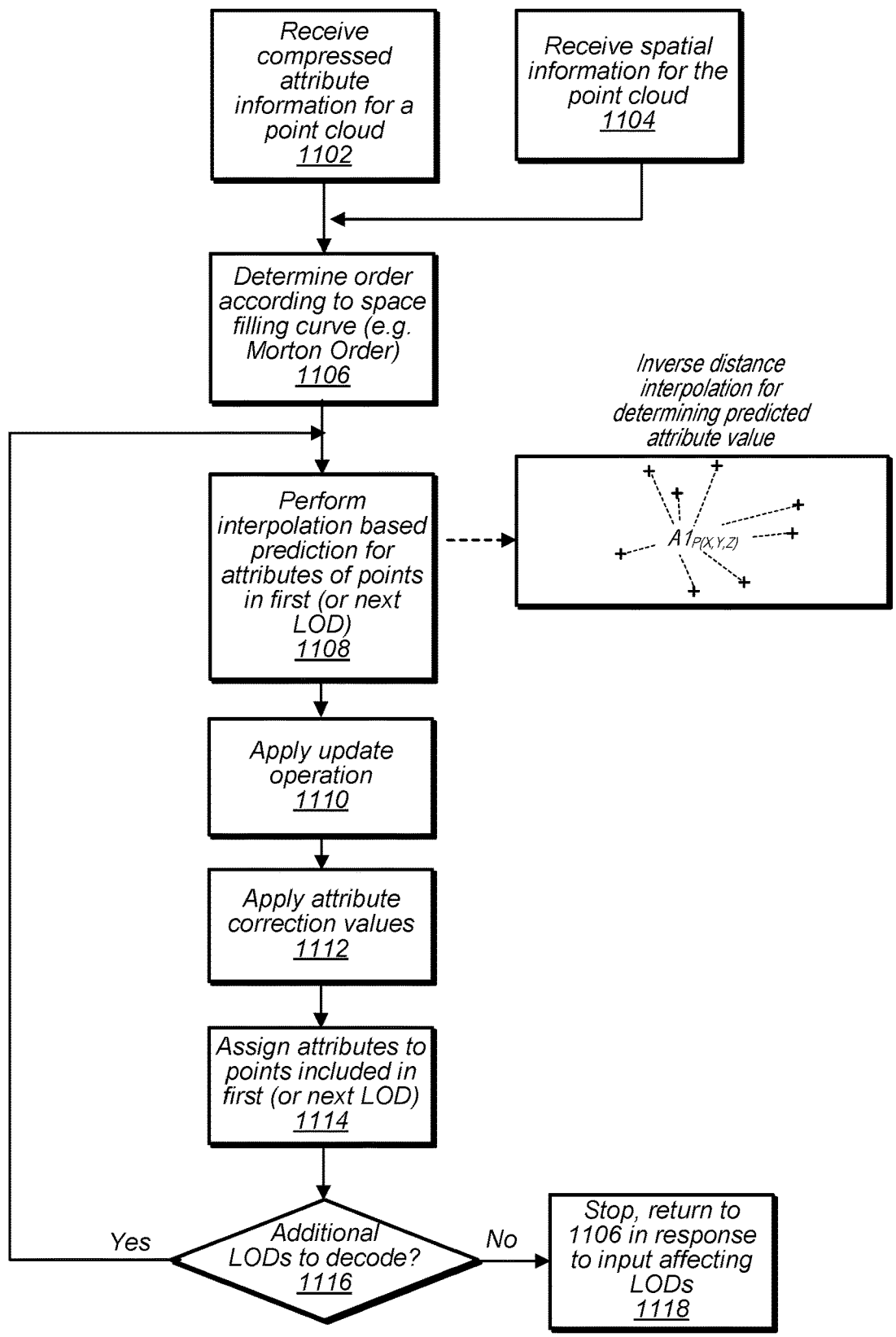
FIG. 11 illustrates an example process of re-constructing attribute values for a point cloud that was compressed using a bottom-up level of detail encoding process, according to some embodiments.

FIG. 11 illustrates a method of decoding attribute information of a point cloud, according to some embodiments.

At 1102, compressed attribute information for a point cloud is received at a decoder. Also, at 1104 spatial information for the point cloud is received at the decoder. In some embodiments, the spatial information may be compressed or encoded using various techniques, such as a K-D tree, Octree, neighbor prediction, etc. and the decoder may decompress and/or decode the received spatial information at 1104.

At 1106, the decoder determines an order of the points of the point cloud based on a space-filling curve. For example, the decoder may recreate a spatial representation of the point cloud based on the spatial information received at 1104 and determine Morton codes of the points of the point cloud. Also the decoder may determine which level of detail of a number of levels of detail to decompress/decode first or next. The selected level of detail to decompress/decode may be determined based on a viewing mode of the point cloud. For example, a point cloud being viewed in a preview mode may require fewer levels of detail to be determined than a point cloud being viewed in a full view mode. Also, a location of a point cloud in a view being rendered may be used to determine a level of detail to decompress/decode. For example, a point cloud may represent an object such as the coffee mug shown in FIG. 8. If the coffee mug is in a foreground of a view being rendered more levels of detail may be determined for the coffee mug. However, if the coffee mug is in the background of a view being rendered, fewer levels of detail may be determined for the coffee mug. In some embodiments, a number of levels of detail to determine for a point cloud may be determined based on a data budget allocated for the point cloud.

At 1108 points included in the first level of detail (or next level of detail) being determined may be determined as described herein. For the points of the level of detail being evaluated, attribute values of the points may be predicted based on an inverse distance weighted interpolation based on the k-nearest neighbors (also referred to herein as "h"-nearest neighbors for an approximate nearest neighbor search) to each point being evaluated, where k (or h) may be a fixed or adjustable parameter. Also, the nearest neighbor search may be an approximate nearest neighbor search that evaluates only points within a search range (SR1) of a particular point being evaluated based on an index value of the point being evaluated and index values of the neighboring points in the order according to the space filling curve instead of evaluating all points of the point cloud to determine nearest neighbors.

Figure 12A:
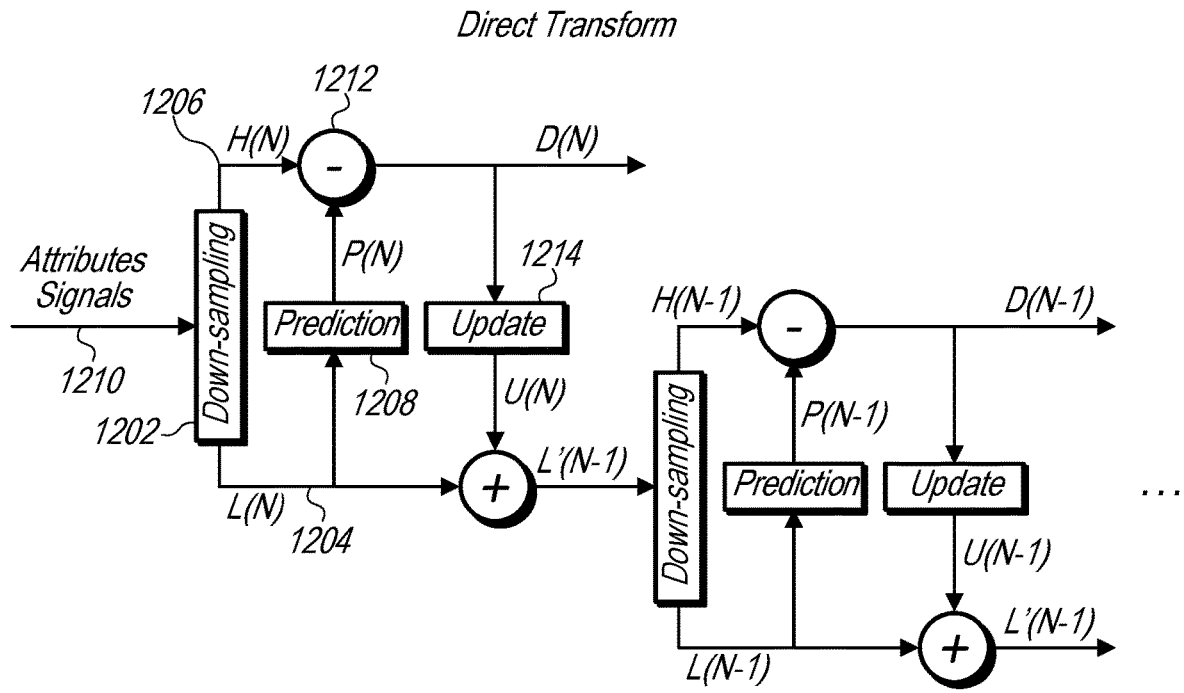
FIG. 12A illustrates a direct transformation that may be applied at an encoder to encode attribute information of a point could, according to some embodiments.
Figure 12B:
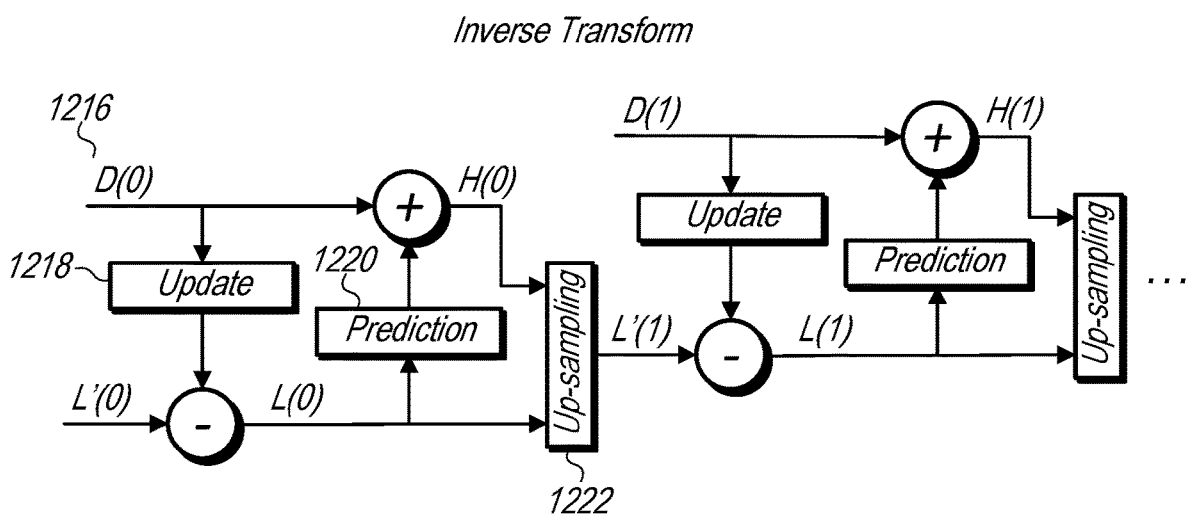
FIG. 12B illustrates an inverse transformation that may be applied at a decoder to decode attribute information of a point cloud, according to some embodiments.

At 1110, in some embodiments, an update operation may be performed on the predicted attribute values as described in more detail in FIGS. 12A-12B.

At 1112, attribute correction values included in the compressed attribute information for the point cloud may be decoded for the current level of detail being evaluated and may be applied to correct the attribute values predicted at 1108 or the updated predicted attribute values determined at 1110.

At 1114, the corrected attribute values determined at 1112 may be assigned as attributes to the points of the first level of detail (or the current level of detail being evaluated). In some embodiments, the attribute values determined for subsequent levels of details may be assigned to points included in the subsequent levels of detail while attribute values already determined for previous levels of detail are retained by the respective points of the previous level(s) of detail. In some embodiments, new attribute values may be determined for sequential levels of detail.

In some embodiments, the spatial information received at 1104 may include spatial information for multiple or all levels of detail of the point cloud, or may include spatial information for a single level of detail or fewer than all levels of detail of the point cloud. In some embodiments, level of detail attribute information may be sequentially received by a decoder. For example, a decoder may receive a first level of detail and generate attribute values for points of the first level of detail before receiving attribute information for one or more additional levels of detail.

At 1116 it is determined if there are additional levels of detail to decode. If so, the process returns to 1108 and is repeated for the next level of detail to decode. If not the process is stopped at 1118, but may resume at 1106 in response to input affecting the number of levels of detail to determine, such as change in view of a point cloud or a zoom operation being applied to a point cloud being viewed, as a few examples of an input affecting the levels of detail to be determined.

Lifting Schemes for Level of Detail Compression and Decompression

In some embodiments, lifting schemes may be applied to point clouds. For example, as described below, a lifting scheme may be applied to irregular points. This is in contrast to other types of lifting schemes that may be applied to images having regular points in a plane. In a lifting scheme, for points in a current level of detail nearest points in a lower level of detail are found. These nearest points in the lower level of detail are used to predict attribute values for points in a higher level of detail. Conceptually, a graph could be made showing how points in lower levels of detail are used to determine attribute values of points in higher levels of detail. In such a conceptual view, edges could be assigned to the graph between levels of detail, wherein there is an edge between a point in a higher level of detail and each point in the lower level of detail that forms a basis for the prediction of the attribute of the point at the higher level of detail. As described in more detail below, a weight could be assigned to each of these edges indicating a relative influence. The weight may represent an influence an attribute value of the point in the lower level of detail has on the attribute value of the points in the higher level of detail. Also, multiple edges may make a path through the levels of detail and weights may be assigned to the paths. In some embodiments, the influence of a path may be defined by the sum of the weights of the edges of the path. For example, equation 1 discussed further below represents such a weighting of a path.

In a lifting scheme, attribute values for low influence points may be highly quantized and attribute values for high influence points may be quantized less. In some embodiments, a balance may be reached between quality of a reconstructed point cloud and efficiency, wherein more quantization increases compression efficiency and less quantization increases quality. In some embodiments, all paths may not be evaluated. For example, some paths with little influence may not be evaluated. Also, an update operator may smooth residual differences, e.g. predicted attribute values that are used to determine attribute correction values, in order to increase compression efficiency while taking into account relative influence or importance of points when smoothing the residual differences.

FIG. 12A illustrates a direct transformation that may be applied at an encoder to encode attribute information of a point could, according to some embodiments.

In some embodiments, an encoder may utilize a direct transformation as illustrated in FIG. 12A in order to determine attribute correction values that are encoded as part of a compressed point cloud. For example, in some embodiments a direct transformation, such as interpolation based prediction, may be utilized to determine attribute values as described in FIG. 10A at 1008 and to apply an update operation as described in FIG. 10A at 1012.

In some embodiments, a direct transform may receive attribute signals for attributes associated with points of a point cloud that is to be compressed. For example, the attributes may include color values, such as RGB colors, or other attribute values of points in a point cloud that is to be compressed. The geometry of the points of the point cloud to be compressed may also be known by the direct transform that receives the attribute signals. At 1202, the direct transform may include a split operator that splits the attribute signals 1210 for a first (or next) level of detail. For example, for a particular level of detail, such as LOD(N), comprising X number of points, a sub-sample of the attributes of the points, e.g. a sample comprising Y points, may comprise attribute values for a smaller number of points than X. Said another way, the split operator may take as an input attributes associated with a particular level of detail and generate a low resolution sample 1204 and a high resolution sample 1206. It should be noted that a LOD structure may be partitioned into refinement levels, wherein subsequent levels of refinement include attributes for more points than underlying levels of refinement. A particular level of detail as described below is obtained by taking the union of all lower level of detail refinements. For example, the level of detail j is obtained by taking the union of all refinement levels R(0), R(1), . . . , R(j). It should also be noted, as described above, that a compressed point cloud may have a total number of levels of detail N, wherein R(0) is the least refinement level of detail and R(N) is the highest refinement level of detail for the compressed point cloud.

At 1208, a prediction for the attribute values of the points not included in the low resolution sample 1204 is predicted based on the points included in the low resolution sample. For example, based on an inverse distance interpolation prediction technique or any of the other prediction techniques described above. At 1212, a difference between the predicted attribute values for the points left out of low resolution sample 1204 is compared to the actual attribute values of the points left out of the low resolution sample 1204. The comparison determines differences, for respective points, between a predicted attribute value and an actual attribute value. These differences (D(N)) are then encoded as attribute correction values for the attributes of the points included in the particular level of detail that are not encoded in the low resolution sample. For example, for the highest level of detail N, the differences D(N) may be used to adjust/correct attribute values included in lower levels of detail. Because at the highest level of detail, the attribute correction values are not used to determine attribute values of other even higher levels of detail (because for the highest level of detail, N, there are not any higher levels of detail), an update operation to account for relative importance of these attribute correction values may not be performed. As such, the differences D(N) may be used to encode attribute correction values for LOD(N).

In addition, the direct transform may be applied for subsequent lower levels of detail, such as LOD(N−1). However, before applying the direct transform for the subsequent level of detail, an update operation may be performed in order to determine the relative importance of attribute values for points of the lower level of detail on attribute values of one or more upper levels of detail. For example, update operation 1214 may determine relative importances of attribute values of attributes for points included in lower levels of detail on higher levels of detail, such as for attributes of points included in L(N). The update operator may also smooth the attributes values to improve compression efficiency of attribute correction values for subsequent levels of detail taking into account the relative importance of the respective attribute values, wherein the smoothing operation is performed such that attribute values that have a larger impact on subsequent levels of detail are modified less than points that have a lesser impact on subsequent levels of detail. Several approaches for performing the update operation are described in more detail below. The updated lower resolution sample of level of detail L'(N) is then fed to another split operator and the process repeats for a subsequent level of detail, LOD(N−1). Note that attribute signals for the lower level of detail, LOD(N−1) may also be received at the second (or subsequent) split operator.

FIG. 12B illustrates an inverse transformation that may be applied at a decoder to decode attribute information of a point cloud, according to some embodiments.

In some embodiments, a decoder may utilize an inverse transformation process as shown in FIG. 11 to reconstruct a point cloud from a compressed point cloud. For example, in some embodiments, performing prediction as described in FIG. 11 at 1108, applying an update operator as described in FIG. 11 at 1110, applying attribute correction values as described in FIG. 11 at 1112 and assigning attributes to points in a level of detail as described in FIG. 11 at 1114, may be performed according to an inverse transformation process as described in FIG. 12B.

In some embodiments, an inverse transformation process may receive an updated low level resolution sample L'(0) for a lowest level of detail of a LOD structure. The inverse transformation process may also receive attribute correction values for points not included in the updated low resolution sample L'(0). For example, for a particular LOD, L'(0) may include a sub-sampling of the points included in the LOD and a prediction technique may be used to determine other points of the LOD, such as would be included in a high resolution sample of the LOD. The attribute correction values may be received as indicated at 1206, e.g. D(0). At 1218 an update operation may be performed to account for the smoothing of the attribute correction values performed at the encoder. For example, update operation 1218 may "undo" the update operation that was performed at 1214, wherein the update operation performed at 1214 was performed to improve compression efficiency by smoothing the attribute values taking into account relative importance of the attribute values. The update operation may be applied to the updated low resolution sample L'(0) to generate an "un-smoothed" or non-updated low resolution sample, L(0). The low resolution sample L(0) may be used by a prediction technique at 1220 to determine attribute values of points not included in the low resolution sample. The predicted attribute values may be corrected using the attribute correction values, D(0), to determine attribute values for points of a high resolution sample of the LOD(0). The low resolution sample and the high resolution sample may be combined at merge operator 1222, and a new updated low resolution sample for a next level of detail L'(1) may be determined. A similar process may be repeated for the next level of detail LOD(1) as was described for LOD(0). In some embodiments, an encoder as described in FIG. 12A and a decoder as described in FIG. 12B may repeat their respective processes for N levels of detail of a point cloud.

In some embodiments, the bottom-up LODs as discussed above with regard to FIGS. 10A-10B may further be used in a lifting scheme as described in FIGS. 12A-12B.

a. More precisely, let R(k)=L(k)\L(k−1) (where \ is the difference operator) be the set of points that need to be added to LOD(k−1) to get LOD(k). For each point i in R(k), find the h-nearest neighbors (h is user-defined parameters that controls the maximum number of neighbors used for prediction) of i in O(k) and compute the prediction weights $(\alpha_j(i))_{j=1\ldots h}$ associated with i. The algorithm proceeds as follows.

b. Initialize a counter j=0 c. For each point i in R(k)

i. Let $M_i$ be the Morton code associated with i and let $M_j$ be the Morton code associated with j-th element of the array O(k)

ii. While ($M_i \geq M_j$ and j<SizeOf(O(k))), incrementing the counter j by one (j←j+1)

iii. Compute the distances of $M_i$ to the points associated with the indexes of O(k) that are in the range [j−SR2, j+SR2] of the array and keep track of the h-nearest neighbors $(n_1, n_2, \ldots, n_h)$ and their associated squared distances($d_{n_1}^2(i), d_{n_2}^2(i) \ldots, d_{n_h}^2(i)$). SR2 is a user-defined parameter that controls the accuracy of the nearest neighbor search. Possible values for SR2 are 8, 16, 32, and 64. The smaller the value of SR2 the lower the computational complexity and the accuracy of the nearest neighbor search. The parameter SR2 is included in the bit stream. The computation of the prediction weights used for attribute prediction may be the same as described above.

a. The parameter SR2 could be changed adaptively based on the LOD or/and the number of points traversed.

b. In some embodiments, instead of computing an approximate nearest neighbor, an exact nearest neighbor search technique may be used.
c. In some embodiments, the exact and approximate neighbor search methods could be combined. In particular, depending on the LOD and/or the number of points in I, the method could switch between the exact and approximate search method. Other criteria, may include the point cloud density, the distance between the current point and the previous one, or any other criteria related to the point cloud distribution.
d. If the distance between the current point and the last processed point is lower than a threshold, use the neighbors of the last point as an initial guess and search around them. The threshold could be adaptively chosen based on similar criteria as those described above. The threshold could be signaled in the bit stream or known to both encoder and decoder.
e. The previous idea could be generalized to n=1, 2, 3, 4 . . . last points
f. Exclude points with a distance higher that a user-defined threshold. The threshold could be adaptively chosen based on similar criteria as those described above. The threshold could be signaled in the bitstream or known to both encoder and decoder.
d. I←O(k)
e. D←D×ρ
f. The approach described above could be used with any metric (e.g., L2, L1, Lp) or any approximation of these metrics. For example, in some embodiments distance comparisons may use a Euclidean distance comparison approximation, such as a Taxicab/Manhattan/L1 approximation, or an Octagonal approximation.

More detailed example definitions of LODs and methods to determine update operations are described below.

In some embodiments, LODs are defined as follows:
LOD(0)=R(0)
LOD(1)=LOD(0)∪R(1)
. . .
LOD(j)=LOD(j−1)∪R(j)
. . .
LOD(N+1)=LOD(N)∪R(N)=entire point cloud In some embodiments, let A be a set of attributes associated with a point cloud. More precisely, let A(P) be the scalar/vector attribute associated with the point P of the point cloud. An example of attribute would be color described by RGB values.

Let L(j) be the set of attributes associated with LOD(j) and H(j) those associated with R(j). Based on the definition of level of details LOD(j), L(j) and H(j) verify the following properties:
L(N+1)=A and H(N+1)={ }
L(j)=L(j−1)∪H(j)
L(j) and H(j) are disjointed.

In some embodiments, a split operator, such as split operator 1202, takes as input L(j+1) and generates two outputs: (1) the low resolution samples L(j) and (2) the high resolution samples H(j).

In some embodiments, a merge operator, such as merge operator 1222, takes as input L(j) and H(j) and produces L(j+1).

As described in more detail above, a prediction operator may be defined on top of an LOD structure. Let (P(i,j))_i be the set points of LOD(j) and (Q(i,j))_i those belonging to R(j) and let (A(P(i,j)))_i and (A(Q(i,j)))_i be the attribute values associated with LOD(j) and R(j), respectively.

In some embodiments, a prediction operator predicts the attribute value A(Q(i, j)) by using the attribute values of its k nearest neighbors (or h-approximate nearest neighbors) in LOD(j−1), denoted $\nabla(Q(i, j))$:

$$Pred(Q(i, j)) = \sum_{P \in \nabla(Q(i,j))} \alpha(P, Q(i, j)) A(P)$$

where α(P,Q(i, j)) are the interpolation weights. For instance, an inverse distance weighted interpolation strategy may be exploited to compute the interpolation weights.

The prediction residuals, e.g. attribute correction values, D(Q(i, j)) are defined as follows:

$$D(Q(i,j)) = A(Q(i,j)) - Pred(Q(i,j))$$

Note that the prediction hierarchy could be described by an oriented graph G defined as follows:
Every point Q in point cloud corresponds to a vertex V(Q) of graph G.
Two vertices of the graph G, V(P) and V(Q), are connected by an edge E(P,Q), iff there exist i and j such that
Q=Q(i, j) and
P∈∇(Q(i, j))
The edge E(Q, P), has weight α(P,Q(i, j)).

In such a prediction strategy as described above, points in lower levels of detail are more influential since they are used more often for prediction.

Let w(P) be the influence weight associated with a point P. w(P) could be defined in various ways.
Approach 1
Two vertices V(P) and V(Q) of G are said to be connected if there is a path x=(E(1), E(2), . . . , E(s)) of edges of G that connects them. The weight w(x) of the path x is defined, as follows:

$$w(x) = \prod_{s=1}^{s} \alpha(E(s))$$

Let X(P) be the set of paths having P as destination. w(P) is defined as follows:

$$w(P) = 1 + \Sigma_{x \in X(P)} (w(x))^2 \quad [\text{EQ. 1}]$$

The previous definition could be interpreted as follows. Suppose that the attribute A(P) is modified by an amount ∈, then all the attributes associated with points connected to P are perturbed. Sum of Squared Errors associated with such perturbation, denoted SSE(P, ∈) is given by:

$$SSE(P, \in) = w(P) \in^2$$

Approach 2
Computing the influence weights as described previously may be computationally complex, because all the paths need to be evaluated. However, since the weights α(E(s)) are usually normalized to be between 0 and 1, the weight w(x) of a path x decays rapidly with the number of its edges. Therefore, long paths could be ignored without significantly impacting the final influence weight to be computed.
Based on the previous property, the definition in [EQ. 1] may be modified to only consider paths with a limited length or to discard paths with weights known to be lower that a user-defined threshold. This threshold could be fixed and known at both the encoder and decoder, or could be explicitly signaled at or predefined for different stages of the encoding process, e.g. once for every frame, LOD, or even after a certain number of signaled points.

Approach 3
w(P) could be approximated by the following recursive procedure:
Set w(P)=1 for all points
Traverse the points according to the inverse of the order defined by the LOD structure
For every point Q(i, j), update the weights of its neighbors P∈∇(Q(i, j)) as follows:
w(P)←w(P)+w(Q(i,j),j){α(P,Q(i,j))}$^\gamma$
where γ is a parameter usually set to 1 or 2.

Approach 4
w(P) could be approximated by the following recursive procedure:
Set w(P)=1 for all points
Traverse the points according to the inverse of the order defined by the LOD structure
For every point Q(i, j), update the weights of its neighbors P∈∇(Q(i, j)) as follows:
w(P)←w(P)+w(Q(i,j),j)f{α(P,Q(i,j))}
where f(x) is some function with resulting values in the range of [0, 1].

In some embodiments, an update operator, such as update operator 1214 or 1218, uses the prediction residuals D(Q(i, j)) to update the attribute values of LOD(j). The update operator could be defined in different ways, such as:

Approach 1
1. Let Δ(P) be the set of points Q(i, j) such that P∈∇(Q(i,j)).
2. The update operation for P is defined as follows:

$$\text{Update}(P) = \frac{\sum_{Q \in \Delta(P)} [\{\alpha(P, Q)\}^\gamma \times w(Q) \times D(Q)]}{\sum_{Q \in \Delta(P)} [\{\alpha(P, Q)\}^\gamma \times w(Q)]}$$

where γ is a parameter usually set to 1 or 2.

Approach 2
1. Let Δ(P) be the set of points Q(i, j) such that P∈∇(Q(i,j)).
2. The update operation for P is defined as follows:

$$\text{Update}(P) = \frac{\sum_{Q \in \Delta(P)} [g\{\alpha(P, Q)\} \times w(Q) D(Q)]}{\sum_{Q \in \Delta(P)} [g\{\alpha(P, Q)\} \times w(Q)]}$$

where g(x) is some function with resulting values in the range of [0, 1].

Approach 3
Compute Update(P) iteratively as follows:
1. Initially set Update(P)=0
2. Traverse the points according to the inverse of the order defined by the LOD structure
3. For every point Q(i,j), compute the local updates (u(1), u(2), . . . , u(k)) associated with its neighbors ∇(Q(i,j))={P(1), P(2), . . . , P(k)} as the solution to the following minimization problem:

(u(1),u(2), . . . ,u(k))=argmin {$\Sigma_{r=1}^{k}$(u(r))$^2$+(D(Q(i,j))−$\Sigma_{r=1}^{k}$α(P(r), Q(i, j)) u(k))$^2$}

4. Update Update(P(r)):
Update(P(r))←Update(P(r))+u(r)

Approach 4
Compute Update(P) iteratively as follows:
1. Initially set Update(P)=0
2. Traverse the points according to the inverse of the order defined by the LOD structure
3. For every point Q(i,j), compute the local updates (u(1), u(2), . . . , u(k)) associated with its neighbors ∇(Q(i,j))={P(1), P(2), . . . , P(k)} as the solution to the following minimization problem:
(u(1), u(2), . . . , u(k))=argmin {h(u(1), . . . , u(k), D(Q(i, j)))}
Where h can be any function.
4. Update Update(P(r)):
Update(P(r))←Update(P(r))+u(r)

In some embodiments, when leveraging a lifting scheme as described above, a quantization step may be applied to computed wavelet coefficients. Such a process may introduce noise and a quality of a reconstructed point cloud may depend on the quantization step chosen. Furthermore, as discussed above, perturbing the attributes of points in lower LODs may have more influence on the quality of the reconstructed point cloud than perturbing attributes of points in higher LODs.

In some embodiments, the influence weights computed as described above may further be leveraged during the transform process in order to guide the quantization process. For example, the coefficients associated with a point P may be multiplied with a factor of {w(P)}$^\beta$, where β is a parameter usually set to β=0.5. An inverse scaling process by the same factor is applied after inverse quantization on the decoder side.

In some embodiments, the values of the β parameters could be fixed for the entire point cloud and known at both the encoder and decoder, or could be explicitly signaled at or predefined for different stages of the encoding process, e.g. once for every point cloud frame, LOD, or even after a certain number of signaled points.

In some embodiments, a hardware-friendly implementation of the lifting scheme described above may leverage a fixed-point representation of the weights and lookup tables for the non-linear operations.

In some embodiments, a lifting scheme as described herein may be leveraged for other applications in addition to compression, such as de-noising/filtering, watermarking, segmentation/detection, as well as various other applications.

In some embodiments, a decoder may employ a complimentary process as described above to decode a compressed point cloud compressed using an octree compression technique and binary arithmetic encoder as described above.

Binary Arithmetic Coding of Quantized Lifting Coefficients Using Key-Word Mapping In some embodiments, lifting scheme coefficients may be non-binary values. In some embodiments, an arithmetic encoder may be included as a component of encoder 202 illustrated in FIG. 2A and may use a binary arithmetic codec to encode lifting scheme coefficients (e.g. updated attribute correction values) using key-word mapping and a look-up table.

Figure 13:
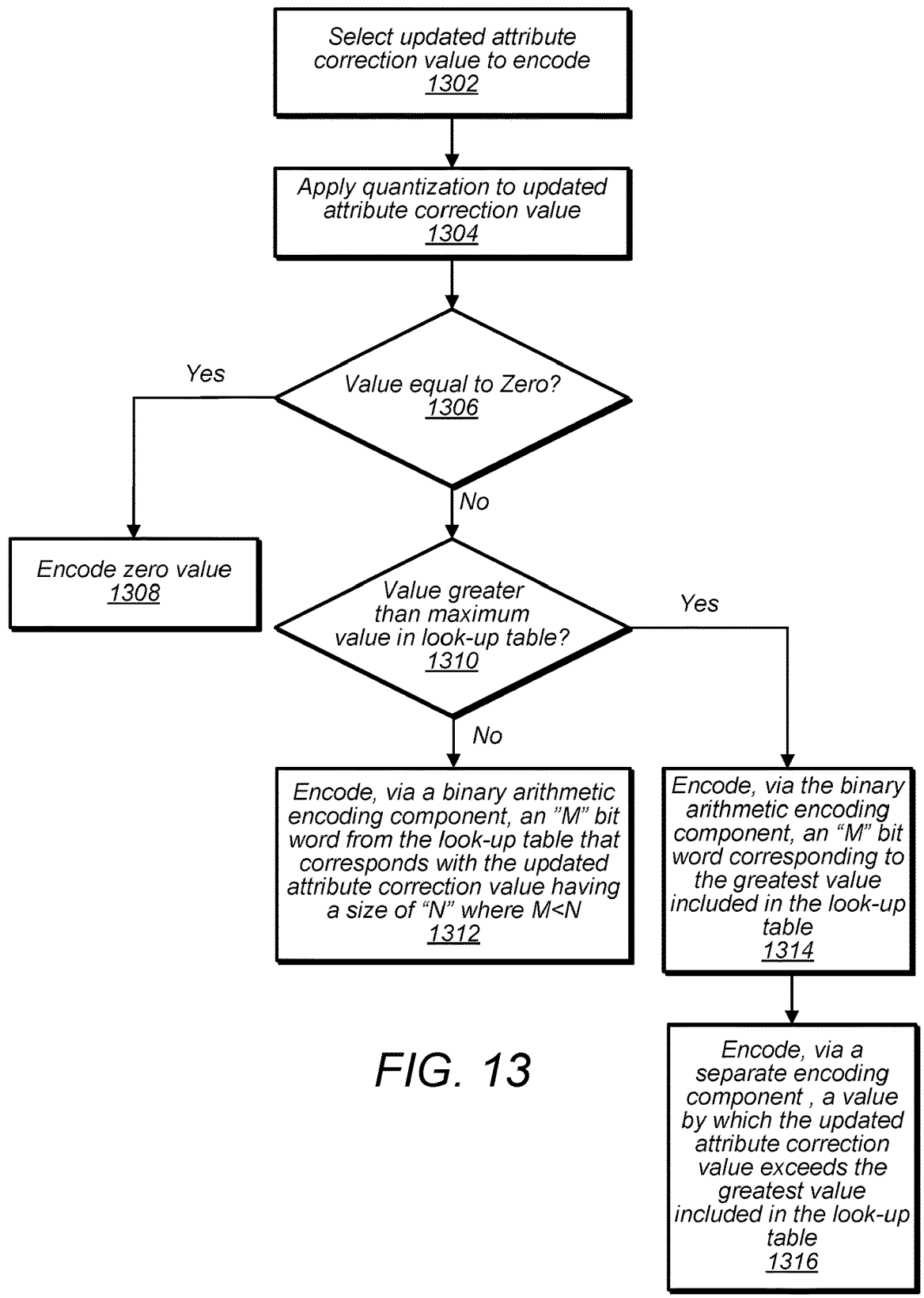
FIG. 13 illustrates a key-word mapping process using a look-up table that may be used to compress updated attribute correction values, according to some embodiments.

FIG. 13 illustrates a key-word mapping process using a look-up table that may be used to compress updated attribute correction values, according to some embodiments.

At 1302, the encoder selects a lifting scheme coefficient (e.g. updated attribute correction value) to encode and at 1304 the encoder applies a quantization to the lifting scheme coefficient (e.g. updated attribute correction value).

At 1306, the encoder determines whether the lifting scheme coefficient (e.g. updated attribute correction value) has a value of zero or not. If the value is zero, at 1308 the encoder encodes a zero value. If not, the encoder determines, at 1310, whether the lifting scheme coefficient (e.g. updated attribute correction value) has a value equal to or greater than a highest N-bit value supported by a look-up table (e.g. 255) (e.g. a greatest alphabet value). If the value is less than the maximum value, the encoder encodes, at 1312, an "M" bit code word corresponding to an "N" bit value for the lifting scheme coefficient (e.g. updated attribute correction value). The "M" bit code word may be an entry in the look-up table corresponding to the "N" bit value, wherein the "M" bit code word includes fewer bits than the "N" bit value. A decoder may maintain a similar look-up table and may be able to determine the "N" bit value by looking up the "M" bit code word in the look-up table maintained by the decoder.

If the "N" bit value is greater than a maximum "N" bit value included in the look-up table, the encoder may, at 1314, encode an "M" bit code word corresponding to the greatest "N" bit value included in the look-up table and additionally encode, at 1316, a difference between the greatest "N" bit value in the look-up table and the actual value for the lifting scheme coefficient (e.g. updated attribute correction value). In some embodiments, the encoder may encode the "M" bit word using a binary arithmetic encoding component and may encode the difference using another encoding component, such as an exponential Golomb encoding component.

For example, in more detail, the technique may proceed as follows:

Mono-dimensional attribute
  Let C be the quantized coefficient to be encoded. First C is mapped to a positive number using a function that maps positive numbers to even numbers and negative numbers to odd numbers.
  Let M(C) be the mapped value.
  A binary value is then encoded to indicate whether C is 0 or not
  If C is not zero, then two cases are distinguished
    If M(C) is higher or equal than alphabetSize (e.g. the number of symbols supported by the binary arithmetic encoding technique), then the value alphabetSize is encoded by using the method described above. The difference between M(C) and alphabetSize is encoded by using an exponential Golomb coding
    Otherwise, the value of M(C) is encoded using the method described above.

Three-dimensional signal
  Let C1, C2, C3 be the quantized coefficients to be encoded. Let K1, and K2 be two indexes for the contexts to be used to encode the quantized coefficients, C1, C2, and C3.
  First C1, C2 and C3 are mapped to a positive number as described above. Let M(C1), M(C2) and M(C3) be the mapped values of C1, C2, and C3.
  M(C1) is encoded.
  M(C2) is encoded while choosing different contexts (i.e., binary arithmetic contexts and the binarization context) based on the condition of whether C1 is zero or not.
  M(C3) is encoded while choosing different contexts based on the conditions C1 is zero or not and C2 is zero or not. If C1 is zero it is known that the value is at least 16. If the condition C1 is zero use the binary context K1, if the value is not zero, decrement the value by 1 (it is known that the value is at least one or more), then check the value is below the alphabet size, if so encode the value directly. Otherwise, encode maximum possible value for the alphabet size. The difference between the maximum possible value for the alphabet size and the value of M(C3) will then be encoded using exponential Golomb encoding.

Multi-dimensional signal
  The same approach described above could be generalized to a d-dimensional signal. Here, the contexts to encode the k-th coefficient depending on the values of the previous coefficients (e.g., last 0, 1, 2, 3, . . . , k−1 coefficients).
  The number of previous coefficients to consider could be adaptively chosen depending on any of the criteria described in the previous section for the selection of SR1 and SR2.

Alternative Low-Complexity Level of Detail Generation Procedure

As discussed above, a level of detail (LOD) structure partitions the point cloud into non-overlapping subsets of points referred to as refinement levels, e.g. $(R\_1)\_(l=0 \ldots L-1)$. In some embodiments in which a distance-based approach is used to determine level of detail refinement levels (such as those discussed above), the refinement levels are determined according to a set of Euclidian distances $(d\_l)\_(l=0 \ldots L-1)$ specified by the user, in a way, that the entire point cloud is represented by the union of all the refinements levels. The level of detail l, 〖LOD〗_l, is obtained by taking the union of the refinement levels R_0, R_1, . . . , R_l as follows:

LOD_0=R_0
  LOD_1=LOD_0∪R_1 . . .
  LOD_l=LOD_(l−1)∪R_l . . .
  LOD_(L−1)=LOD_(L−2)∪R_(L) represents entire point cloud Points in each refinement level R_l are extracted in such a way that the Euclidian distances between the points in that particular LOD are greater than or equal to a user defined threshold D. As the level-of-detail j increases, D decreases and more points are included in-between the points in the lower LOD, therefore increasing the point cloud reconstruction detail. Attributes of a point in R_l are then predicted from k nearest-neighbor points in LOD_(l−1) (or the h-approximate nearest neighboring points). Finally, the prediction residue (e.g. the attribute correction values), i.e. the difference between actual and predicted values of attributes, is encoded using an entropy encoder, e.g. an arithmetic encoder.

The distance-based LOD generation process tries to guarantee a uniform sampling throughout the different LODs (see FIG. 9A). Such a strategy offers efficient prediction results for smooth attribute signals defined over uniformly or near uniformly sampled point clouds.

LOD Generation Using a Space Filling Curve

In some embodiments, a low-complexity LOD generation process that utilizes a space filling curve to order points and determine refinement levels may be used. The spatial information may be encoded using any of the techniques described above for encoding spatial information, such as K-D trees, octree encoding, sub-sampling and inter-point prediction, etc. In this way both the encoder and the decoder may know the spatial locations of the points of the point cloud. However, instead of determining which points are to be included in respective refinement levels based on distances between the points as is described above, the points to be included in respective levels of details may be determined by ordering the points according to their location along a space filling curve. For example, the points may be organized according to their Morton codes. Alternatively, other space filling curves could be used. For example, techniques to map positions (e.g., in X, Y, Z coordinate form) to a space filling curve such as a Morton-order (or Z-order), Hillbert curve, Peano curve, and so on may be used. In this way all of the points of the point cloud that are encoded and decoded using the spatial information may be organized into an index in the same order on the encoder and the decoder. In order to determine various refinement levels, sampling rates for the ordered index of the points may be defined. For example, to divide a point cloud into four levels of detail, an index that maps a Morton value to a corresponding point may be sampled, for example at a rate of four, where every fourth indexed point is included in the lowest level refinement. For each additional level of refinement remaining points in the index that have not yet been sampled may be sampled, for example every third index point, etc. until all of the points are sampled for a highest level of detail. For example, a low-complexity LOD generation process that utilizes a space filling curve to order points and determine refinement levels, may proceed as follows:

First, the points (for which spatial information is already known) may be ordered according to a space filling curve. For example, the points may be ordered according to their Morton codes, as an example.

Then, Let $I_{L-1}$ be the set of ordered indexes and $LOD_{L-1}$ the associated LOD that represents the entire point cloud.

Next, define a set of sampling rates denoted $(k_l)_{l=0 \ldots L-1}$, where $k_l$ is an integer describing the sampling rate for the LOD l.

$k_l$ can be automatically determined based on the characteristics of the signal and/or the point cloud distribution, previous statistics, or could be fixed.

$k_l$ can be provided as user-defined parameter (e.g., 4).

The sampling rate $k_l$ could be further updated within an LOD in order to better adapt to the point cloud distribution. More precisely, the encoder may explicitly encode in the bit stream for a predefined group of points (e.g., each consecutive H=1024 points) different values or updates to be applied to the latest available $k_l$ value.

Next, the ordered array of indexes associated with LOD l=L−2, L−3, ..., 0, denoted as $I_l$, is computed by subsampling $I_{l+1}$, while keeping one index out of every $k_l$ indexes.

In some embodiments, different subsampling rates may be defined per attribute (e.g., color, reflectance) and per channel (e.g., Y and U/V), etc.

Combined Ordering/Sampling LOD Method

In some embodiments, the low-complexity LOD generation process that utilizes a space filling curve to order points and determine refinement levels may be combined with a distance-based prediction method as described in earlier sections above. For example, for portions of a point cloud with smooth attribute signals that are regularly sampled, a distance-based attribute prediction strategy may be used. However, for portions of the point cloud that include non-smooth attribute signals that irregularly sampled, a low-complexity LOD generation process that utilizes a space filling curve to order points and determine refinement levels may be used. In some embodiments, switching between the distance-based LOD generation process and the low-complexity LOD generation process using a space filling curve may be operated at:

Group of points level,
LOD level,
Slice level, and/or
Frame level.

Adaptive Scanning Mode

In some embodiments, prediction between levels of detail may also be used to determine predicted attribute values for the various levels of detail. As discussed earlier, attribute correction values may also be encoded for points, wherein the attribute correction values represent a difference between a predicted value and an original or pre-compression value for the attribute.

In some embodiments, instead of using a single prediction order, as described above for the distance-based LOD generation process, a prediction mode in a low-complexity complexity LOD generation process using a space filling curve may allow for improved coding efficiency by selecting the prediction direction that gives an improved rate-distortion performance. For example, in one case LOD0 may use the Morton order and in another case may use the inverse Morton order. In another case the traversal of the points may start from the center or any point explicitly signaled by the encoder. In another case, the point order obtained after geometry decoding may be used. The scanning order could also be explicitly encoded in the bit stream or agreed between encoder and decoder. For example, the encoder may explicitly signal to the decoder that a point should be skipped and processed at a later time. Signaling of this mode and its associate parameters could be done at the sequence/frame/tile/slice/LOD/group of points level.

In some embodiments, an adaptive scanning mode may be used in other codecs where higher LODs also permit prediction of their samples from current LOD samples. This may of course impact the decoding process of that LOD (e.g. limit its parallelization capability). Parallelization, however, could still be achieved by defining "independent" decoding groups within an LOD. Such groups may allow parallel decoding by not permitting prediction across them. However, prediction using the lower level LOD as well as decoded samples within the current LOD group may be permitted.

In some embodiments, an encoder may select the appropriate adaptive scanning mode by utilizing rate distortion optimization (RDO) strategies. In some embodiments, an encoder may further take into account various additional criteria, such as computational complexity, battery life, memory requirement, latency, pre-analysis, collected statistics of past frames (history), user feedback, etc.

Adaptive Scanning Offset Mode

In some embodiments, another mode that may be applied in a low-complexity complexity LOD generation process using a space filling curve may be an "alternate sampling phase/offset" mode. For example, an encoder may signal to the decoder the sampling offset (e.g., a sampling offset 1 may provide better rate distortion (RD) performance than offset 0) that is used for selecting which points should be sampled from the current LOD when generating the next LOD level. For example, instead of beginning the sampling of the ordered Morton codes with the first Morton code for the first point, the sampling may begin at an offset value, e.g.

the second, third, etc. Morton code. This could have an impact in performance since this could alter the coding and prediction process for each LOD. Signaling of the sampling offset could be done at the sequence/frame/tile/slice/LOD/ group of points level.

Attribute Interleaving Mode

In some embodiments, attributes/attribute channels of the point cloud could be interleaved at different levels when predicting and coding/decoding the residual data (e.g. attribute correction values) at each LOD level. In particular, interleaving could be done at:

Point level,
Group of points level,
LOD level,
Slice level, and/or
Frame level.

In some embodiments, interleaving may be done at the attribute channel level. For example, color channels may be interleaved together, while other attributes are only interleaved at the LOD level. However, in some embodiments, different combinations could be used for different types of attribute data. The interleaving method could be fixed and known between encoder and decoder, but could also be adaptive and could be signaled at different levels of the bit stream. The decision for the method used could be based on rate distortion (RD) criteria, pre-analysis, past encoding statistics, encoding/decoding complexity, or some other criteria that a user or system has determined.

Inter Attribute/Cross-Component Prediction

In some embodiments, different interleaving methods may permit also inter-attribute/attribute channel prediction, which may result in more coding benefits. For instance, for YCbCr data, the Cb and Cr color components could be predicted through their luma component. Such a prediction mode could be selected at various levels, such as:

Point level,
Group of points level,
LOD level,
Slice level, and/or
Frame level.

In some embodiments, different prediction methods may be used. For example, the prediction could use a linear or non-linear prediction model, where the parameters of the model (e.g., scale and offset in a model of Chroma=a*Y+b) are also signaled to the decoder. Such parameters could be estimated in the encoder using different methods, e.g. using a least squares method. An alternative mode would be to combine the Luma-based prediction with the value generated through the conventional prediction method. For instance, we the weighted average of the Luma-based and the distance-based predictors could be considered. The weighting parameters could be explicitly encoded in the bit stream or could be implicitly determined by the decoder. An encoder could determine such parameters using, for example, rate distortion (RD) based criteria, or other methods that may take in account pre-analysis and past statistics of the encoding process.

In some embodiments, the prediction strategy for the current point attribute could also be adapted based on already encoded/decoded attribute/attribute channel values for the same point. For instance, if the Luma (or other X attribute) value is known for a given point, neighbors could be excluded from the prediction process for the given point, where the neighbors have Luma (or X attribute) values that vary greatly from the Luma (or X attribute) values for the given point. For example, based on the variance between Luma (or X attribute) values, chroma components or other attributes of the neighboring points may be excluded from prediction for the given point. In some embodiments, prediction may be done only with points that have similar characteristics, e.g. satisfy multiple attribute thresholds and not only distance ones. The encoder may explicitly signal which already encoded/decoded attributes or attribute channels should be used for the prediction adaptation. Similarity could be determined based on a threshold T or a set of thresholds, assuming multiple attributes are considered for the prediction selection process, T could be signaled in the bit stream. Such threshold/threshold sets could be signaled at different levels of the coding process, e.g. groups of points, LOD, slices, tiles, frames, or sequence.

Prediction Adaptation

In some embodiments, the prediction adaptation process could also leverage various statistics related to the point cloud geometry (e.g. spatial information). For instance, it could include only points with the same x and/or y and/or z value and exclude others (not only based on distance but also based on other geometric criteria such as angles. Prediction could also include points that are limited in distance across one or more dimensions. For example, points that are within an overall distance D may be included, while, however also these points are also within a distance along the coordinate axes such as an X-distance (dx), a Y-distance (dy), or a Z-distance (dz) from the current point. Such prediction mode could be selected/signaled at various levels.

Dependent LOD Encoder Optimization

In some embodiments, an encoder could select the encoding parameters for the current LOD by considering not only its own distortion/coding performance but also the distortion introduced while predicting the next LOD. Such distortion could be computed for all attributes or a subset (e.g., the luma component only) of attributes. Such subset could be predetermined by the user or some other means, e.g. by analyzing the data and determining, which attribute is most active/has the most energy. For example, which attribute has the most impact on prediction of other attributes and prediction across multiple refinement levels or LODs. The distortion evaluated for the next LOD could be Mean Square Error (MSE)-based or could consider some other distortion criteria. Subsampling of the points in the next LOD could also be considered to reduce complexity. For example, only half the impacted samples in that LOD could be considered in this computation. Sampling could be random, fixed based on some defined sampling process, or could also be based on the characteristics of the signals, e.g. the LOD could be analyzed and the most "important" points in the LOD could be considered. Importance could be determined for example based on the magnitude of the attribute.

Fixed-Point Number Representation Implementation

In some embodiments, attribute prediction, determination of attribute correction values, lifting schemes for level of detail compression or decompression, and/or quantization for coefficients used in the lifting scheme can be performed using fixed-point number representations instead of floating point number representations. A fixed point number representation may be more hardware friendly (e.g. execute more efficiently on the hardware) and may avoid floating point rounding issues and/or dependencies between software and hardware platforms that may slow down computations performed using fixed point number representations.

For example, a fixed-point implementation may take advantage of hardware acceleration to improve performance. Also a fixed point implementation may avoid performing division operations by using a look-up table as described below. In some embodiments, calculations such as multiplication, addition, subtraction, and shift operations may be performed using fixed-point number representations without performing division, other than integer division. For example, attribute values may be predicted using any of the techniques described herein using fixed-point number representations and using a look-up table to avoid performing non-integer division operation. Also, any of the level of detail lifting schemes and/or lifting scheme coefficient quantization described herein may be performed using fixed-point number representations and using a look-up table to avoid non-integer division operations.

In some situations using floating point number representations to perform prediction calculations, lifting scheme calculations, coefficient quantization calculations, etc. may lead to varying results depending on hardware implementation.

In some embodiments, a fixed point number may be represented using a binary fixed point representation with n digits (e.g. n=16) after the radix point to represent rational numbers. For example based on workload, power consumption, etc. some hardware platforms may approximate floating point operations such that different results are obtained. Since the point cloud compression techniques described herein assume that a decoder will predict approximately the same values as the encoder, and then adjust those values using attribute correction values, variance across decoder hardware that do not guarantee each decoder will obtain the same or similar prediction result may negatively affect quality of reconstructed point cloud and/or cause other problems.

In some embodiments, a fixed-point implementation may avoid division operations. For example, division may be a computationally expensive operation. In some embodiments, in order to avoid division at least some of the following techniques may be used: look-up tables, multi-region look up tables, and/or multi-region look up tables combined with interpolation.

For example, in some embodiments, a division of the integers a and b, may be computed as an approximated version of the ratio $$\frac{a}{b}.$$

This approach may avoid having to perform an explicit division operation, which may be costly from a computing perspective. Determining the approximated version value for the ratio $$LUT(i) = \text{round}\left(\frac{2^n}{i}\right), i = \{1, 2, \ldots, 2^m\}$$

may be determined using only multiplication, addition, and/or shifting operations, combined with a look-up table (LUT) of size $2^m$ (e.g., m=8). For example, an approximation of the integer b, denoted $\hat{b}$ is computed as follows:

$$\hat{b}=2^s b_0$$

Where the s and $b_0$ are two integers defined as follows
s is the smallest integer that verifies $b \times 2^{-s} < 2^m$
$b_0$=round($b \times 2^{-s}$)
Next, a look up table (LUT_ of dimension $2^m$ is computed offline as follows:

$$LUT(i) = \text{round}\left(\frac{2^n}{i}\right), i = \{1, 2, \ldots, 2^m\}$$

In the look-up table, LUT(i) gives the fixed-point representation of the inverse of an integer i={1, 2, ..., $2^m$}. The fixed-point representation of the approximation $\hat{b}^{-1}$ of the inverse of any integer b is obtained as follows:

$$\hat{b}^{-1}=LUT(b_0)2^{-s}$$

Also, the fixed-point representation of the approximation of $$\left(\frac{a}{b}\right),$$

denoted $$\left(\frac{\hat{a}}{b}\right),$$

is given by:

$$\left(\frac{\hat{a}}{b}\right) = (a \times LUT(b_0) + 2^{s-1}) \div 2^s$$

where ÷ is the integer division operator.
For example, let n=16, m=8, b=10703 and a=8009

$2^m = 256$ $2^n = 65536$ $s = 6$ because $10703 \times 2^{-6} = 167.234375 < 2^m$ $b_0 = $ round (167.234375) = 167

Figure 14:
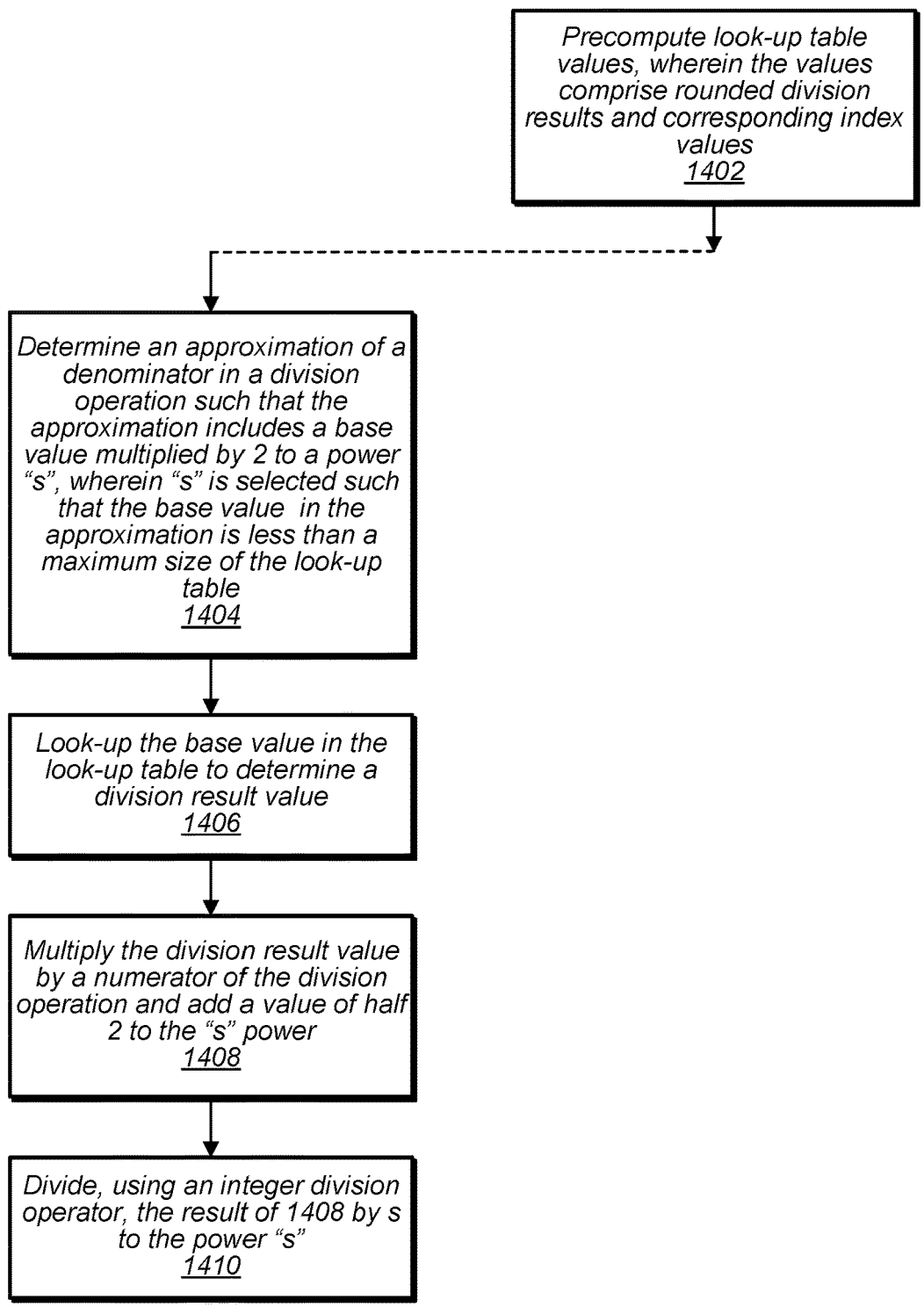
FIG. 14 illustrates an example procedure for performing a division operation with fixed-point number representations, according to some embodiments.
Figure 15:
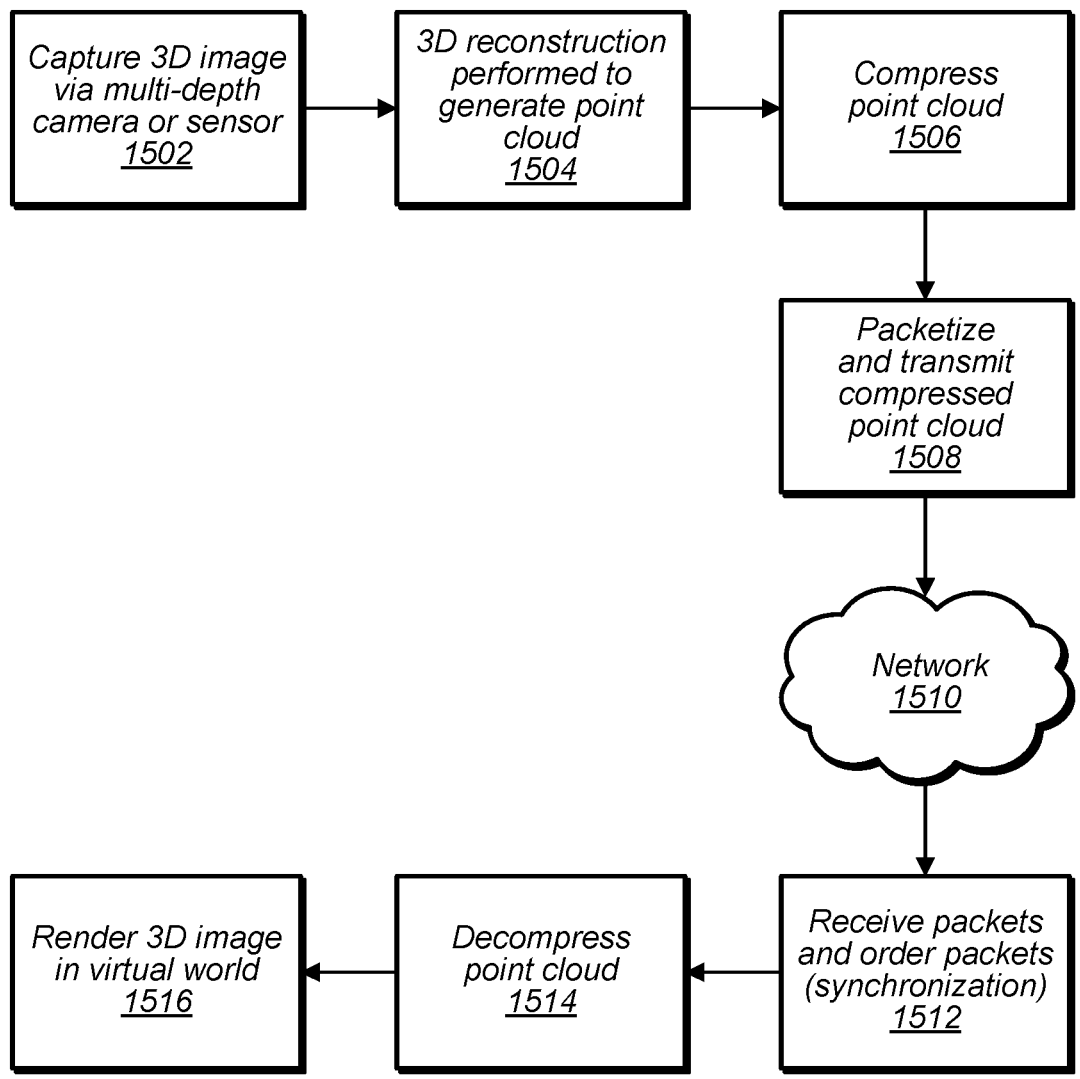
FIG. 15 illustrates compressed point cloud information being used in a 3-D application, according to some embodiments.

$\hat{b} = 2^s b_0 = 64 \times 167 = 10688$ $LUT(b_0) = $ round $\left(\frac{65536}{167}\right) = 392$ $\left(\frac{\hat{a}}{b}\right) = (8009 \times 392 + 32) \div 64 = 40955$ Error abs $\left(\frac{8009}{10703} - \frac{40955}{65536}\right) = 0.00022502686390868387$ For example, FIG. 14 illustrates an example procedure for performing a division operation with fixed point number representations, as described above.

At 1402, look-up table values are pre-computed. The look-up table values may include a set of index values and corresponding division result values. In some embodiments, the index values may correspond to a set of $b_0$ values and the division results may correspond to the values looked-up from the look-up table for $b_0$, as described above.

At 1404, an approximation of a denominator in a division operation may be determined. The approximation may be of the form $\hat{b}=2^s b_0$, where "s" is selected such that the base value ($b_0$) in the approximation is less than a maximum size of the look-up table.

At 1406, a division result value is looked-up in the look-up table by using the base value as an index value into the look-up table.

At 1408, the division result value looked-up from the look-up table is multiplied by a numerator of the division operation. Also in order to bias error toward a middle of an error range, a value of half 2 to the s power is added to the result of the multiplication (e.g. $2^{s-1}$ is added to the result of the multiplication).

At 1410, the result from 1408 is divided, using an integer division operation, by 2 to the "s" power.

In some embodiments, a fixed-point implementation may be used to determine prediction weights for determining predicted attribute values. For example, fixed point implementations may be used in prediction calculations, such as in 158 of FIG. 1B, 422 of FIG. 4, calculations performed in regard to FIG. 5, prediction calculations such as in 1008 of FIG. 10A and/or 1108 of FIG. 11. An example fixed point implementation used in attribute prediction calculations is shown below, wherein a prediction operator predicts the attribute value A(P) of a point P by using the attribute values of its k nearest neighbors V(P):

$$Pred(P) = \sum_{Q \in V(P)} \alpha(P, Q) A(P)$$

The prediction weights α(P,Q) are defined as follows:

$$\alpha(P, Q) = \frac{\frac{1}{\|P - Q\|^2}}{\sum_{Q1 \in V(P)} \frac{1}{\|P - Q1\|^2}}$$

Where ‖P−Q‖ is the Euclidian distance between the two points P and Q. In some embodiments, other distances, other than a Euclidian distance may be used.

The prediction weights have the following properties:
i. α(P,Q)∈[0,1]
ii. $\Sigma_{Q \in V(P)} \alpha(P,Q) = 1$ Since the points coordinates are quantized and represented by integers, the distances ‖P−Q‖² have also integer values. Computing the α(P,Q) requires a division, which is avoided by computing an approximated version denoted α̂(P,Q). This is done by leveraging the algorithm described above in regard to fixed point division. For example respective cases for determining of a weighted prediction value for a point with one, two, and three "K" nearest neighbors, are described below.
  i. Case of one neighbor Q1
    b. The solution is trivial α(P,Q1)=$2^n$
  i. Case of two neighbors Q1 and Q2
    c. Let d1=‖P−Q1‖² and d2=‖P−Q2‖²
    d.

$$\alpha(P, Q1) = \frac{\frac{1}{d1}}{\frac{1}{d1} + \frac{1}{d2}} = \frac{d2}{d1 + d2}$$

e. Approximate α(P,Q1) by applying the division approximation algorithm with a=d2 and b=d1+d2
  f. Approximate α(P,Q2) with ($2^n$−α(P,Q1))
  i. Case of three neighbors Q1, Q2 and Q3
    g. Let d1=‖P−Q1‖², d2=‖P−Q2‖² and d3=‖P−Q3‖²
    h.

$$\alpha(P, Q1) = \frac{\frac{1}{d1}}{\frac{1}{d1} + \frac{1}{d2} + \frac{1}{d3}} = \frac{d2d3}{d1d2 + d2d3 + d1d3}$$

i. Approximate α(P,Q1) by applying the division approximation algorithm with a=d2d3 and b=d1d2+d2d3+d1d3
  j. Approximate α(P,Q2) by applying the division approximation algorithm with a=d1d3 and b=d1d2+d2d3+d1d3
  k. Approximate α(P,Q3) with ($2^n$−α(P,Q1)−α(P,Q2))
  i. Other considerations
    l. If d1=0 or d2>$2^n$d1, then treat the situation the same as if the point has a single neighbor Q1
    m. If d3>$2^n$d1, then treat the situation the same as if the point has two neighbors Q1 and Q2
    n. To be able to support arbitrary large distances with a limited precision, a quantization procedure could be applied to d1, d2 and d3

In some embodiments, a fixed-point implementation may be used to determine lifting scheme updates. For example, fixed point implementations may be used in lifting scheme calculations as described above, such as in FIGS. 12A and 12B and the associated portions of the specification for lifting schemes. An example fixed point implementation used in lifting scheme calculations is shown below, wherein update operation for P is defined as follows:

$$\text{Update}(P) = \frac{\sum_{Q \in \Delta(P)} [\{\alpha(P, Q)\}^\gamma \times w(Q) \times D(Q)]}{\sum_{Q \in \Delta(P)} [\{\alpha(P, Q)\}^\gamma \times w(Q)]}$$

where γ is a parameter usually set to 1 or 2.

In the above equation, division is avoided by leveraging the algorithm described above in regard to fixed point division to approximate the weights $$\frac{\{\alpha(P, Q)\}^\gamma \times w(Q)}{\sum_{Q \in \Delta(P)} [\{\alpha(P, Q)\}^\gamma \times w(Q)]}$$

In some embodiments, to reduce the dynamic range of the influence weights w(Q), use $\sqrt{w(Q)}$ instead of w(Q) and set γ=1.

Thus, the equation becomes:

$$\text{Update}(P) = \frac{\sum_{Q \in \Delta(P)} [\alpha(P, Q) \times \sqrt{w(Q)} \times D(Q)]}{\sum_{Q \in \Delta(P)} [\alpha(P, Q) \times \sqrt{w(Q)}]}$$

In some embodiments, known fixed-point approximation techniques may be used to compute an approximation of the square root operation.

In some embodiments, a fixed-point implementation may be used to determine quantized coefficients. For example, fixed point implementations may be used in quantization calculations as described above, such as in 810 of FIG. 8 and the associated portions of the specification that discuss quantization. As described above, the quantization procedure leverages the influence weights in order to guide the quantization process. More precisely, the transform coefficients associated with a point P are multiplied by a factor of $\{w(P)\}^\beta$ (e.g. $\beta=0.5$) before applying quantization. An inverse scaling process by the same factor is applied after inverse quantization on the decoder side.

By choosing $\beta=0.5$, the values of $b=\{w(P)\}^{0.5}$ computed during the lifting updates may be re-used.

An example fixed point implementation used in quantization calculations is shown below, wherein the quantization of a coefficient C with a quantization step q to get a quantized coefficient $\hat{C}$ is as follows:

$$\hat{C} = \begin{cases} \text{floor}\left(\dfrac{C}{\frac{q}{\{w(P)\}^\beta}} + \delta\right) & C \geq 0 \\ -\text{floor}\left(\dfrac{-C}{\frac{q}{\{w(P)\}^\beta}} + \delta\right) & C < 0 \end{cases}$$

Where $\delta$ is a parameter that controls the dead zone size (e.g., $\delta=\frac{1}{3}$).

The reconstructed coefficient $\tilde{C}$ by inverse quantization is given by:

$$\tilde{C} = \hat{C}\dfrac{q}{\{w(P)\}^\beta}$$

In a fixed-point implementation in order to avoid such division operations on both the encoder side and the decoder side, the approximation $$\dfrac{q}{\{w(P)\}^\beta}$$

as described above as an alternative to fixed-point division operations may be used with $a=q$ and $b=\{w(P)\}^\beta$.

Point Cloud Attribute Transfer Algorithm

In some embodiments, a point cloud transfer algorithm may be used to minimize distortion between an original point cloud and a reconstructed version of the original point cloud. A transfer algorithm may be used to evaluate distortion due to the original point cloud and the reconstructed point cloud having points that are in slightly different positions. For example, a reconstructed point cloud may have a similar shape as an original point cloud, but may have a.) a different number of total points and/or b.) points that are slightly shifted as compared to a corresponding point in the original point cloud. In some embodiments, a point cloud transfer algorithm may allow the attribute values for a reconstructed point cloud to be selected such that distortion between the original point cloud and a reconstructed version of the original point cloud is minimized. For example, for an original point cloud, both the positions of the points and the attribute values of the points are known. However, for a reconstructed point cloud, the position values may be known (for example based on a sub-sampling process, K-D tree process, or patch image process as described above). However, attribute values for the reconstructed point cloud may still need to be determined. Accordingly a point cloud transfer algorithm can be used to minimize distortion by selecting attribute values for the reconstructed point cloud that minimize distortion.

The distortion from the original point cloud to the reconstructed point cloud can be determined for a selected attribute value. Likewise the distortion from the reconstructed point cloud to the original point cloud can be determined for the selected attribute value for the reconstructed point cloud. In many circumstances, these distortions are not symmetric. The point cloud transfer algorithm is initialized with two errors (E21) and (E12), where E21 is the error from the second or reconstructed point cloud to the original or first point cloud and E12 is the error from the first or original point cloud to the second or reconstructed point cloud. For each point in the second point cloud, it is determined whether the point should be assigned the attribute value of the corresponding point in the original point cloud, or an average attribute value of the nearest neighbors to the corresponding point in the original point cloud. The attribute value is selected based on the smallest error.

Exampled Applications for Point Cloud Compression and Decompression

Figure 16:
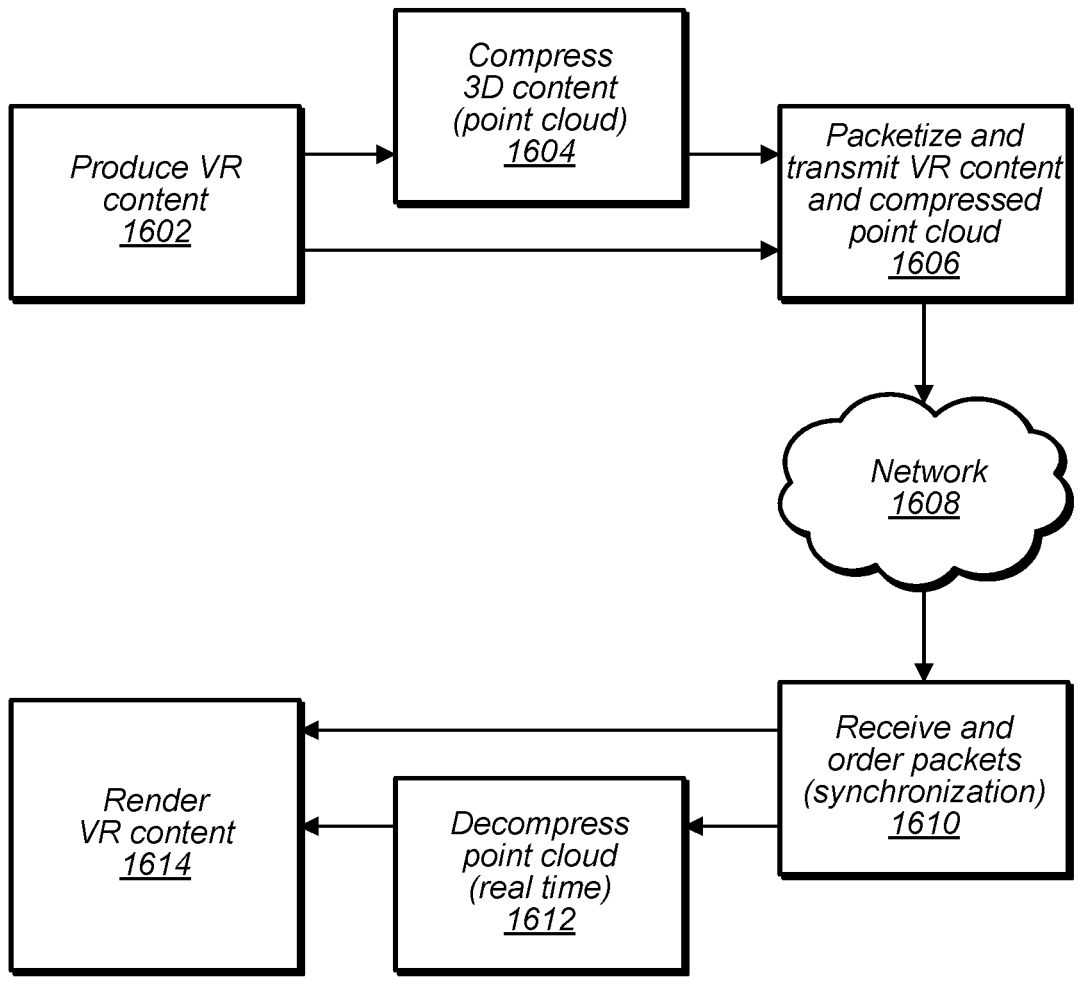
FIG. 16 illustrates compressed point cloud information being used in a virtual reality application, according to some embodiments.

FIG. 16 illustrates compressed point clouds being used in a 3-D application, according to some embodiments.

In some embodiments, a sensor, such as sensor 102, an encoder, such as encoder 104 or encoder 202, and a decoder, such as decoder 116 or decoder 220, may be used to communicate point clouds in a 3-D application. For example, a sensor, such as sensor 102, at 1602 may capture a 3D image and at 1604, the sensor or a processor associated with the sensor may perform a 3D reconstruction based on sensed data to generate a point cloud.

At 1606, an encoder such as encoder 104 or 202 may compress the point cloud and at 1608 the encoder or a post processor may packetize and transmit the compressed point cloud, via a network 1610. At 1612, the packets may be received at a destination location that includes a decoder, such as decoder 116 or decoder 220. The decoder may decompress the point cloud at 1614 and the decompressed point cloud may be rendered at 1616. In some embodiments a 3-D application may transmit point cloud data in real time such that a display at 1616 represents images being observed at 1602. For example, a camera in a canyon may allow a remote user to experience walking through a virtual canyon at 1616.

FIG. 16 illustrates compressed point clouds being used in a virtual reality (VR) or augmented reality (AR) application, according to some embodiments.

In some embodiments, point clouds may be generated in software (for example as opposed to being captured by a sensor). For example, at 1602 virtual reality or augmented reality content is produced. The virtual reality or augmented reality content may include point cloud data and non-point cloud data. For example, a non-point cloud character may traverse a landscape represented by point clouds, as one example. At 1604, the point cloud data may be compressed and at 1606 the compressed point cloud data and non-point cloud data may be packetized and transmitted via a network 1608. For example, the virtual reality or augmented reality content produced at 1602 may be produced at a remote server and communicated to a VR or AR content consumer via network 1608. At 1610, the packets may be received and synchronized at the VR or AR consumer's device. A decoder operating at the VR or AR consumer's device may decompress the compressed point cloud at 1612 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 17:
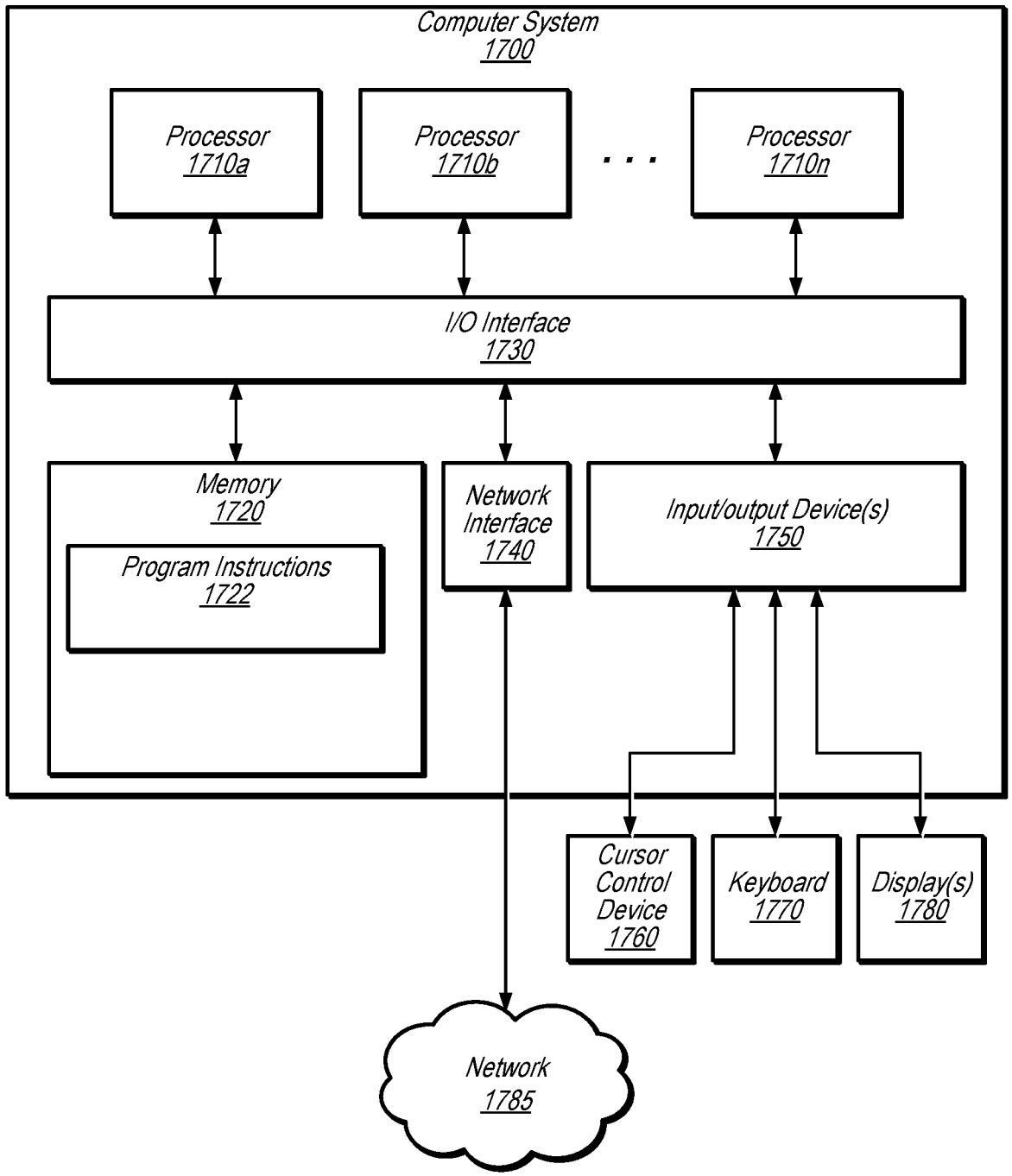
FIG. 17 illustrates an example computer system that may implement an encoder or decoder, according to some embodiments.

FIG. 17 illustrates an example computer system 1700 that may implement an encoder or decoder or any other ones of the components described herein, (e.g., any of the components described above with reference to FIGS. 1-16), in accordance with some embodiments. The computer system 1700 may be configured to execute any or all of the embodiments described above. In different embodiments, computer system 1700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1700, which may interact with various other devices. Note that any component, action, or functionality described above with respect to FIGS. 1-16 may be implemented on one or more computers configured as computer system 1700 of FIG. 17, according to various embodiments. In the illustrated embodiment, computer system 1700 includes one or more processors 1710 coupled to a system memory 1720 via an input/output (I/O) interface 1730. Computer system 1700 further includes a network interface 1740 coupled to I/O interface 1730, and one or more input/output devices 1750, such as cursor control device 1760, keyboard 1770, and display(s) 1780. In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1710, or a multiprocessor system including several processors 1710 (e.g., two, four, eight, or another suitable number). Processors 1710 may be any suitable processor capable of executing instructions. For example, in various embodiments processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

System memory 1720 may be configured to store point cloud compression or point cloud decompression program instructions 1722 and/or sensor data accessible by processor 1710. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions 1722 may be configured to implement an image sensor control application incorporating any of the functionality described above. In some embodiments, program instructions and/or data may be received, sent or stored upon different types of computer-accessible media or on similar media separate from system memory 1720 or computer system 1700. While computer system 1700 is described as implementing the functionality of functional blocks of previous Figures, any of the functionality described herein may be implemented via such a computer system.

In one embodiment, I/O interface 1730 may be configured to coordinate I/O traffic between processor 1710, system memory 1720, and any peripheral devices in the device, including network interface 1740 or other peripheral interfaces, such as input/output devices 1750. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices attached to a network 1785 (e.g., carrier or agent devices) or between nodes of computer system 1700. Network 1785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1750 may, in some embodiments, include one or more display terminals, keyboards, keypads, touchpads, scanning devices, voice or optical recognition devices, or any other devices suitable for entering or accessing data by one or more computer systems 1700. Multiple input/output devices 1750 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1740.

As shown in FIG. 17, memory 1720 may include program instructions 1722, which may be processor-executable to implement any element or action described above. In one embodiment, the program instructions may implement the methods described above. In other embodiments, different elements and data may be included. Note that data may include any data or information described above.

Those skilled in the art will appreciate that computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed by one or more processors, cause the one or more processors to:
   compress attribute information for points of a three-dimensional point cloud, wherein to compress the attribute information, the program instructions cause the one or more processors to:
   for respective ones of the points of the point cloud:
      identify a set of neighboring points that neighbor the respective point;
      predict one or more attribute values for the respective point, wherein:
         the one or more attribute values are predicted using an inverse-distance based interpolation that uses attribute values of the set of neighboring points and distances to the set of neighboring points to predict the one or more attribute values of the respective point;
         the inverse-distance based interpolation is performed using fixed-point number representations; and
         a division operation of the inverse distance-based interpolation is performed using a look-up table comprising approximated division results represented in fixed-point number representations; and
      determine one or more attribute correction values for the respective point based on comparing the one or more predicted attribute values to attribute information for the respective point included in the point cloud prior to the point cloud being compressed; and
   encode the determined attribute correction values as compressed attribute information for the three-dimensional point cloud.

2. The non-transitory computer-readable medium of claim 1, wherein to use the look-up table to perform the division operation, the program instructions cause the one or more processors to:
   determine an approximation of a denominator in the division operation in a form comprising 2 to a power multiplied by a base value for the denominator, wherein the base value corresponds to the denominator multiplied by 2 to a negative value of the power and rounded to an integer value, wherein the power is selected such that the denominator multiplied by the negative value of the power is less than a size of the look-up table.

3. The non-transitory computer-readable medium of claim 2, wherein to use the look-up table to perform the division operation of the fixed-point number representation, the program instructions further cause the one or more processors to:
   look-up the base value for the denominator in the look-up table and divide a value from the look-up table corresponding to the base value for the denominator by 2 to the power, wherein the division is performed using an integer division operator.

4. The non-transitory computer-readable medium of claim 3, wherein the program instructions further cause the one or more processors to:

prior to dividing the value from the look-up table by 2 to the power, multiply the value from the look-up table by a numerator of the division operation and add a value that is half of 2 to the power, then divide a result of the multiplication with the numerator and the addition of the value that is half of 2 to the power, by 2 to the power, wherein the division is performed using an integer division operator.

5. The non-transitory computer-readable medium of claim 2, wherein the look-up table comprises a series of rounded division results, wherein the rounded division results are for 2 to an integer power divided by "i", where "i" is equal to 2 to another increasing integer power up to a size of the look-up table.

6. The non-transitory computer-readable medium of claim 1, wherein the look-up table comprises values computed prior to performing the inverse-distance based interpolation.

7. The non-transitory computer-readable medium of claim 1, wherein the inverse-distance based interpolation is performed using quantized coordinates for the respective point and for the set of neighboring points, wherein the quantized coordinates are represented as integers.

8. The non-transitory computer-readable medium of claim 1, wherein the inverse-distance based interpolation comprises determining inverse-distance based weighting values for each of the neighboring points of the set of neighboring points, wherein the division operation is used to determine the inverse-distance based weighting values.

9. The non-transitory computer-readable medium of claim 8, wherein the inverse-distance based weighting values collectively sum to a fixed value.

10. The non-transitory computer-readable medium of claim 9, wherein for a set of two neighboring points, the program instructions cause the one or more processors to:
determine a first inverse-distance based weighting value for a first neighboring point of the set of two neighboring points; and
subtract the first inverse-distance based weighting value from the fixed value to determine a second inverse-distance based weighting value for a second neighboring point of the set of two neighboring points.

11. The non-transitory computer-readable medium of claim 9, wherein for a set of more than two neighboring points, the program instructions cause the one or more processors to:
determine a first inverse-distance based weighting value for a first neighboring point of the set of more than two neighboring points;
determine one or more additional inverse-distance based weighting values for one or more additional neighboring point of the set of more than two neighboring points; and
subtract a sum of the first inverse-distance based weighting value and the one or more additional inverse-distance based weighting values from the fixed value to determine a remaining inverse-distance based weighting value for a remaining neighboring point of the set of more than two neighboring points.

12. The non-transitory computer-readable medium of claim 1, wherein the program instructions further cause the one or more processors to:
apply an update operation to smooth the attribute correction values, wherein the update operation takes into account relative influences of the attributes values of a given level of detail being compressed on attribute values of points to be included in other levels of detail, wherein:
the relative influence values are determined using fixed-point number representations; and
a division operation used to determine the relative influence values is performed using the look-up table comprising approximated division results represented in fixed-point number representations.

13. The non-transitory computer-readable medium of claim 12, wherein the program instructions further cause the one or more processors to:
quantize coefficients used to determine the relative influence values, wherein a quantization operation is adjusted based on a respective relative influence of a relative influence value being quantized,
wherein:
quantization operations are performed using fixed-point number representations; and
a division operation included in a quantization operation is performed using the look-up table comprising approximated division results represented in fixed-point number representations.

14. The non-transitory computer-readable medium of claim 1, wherein the look-up table comprises values computed such that a decoder executing the program instructions computes similar or same look-up table values as were computed at an encoder.

15. The device of claim 14, wherein to use the look-up table to perform the division operation, the program instructions cause the one or more processors to:
determine an approximation of a denominator in the division operation in a form comprising 2 to a power multiplied by a base value for the denominator, wherein the base value corresponds to the denominator multiplied by 2 to a negative value of the power and rounded to an integer value, wherein the power is selected such that the denominator multiplied by the negative value of the power is less than a size of the look-up table.

16. The device of claim 14, wherein the program instructions further cause the one or more processors to:
apply an update operation to smooth the attribute correction values, wherein the update operation takes into account relative influences of the attributes values of a given level of detail being compressed on attribute values of points to be included in other levels of detail, wherein:
the relative influence values are determined using fixed-point number representations; and
a division operation used to determine the relative influence values is performed using a look-up table comprising approximated division results represented in fixed-point number representations.

17. A non-transitory computer-readable medium storing program instructions that, when executed by one or more processors, cause the one or more processors to:
decompress attribute information for points of a three-dimensional point cloud, wherein to decompress the attribute information, the program instructions cause the one or more processors to:
for respective ones of the points of the point cloud:
identify a set of neighboring points that neighbor the respective point;
predict one or more attribute values for the respective point, wherein:
the one or more attribute values are predicted using an inverse-distance based interpolation that uses attribute values of the set of neighboring points and distances to the set of neighboring points to predict the one or more attribute values of the respective point;

the inverse-distance based interpolation is performed using fixed-point number representations; and a division operation of the inverse distance-based interpolation is performed using a look-up table comprising approximated division results represented in fixed-point number representations; and apply one or more attribute correction values for the respective point, wherein the attribute correction values are included in a compressed bitstream for the three-dimensional point cloud.

18. The non-transitory computer-readable medium of claim 17, wherein to use the look-up table to perform the division operation, the program instructions cause the one or more processors to:

determine an approximation of a denominator in the division operation in a form comprising 2 to a power multiplied by a base value for the denominator, wherein the base value corresponds to the denominator multiplied by 2 to a negative value of the power and rounded to an integer value, wherein the power is selected such that the denominator multiplied by the negative value of the power is less than a size of the look-up table.

19. The non-transitory computer-readable medium of claim 18, wherein to use the look-up table to perform the division operation of the fixed-point number representation, the program instructions further cause the one or more processors to:

look-up the base value for the denominator in the look-up table and divide a value from the look-up table corresponding to the base value for the denominator by 2 to the power, wherein the division is performed using an integer division operator.

20. A device, comprising:

a memory storing program instructions; and one or more processors, wherein the program instructions, when executed on the one or more processors, cause the one or more processors to:

compress attribute information for points of a three-dimensional point cloud, wherein to compress the attribute information, the program instructions cause the one or more processors to:

for respective ones of the points of the point cloud:

predict an attribute value for the respective point based on respective attribute values of neighboring points; and determine an attribute correction value for the respective point based on comparing the predicted attribute value for the respective point to an attribute value for the respective point included in the three-dimensional point cloud prior to compression, wherein:

the prediction of the attribute value is performed using fixed-point number representations; and a division operation used in the prediction of the attribute value is performed using a look-up table comprising approximated division results represented in fixed-point number representations.

* * * * *